United States Patent
Hansen et al.

(10) Patent No.: US 12,203,406 B2
(45) Date of Patent: Jan. 21, 2025

(54) SUPERCHARGED INTERNAL COMBUSTION ENGINE

(71) Applicant: HANSEN ENGINE CORPORATION, Minnetonka, MN (US)

(72) Inventors: Craig N. Hansen, Sioux Falls, SD (US); Paul C. Cross, Plymouth, MN (US)

(*) Notice: Subject to any disclaimer, the term of this patent is extended or adjusted under 35 U.S.C. 154(b) by 0 days.

(21) Appl. No.: 18/600,265

(22) Filed: Mar. 8, 2024

(65) Prior Publication Data
US 2024/0295189 A1 Sep. 5, 2024

Related U.S. Application Data

(63) Continuation of application No. PCT/US2022/043143, filed on Sep. 9, 2022.

(60) Provisional application No. 63/242,984, filed on Sep. 10, 2021.

(51) Int. Cl.
| | | |
|---|---|---|
| F02B 33/36 | (2006.01) | |
| F04D 17/10 | (2006.01) | |
| F04D 29/28 | (2006.01) | |

(52) U.S. Cl.
CPC .............. *F02B 33/36* (2013.01); *F04D 17/10* (2013.01); *F04D 29/284* (2013.01)

(58) Field of Classification Search
CPC .......... F02B 33/36; F04D 17/10; F04D 29/284
See application file for complete search history.

(56) References Cited

U.S. PATENT DOCUMENTS

| | | | | | |
|---|---|---|---|---|---|
| 5,797,735 | A | * | 8/1998 | Ishikawa | F01C 21/003 |
| | | | | | 418/206.1 |
| 7,708,113 | B1 | * | 5/2010 | Prior | F01N 1/16 |
| | | | | | 418/179 |
| 7,993,118 | B2 | * | 8/2011 | Prior | F04C 18/16 |
| | | | | | 418/91 |
| 8,550,057 | B2 | * | 10/2013 | Prior | F02B 33/38 |
| | | | | | 418/206.1 |
| 9,683,521 | B2 | * | 6/2017 | Mahalatkar | F02M 26/08 |
| 9,932,983 | B2 | * | 4/2018 | Eybergen | F04C 2/084 |
| 2018/0100506 | A1 | * | 4/2018 | Meyers | F04C 18/126 |

* cited by examiner

*Primary Examiner* — Jesse S Bogue
(74) *Attorney, Agent, or Firm* — R. John Bartz

(57) ABSTRACT

A supercharged internal combustion engine is drivably connected to a variable displacement supercharger operable to continuously supply varying amounts of an air mass to the engine in response to the varying power requirements of the engine. The variable displacement capability eliminates blowdown losses of fixed displacement superchargers and substantially reduces the need for throttling of the intake air. The device also presents an air-motoring mode that can recover a portion of the engine throttling losses as positive power returned to the engine crankshaft when the engine intake manifold is below atmospheric pressure.

13 Claims, 48 Drawing Sheets

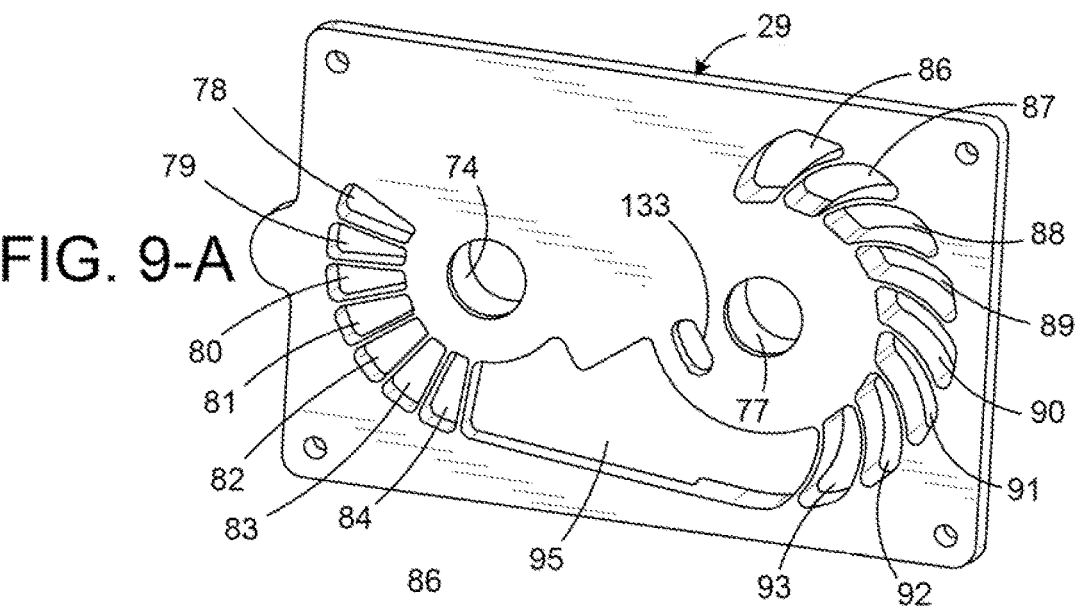
FIG. 9-A
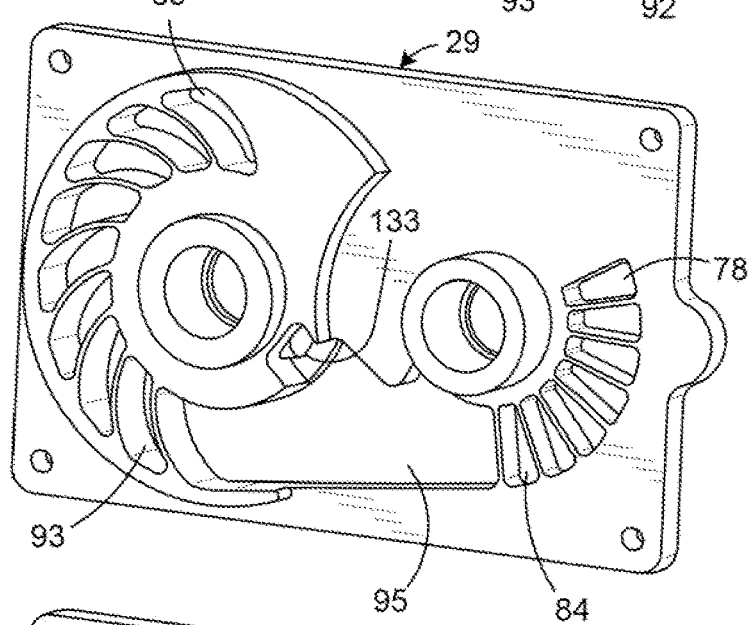
FIG. 9-B
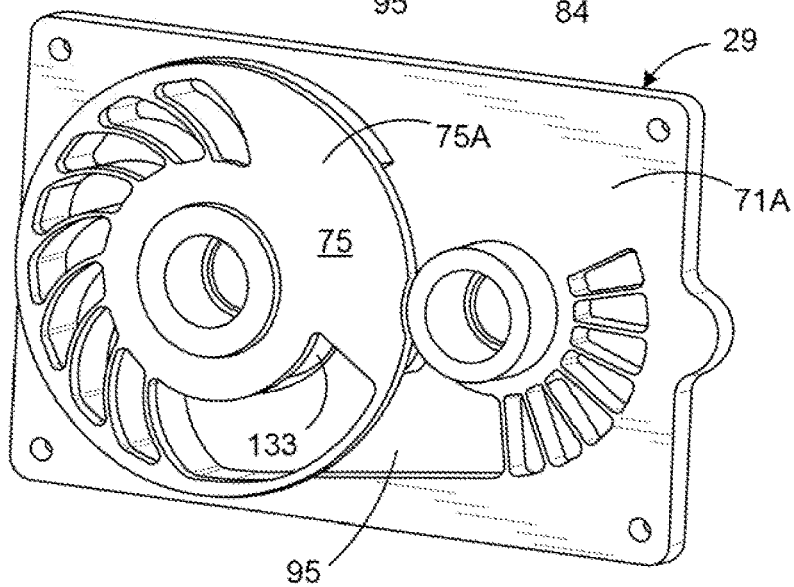
FIG. 9-C

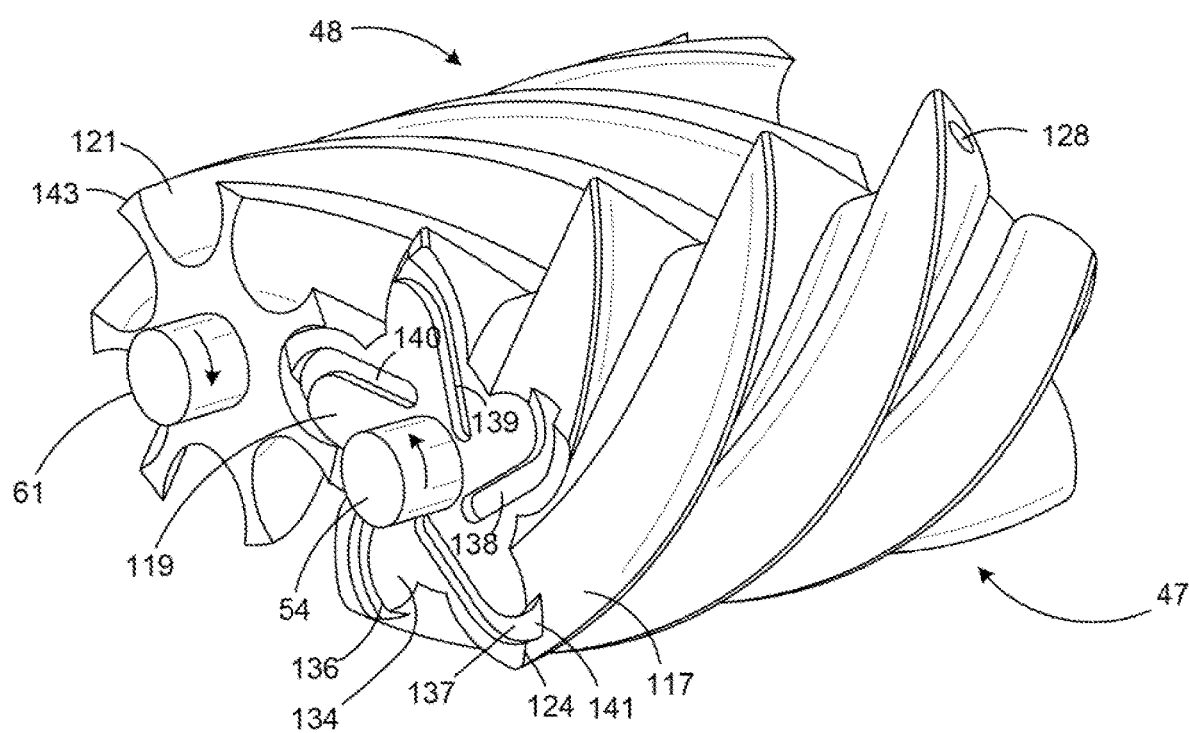
FIG. 18-A
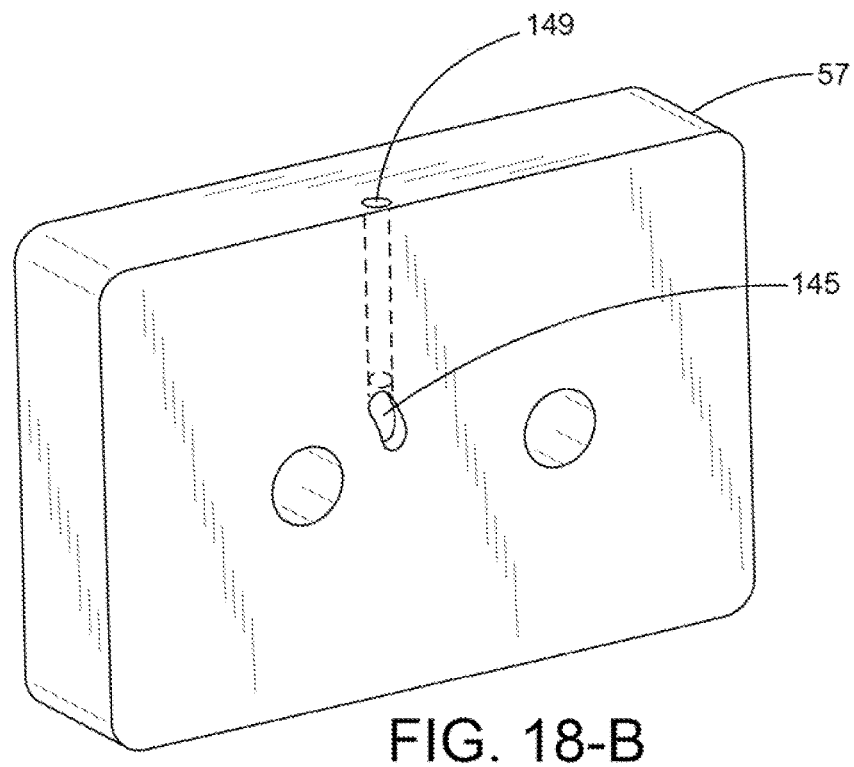
FIG. 18-B

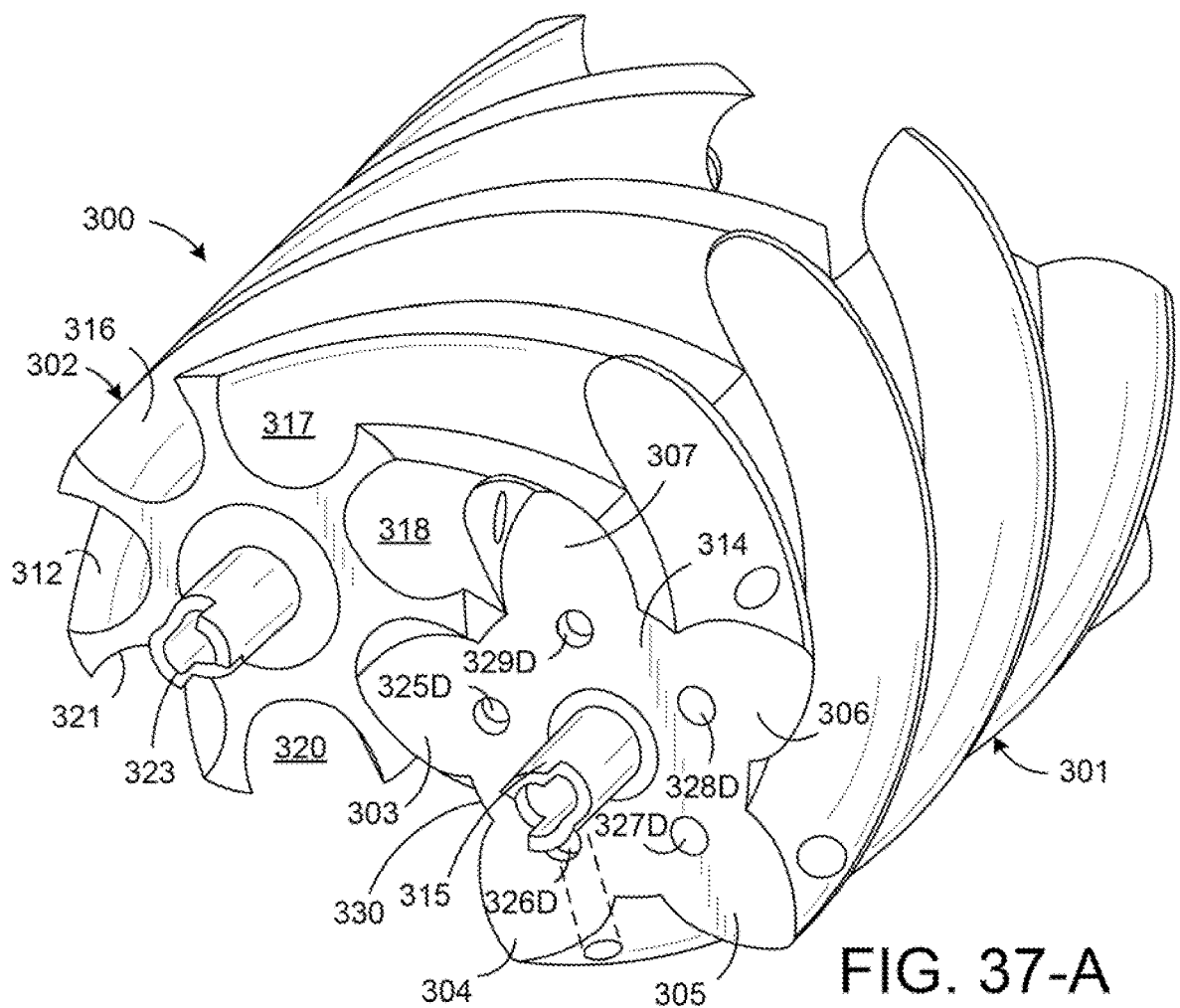
FIG. 37-A
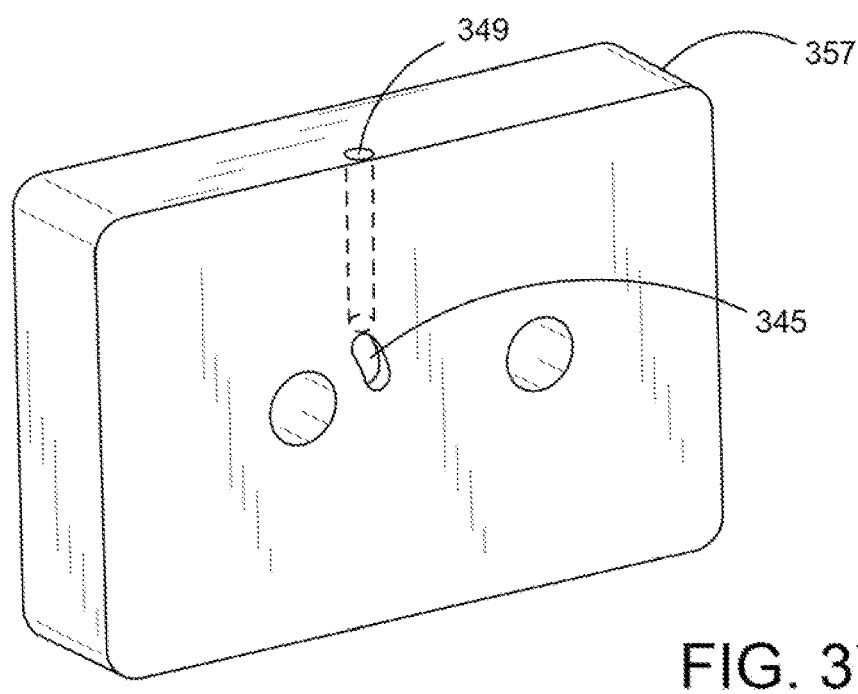
FIG. 37-B

SUPERCHARGED INTERNAL COMBUSTION ENGINE

CROSS REFERENCE TO RELATED APPLICATION

This application is a continuation of International Patent Application No. PCT/US2022/043143 filed Sep. 9, 2022. International Patent Application No. PCT/US2022/043143 claims the priority of U.S. Application Ser. No. 63/242,984 filed Sep. 10, 2021.

FIELD OF THE INVENTION

The invention is in the art of supercharged internal combustion engines. A supercharger operates to efficiently supply an air mass in variable quantities to an internal combustion engine according to the power requirements of the engine.

BACKGROUND OF THE INVENTION

Internal combustion engines are generally more efficient and less polluting when the ratio of an air mass to fuel mass is closely controlled. The air mass in a non-supercharged naturally aspirated internal combustion engine is limited by the amount of air mass the engine's cylinders can contain at atmospheric pressure. Superchargers and blowers are used to boost the air mass flow into the engine to enable the engine to produce more power than the naturally aspirated engine for engine control. Prior art devices have been developed to provide variable air mass flow rates from a supercharger including variable speed transmissions to drive the superchargers, electric motors to drive the superchargers, throttled air intake systems to restrict air mass flow into the superchargers, and blow-down bypass valves to release already compressed excess air mass back to the atmospheric air intakes of the superchargers. These prior art devices have not provided an optimum combination of efficiency, reliability and cost effectiveness. The prior art superchargers for supplying air masses to internal combustion engines include the following.

P. H. Roots in U.S. Pat. No. 30,157 discloses a rotary blower having two rotors located within a chamber of a housing. A gear serving both time and power transmission is secured to each rotor. The gear transmission operates to concurrently rotate each rotor to move an air mass from an air inlet to an air outlet. The rotors have meshing lobes that rotate in opposite directions to force a mass of air through the air outlet and prevent the air mass from flowing back to the air inlet. The rotational speed of the rotors largely determines the volume of air mass discharged by the blower. The Roots blower has lower thermal efficiency due to its lack of internal compression and lack of efficient partial boost control. At higher boost pressures this effect becomes more pronounced. A Roots style blower was included in a 1930 Bentley automobile.

H. B. Wagenius in U.S. Pat. No. 3,088,658 discloses a positive displacement air compressor having a housing accommodating a male rotor and a female rotor. The housing includes a low air pressure intake port and slots or openings in the wall between the male rotor and an angularly adjustable valve. The valve is a cylindrical member that is rotatable to sequentially close the openings whereby the air mass is first exposed to an expansion and then to a compression before the air mass escapes through an air high pressure port. The rotation of the valve varies the quantity of the air mass passing through the compressor.

L. B Schibbye in U.S. Pat. No. 3,108,740 discloses an air compressor having valve structure for varying the capacity of the compressor to generate a compressed air mass between a minimum partial capacity and maximum capacity. The compressor has a low pressure end wall having an air inlet port that allows an air mass to flow to male and female rotors located in a housing. A rotary slide valve located adjacent the end wall is concentrically movable around the axis of one of the rotors to regulate the volume of air mass flowing through the air inlet port to the rotors thereby controlling the operation of the compressor between full capacity to partial capacity of the air mass generated by the compressor.

D. N. Shaw in U.S. Pat. No. 4,667,646 discloses an internal combustion engine combined with a positive displacement device operable to feed combustion air to the engine intake manifold to control variations in the power of the engine without a throttle valve. The amount of air admitted to the device is determined by the final power output requirement desired by the operator of the engine. The device has a single slide valve for varying its air intake volume between a predetermined minimum and maximum amount whereby the total engine power output control functions are accomplished by the expansion and compression systems of the device. This system replaces all functions previously accomplished by intake throttle valves in combination with superchargers with gates and bypass valves. The device in the form of a helical screw machine requires a low blowhole on both the compression and intake sides of the supercharger. R. A. Ingalls in U.S. Pat. No. 4,673,344, discloses an example of a helical screw machine with rotor profiles having minimal blowholes.

J. Oscarsson in U.S. Pat. No. 4,802,457 discloses an internal combustion engine connected to a supercharger. The supercharger has an air mass capacity regulator on its air inlet for adjusting the power output of the engine. The air mass regulator is a slide valve arranged for axial movement in relation to the rotors by operation of a gas pedal to vary the size of the air passage to the rotors. The position of the slide valve relative to an air inlet passage and the helical screw rotors controls the amount of air mass directed to the engine thereby controlling the power output of the engine.

K. Rienas in International Patent Application Publication WO 2013/152112 discloses a rotary blower having two air inlet adaptors to vary the air inlet geometry to optimize maximum air mass generated by the rotary blower according to the requirements of an internal combustion engine. The blower has a housing with an internal chamber accommodating two identical lobed rotors. An inlet plate attached to the housing has bearings that rotatably support the rotors and an opening that allows an air mass to flow to the rotors. A power transmission including timing gears drivably connects the engine to the rotors whereby the rotors rotate in response to the speed of the engine. The inlet plate has arcuate recesses on its inside facing the rotor accommodating the air mass adaptors. Gear segments on the outside of the inlet plate are connected to the air mass adaptors with pins extended through arcuate slots in the inlet plate. An actuator drivably connected to one of the gear segments is operable to cause an equal and opposite rotation of the air mass adaptors. Movement of the air mass adaptors changes the geometry of the air mass opening thereby optimizing dwell time for highest volumetric fill of air mass drawn into the blower by the rotating identical rotors. The actuator is implemented with controls associated with the engine control unit whereby the actuator moves the air mass adaptors to regulate the air mass generated by the blower according to the air mass requirements of the engine.

C. N. Hansen and P. C. Cross in U.S. Pat. No. 9,797,299 disclose an internal combustion engine combined with a variable displacement supercharger operable to supply varying amounts of a mass of air to the engine that range selectively from below through above atmospheric pressure according to the power requirements of the engine. The supercharger has a male rotor and a female rotor located within a housing having an air intake, an air bypass opening and an air bypass passage for directing bypass air mass to the air intake of the supercharger. A shuttle assembly movably mounted on the supercharger is operable to change its position in the air bypass passage to direct uncompressed bypass air mass to the air inlet of the supercharger. The control of the location of the shuttle assembly relative to the air bypass opening varies the air mass flow to the engine without employing either throttling valves or blow down bypass valves that release already compressed air mass while in the boosting phase. The supercharger first takes in a full amount of an air mass, then traps, compresses, and delivers only the portion of the air mass required by the engine to meet the desired power demand of the engine while boosting. The remaining portion of the air mass is not compressed and is delivered back to the atmospheric air intake of the supercharger. The result is a substantial reduction in the power required to drive the supercharger while in the boosting phase resulting in improvements in fuel economy.

SUMMARY OF THE INVENTION

A supercharged internal combustion engine includes a positive-displacement supercharger that provides an efficient and instantaneous control of an air mass delivered to the internal combustion engine according to varying demands for the engine power output at varying engine loads. The supercharger has an air mass control apparatus to minimize parasitic power required to drive the supercharger under all boosted engine load conditions resulting in reduced engine fuel consumption. In a second embodiment of the air mass control apparatus for the supercharger the parasitic power required to drive the supercharger is minimized under all engine load conditions, both boosted and unboosted, resulting in further reduced engine fuel consumption. The supercharger of the invention varies the air mass flow delivered to the engine by varying the air mass drawn into the air inlet of the supercharger with little or no throttling loss during varied engine intake manifold pressures, from below atmospheric pressure to above atmospheric pressure. The power required to operate the supercharger is reduced in that only the air mass needed by the engine at any given time is drawn into the supercharger, processed, and delivered to the engine. The air mass drawn into the supercharger is controlled with shutters positioned to selectively and progressively cut off and trap an air mass flow into the supercharger at the desired internal volume of the working chamber. The supercharger has air intake ports comprising axial air passages through an air inlet end plate. The air passages separate a male rotor and a female rotor from the shutters. In the first embodiment of the air mass control apparatus the shutters comprise a first shutter for controlling the flow of an air mass through male air ports and a second shutter for controlling the flow of an air mass through female air ports during boosted operating conditions. The first and second shutters are synchronized to simultaneously rotate in opposite directions dictated by the required range of travel of the shutters for the respective air intake ports being controlled and the ratio of the rotor grooves. The first shutter is synchronized in rotational timing with the second shutter so that both shutters open and close in a coordinated manner. The male rotor has an air inlet end and an air discharge end. The male rotor air inlet end has generally radial passages that provide access to air mass to mitigate the creation of a small temporary trapped vacuum between the male rotor, the female rotor, and the air inlet end member during the initiation of the intake phase while maintaining chamber isolation. In the second embodiment of the air mass control apparatus for the supercharger the shutters have more range of control than the first embodiment of the air mass control apparatus, thereby providing greater air mass variation and air mass control to smaller volumes of the internal working chamber of the supercharger. The small volumes and associated small air mass correspond to operating conditions of the engine that would typically incur throttling parasitic losses during light part-load power requirements in which the pressure in the intake manifold of the engine is below the atmospheric pressure of the supercharger inlet. In this mode of operation, the supercharger can serve as an air motor that can provide positive shaft work back to the crankshaft of the engine through the drive belt or other mechanical drive connection between the engine and the supercharger. The second embodiment of the air mass control apparatus is comprised of a two-member first shutter for controlling the flow of an air mass through male air ports and a second shutter for controlling the flow of an air mass through female air ports. The first member of the first shutter and the second shutter are synchronized to simultaneously rotate in opposite directions dictated by the required range of travel of the shutters for the respective air intake ports being controlled and the ratio of the rotor grooves. The first member of the first shutter is synchronized in rotational timing with the second shutter so that both shutters open and close in a coordinated manner. The second member of the first shutter moves with the first member of the first shutter during engine operation conditions requiring air mass provided by 10% to 50% of supercharger displacement. When engine operating power demands more air mass than is provided by 50% supercharger displacement, the first member of the first shutter rotates without movement of the second member of the first shutter, thereby progressively exposing an air flow window in the first member to increase the air mass capacity provided by selecting 50% to 100% supercharger displacement. The male rotor has an air inlet end and an air discharge end. The male rotor air inlet end has generally radial passages that provide access to air mass to mitigate the creation of a small temporary trapped vacuum between the male rotor, the female rotor, and the air inlet end plate during the initiation of the intake phase while maintaining chamber isolation. The supercharged internal combustion engine of both embodiments of the air mass control apparatus employ a positive displacement supercharger or blower that includes a method of supplying the engine with varying amounts of an air mass corresponding to the varying power requirements of the engine. Atmospheric air is drawn into the air inlet chamber of the supercharger by the rotating rotors. A first air mass in the air inlet chamber is transferred through one or more first openings in the air inlet end member to the rotor chamber adjacent the male rotor. A second air mass in the air inlet chamber is transferred through one or more second openings in the air inlet end member adjacent the female rotor. The rotating male and female rotors concurrently move the air masses through the first and second openings to the rotor chamber. The shutters concurrently regulate the amount of the first air mass flowing through the one or more first openings and the amount of the second air mass flowing through the one or more second openings to the rotor chamber by cutting off and trapping the air mass at a desired internal working chamber volume. The male rotor and the female rotor are concurrently rotated in opposite directions responsive to the operating speed of the engine to move regulated amounts of air mass to the engine in accordance with the varying power requirements of the engine.

DESCRIPTION OF THE DRAWING

FIG. 9-A is a perspective view of the distal side of the air inlet member;

FIG. 9-B is a perspective view of the proximal side of the air inlet member;

FIG. 9-C is a perspective view of the proximal side of the air inlet member with ported disk plate in place;

FIG. 18-A is a perspective view of the air outlet ends of the male rotor and the female rotor of FIG. 10;

FIG. 18-B is a proximal view of the supercharger air discharge end member of FIG. 10;

FIG. 37-A is a perspective view of the air outlet ends of the male rotor and the female rotor of FIG. 33;

FIG. 37-B is a proximal view of the supercharger air discharge end member of FIG. 10;

DESCRIPTION OF THE INVENTION

Figure 1:
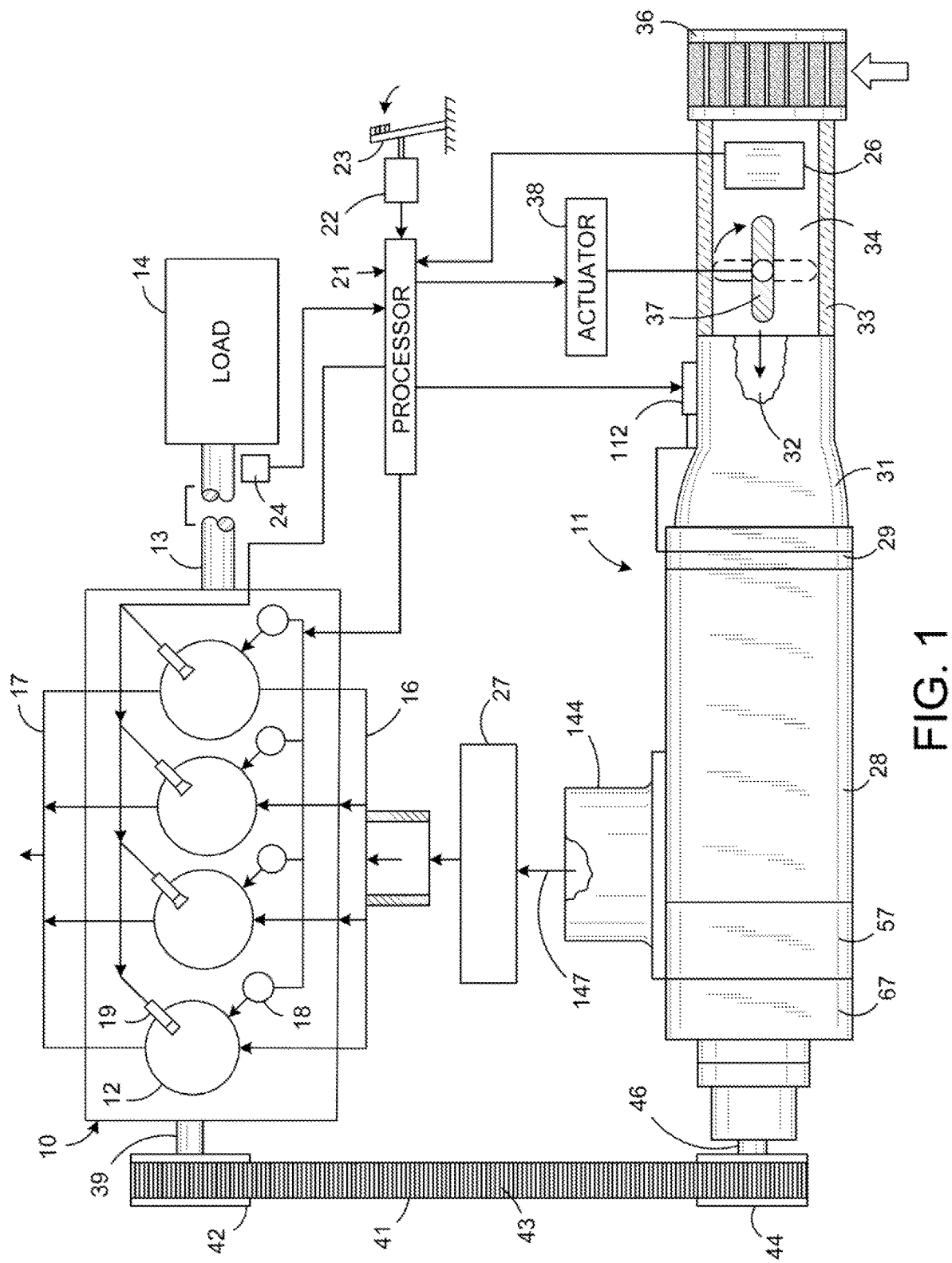
FIG. 1 is a diagram of a supercharged internal combustion engine operatively connected to a supercharger for supplying an air mass to the engine according to the power requirements of the engine.
Figure 2:
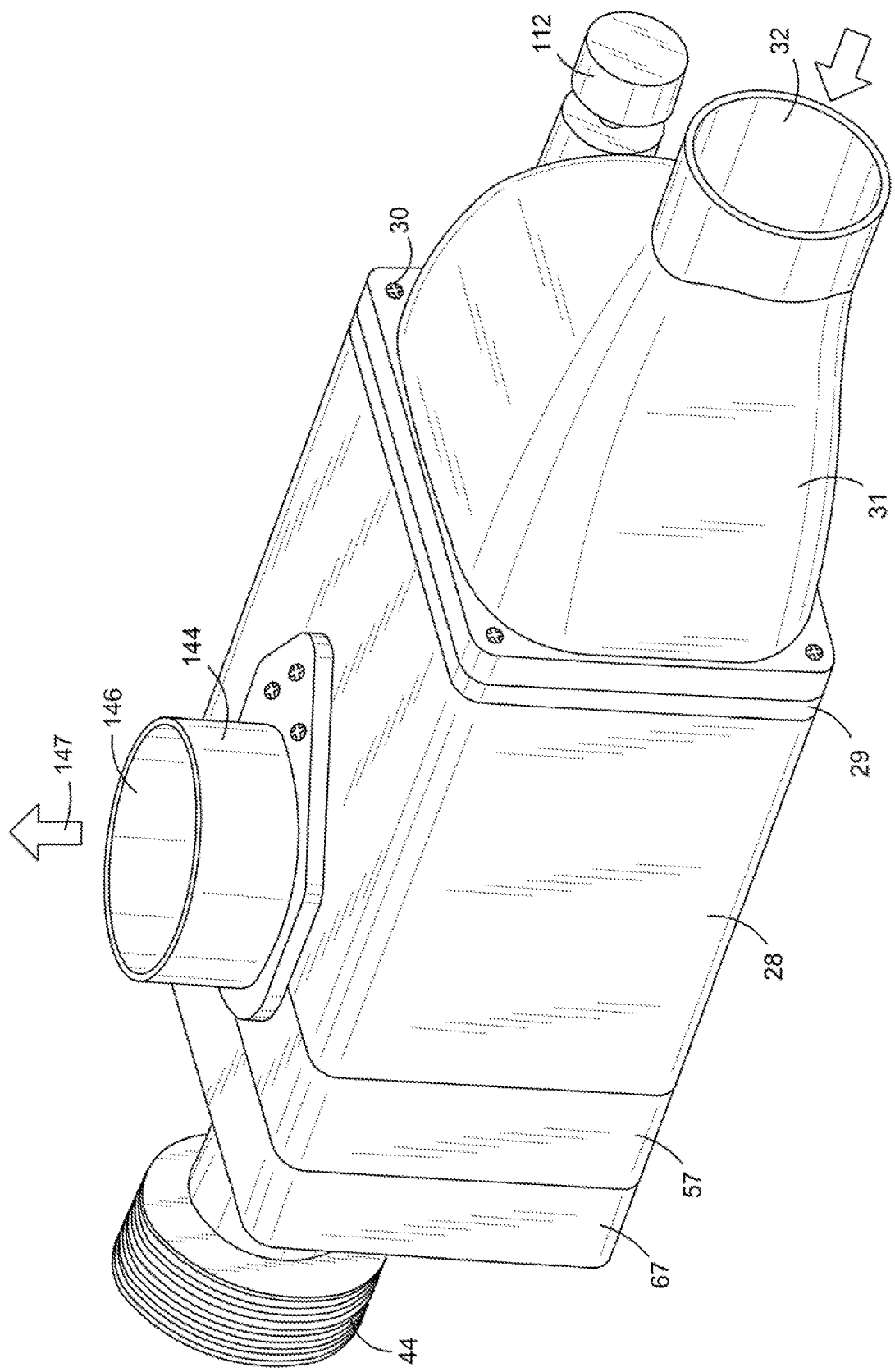
FIG. 2 is an enlarged perspective view of the supercharger shown in FIG. 1.
Figure 3:
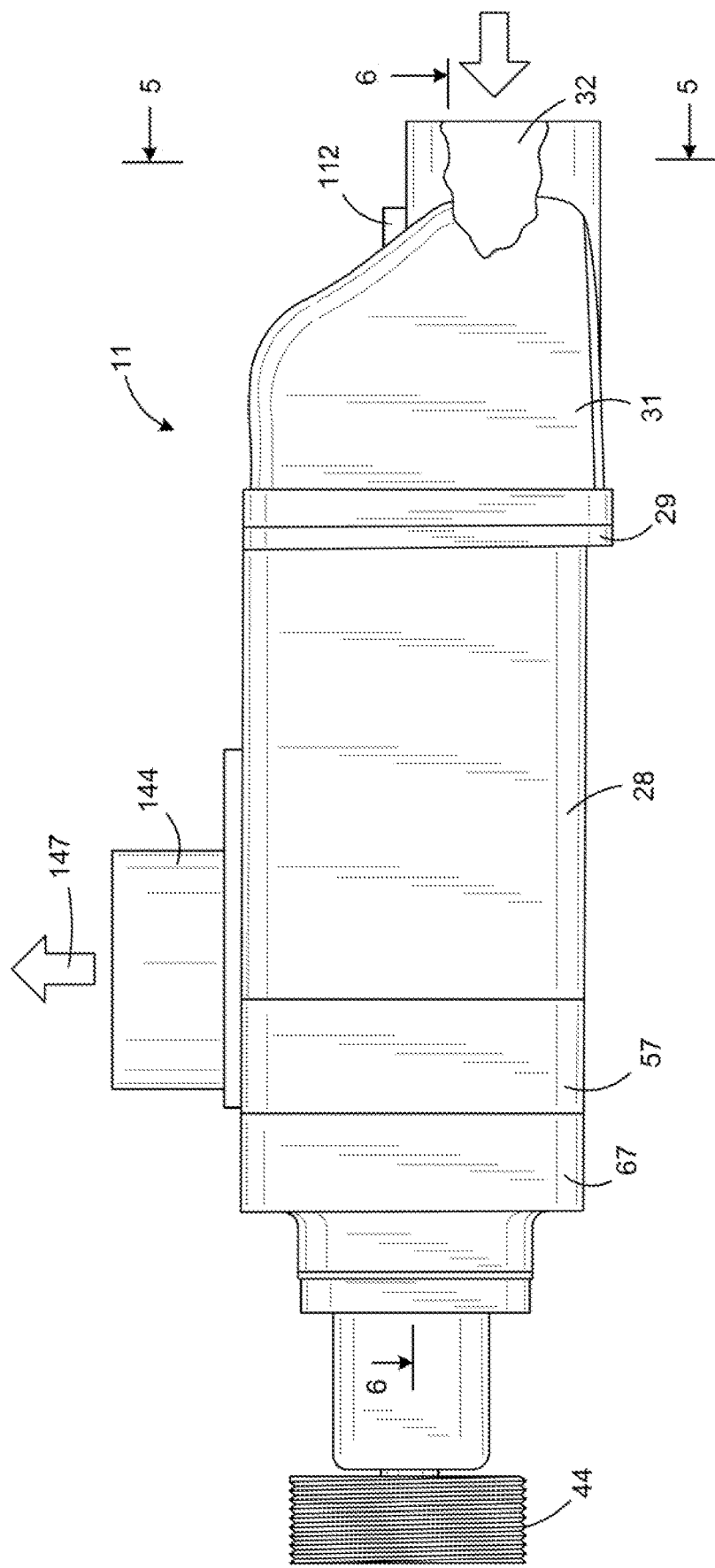
FIG. 3 is a left side elevational view of the supercharger of FIG. 2.
Figure 4:
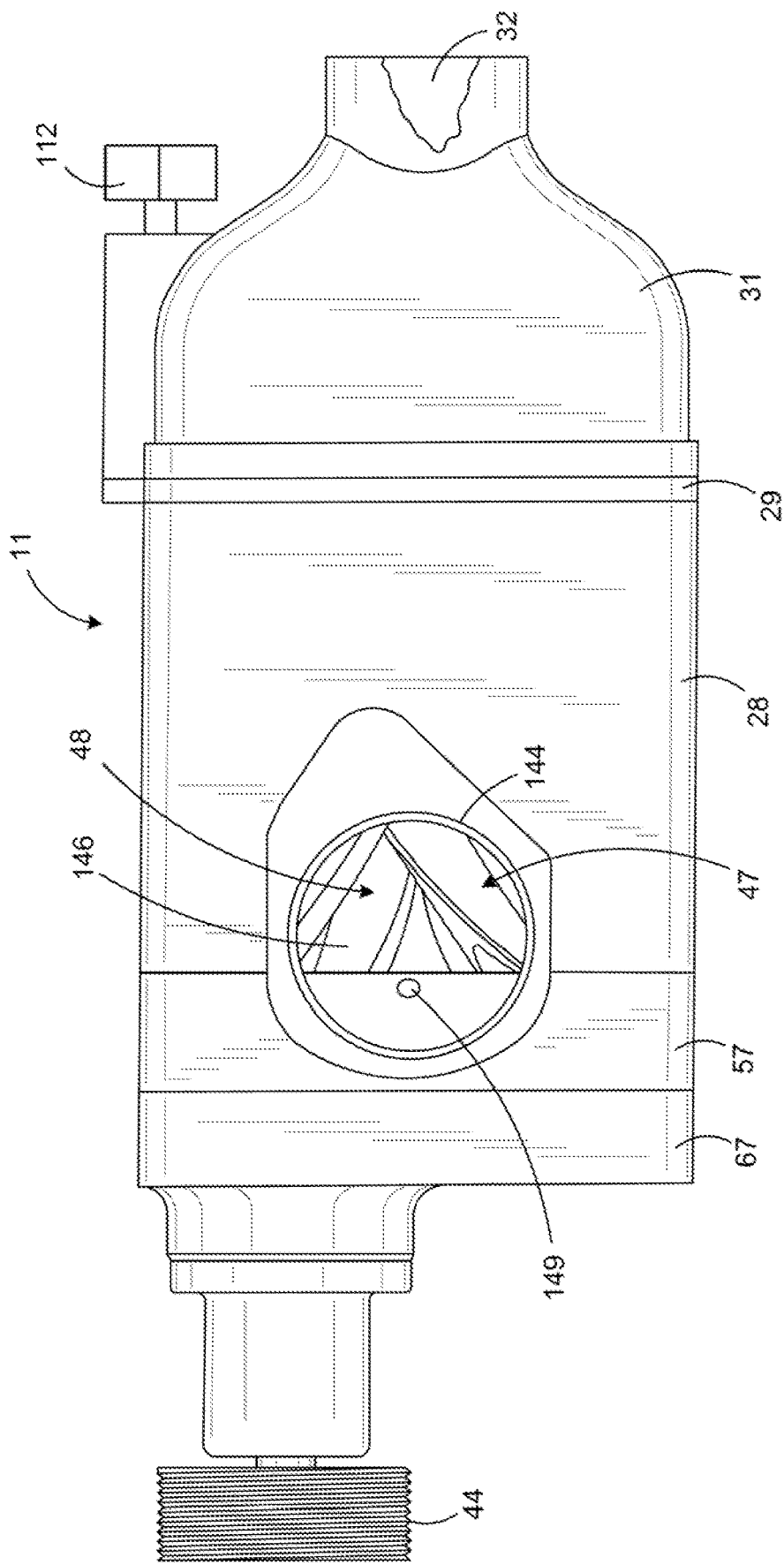
FIG. 4 is a top plan view of FIG. 3.
Figure 5:
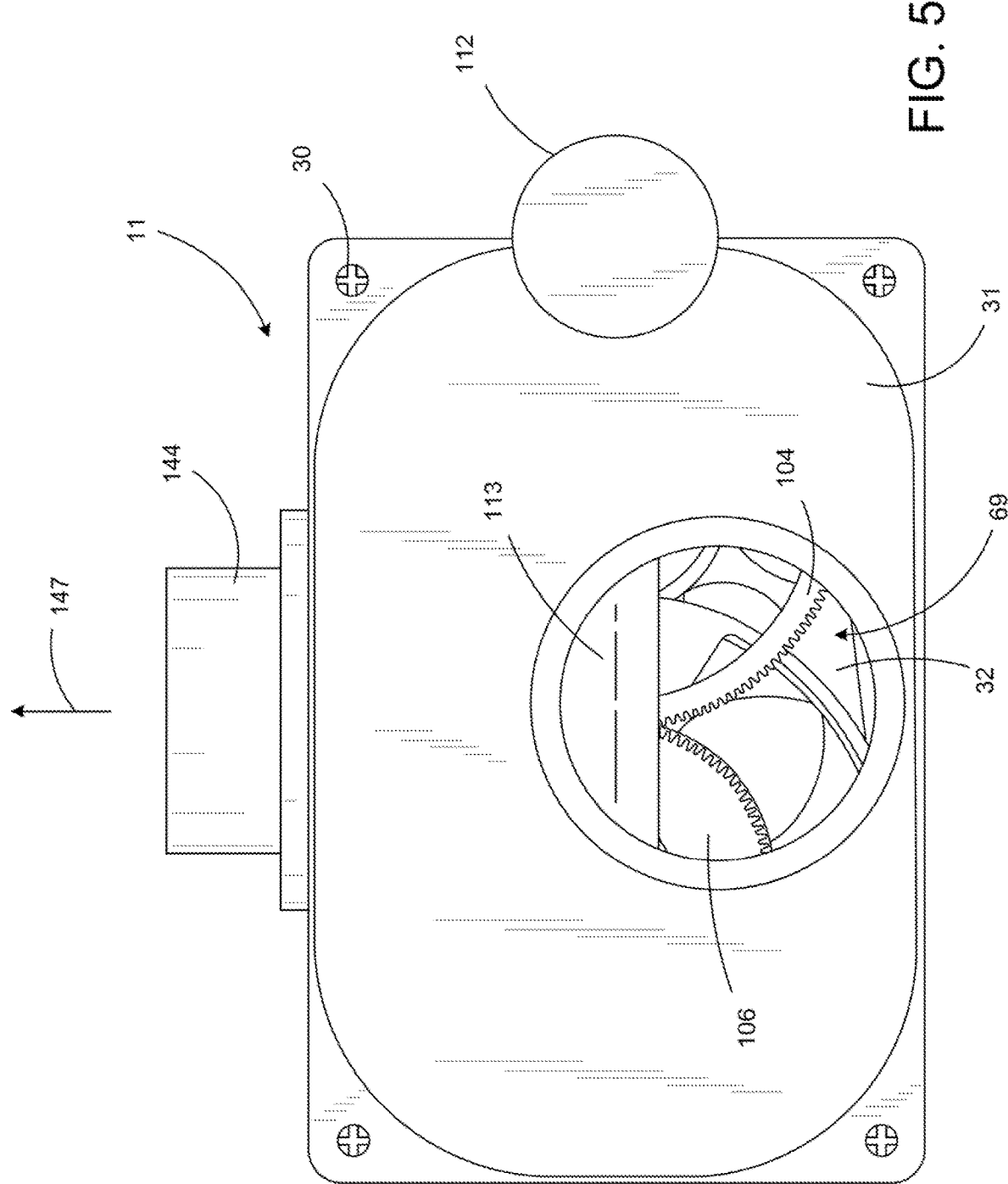
FIG. 5 is an enlarged sectional view taken along line 5-5 of FIG. 3.

A supercharged internal combustion engine 10, illustrated in FIG. 1, is drivably connected to a supercharger 11 operable to continuously supply varying amounts of an air mass to an internal combustion engine 10 in response to the varying power requirements of engine 10. Supercharger 11 varies the air mass flow delivered to engine 10 by controlling the amount of air mass drawn into the air inlet of supercharger 11 under boost conditions. The energy required to operate supercharger 11 is reduced in that only the air mass required by engine 10 at any given load condition is taken in, trapped and later compressed. Internal combustion engine 10 is a conventional internal combustion engine having a block with four cylinders 12 accommodating pistons connected to a crankshaft (not shown) to rotate a drive shaft 13. Engines with more or less cylinders can be drivably connected to supercharger 11. Drive shaft 13 is connected to a load 14, such as a transmission to direct power to the drive wheels of a motor vehicle. Load 14 can be an electric generator, a hydraulic pump or other machinery that requires a mechanical power supply. Engine 10 has an air intake manifold 16 for directing a mass of air to each of cylinders 12. Exhaust gases generated by engine 10 are discharged through an exhaust manifold 17 to an exhaust gas treatment device and released to atmosphere. Any liquid fuel, such as gasoline, natural gas, or hydrogen, etc. is introduced into cylinders 12 with fuel injectors 18 or carburetor and other fuel induction structures. Spark igniters 19 associated with cylinders 12 are operable to initiate ignition of the air mass/fuel mixture in cylinders 12. Each igniter 19 is wired to a processor 21 that includes an electronic signal controller operable to cause igniter 19 to generate electric arcs which cause the air mass/fuel to burn in timed sequences in cylinders 12. A control device 22 coupled to a foot pedal 23 is used to provide processor 21 with operator demand signals responsive to actuation of foot pedal 23 by the operator of the engine 10 to increase or decrease the power output of engine 10. Other types of controls including operator hand devices and automatic speed controls can be used to provide control signals to processor 21. A device 24 associated with drive shaft 13 and load 14 provides processor 21 with signals or electric information regarding the speed and rotational position of shaft 13 and the power requirements of load 14. Processor 21 is an electronic control unit that receives data relating to engine control parameters, including engine speed, air intake manifold pressure, engine torque, and ambient air temperature and air pressure. An air mass sensor 26 is typically interposed in air inlet passage 34 and wired to processor 21. Air mass sensor 26 generates air mass data or signals that are transmitted to processor 21 which incorporates the air mass flow rate signals in the program that controls the operation of supercharger 11.

Figure 6:
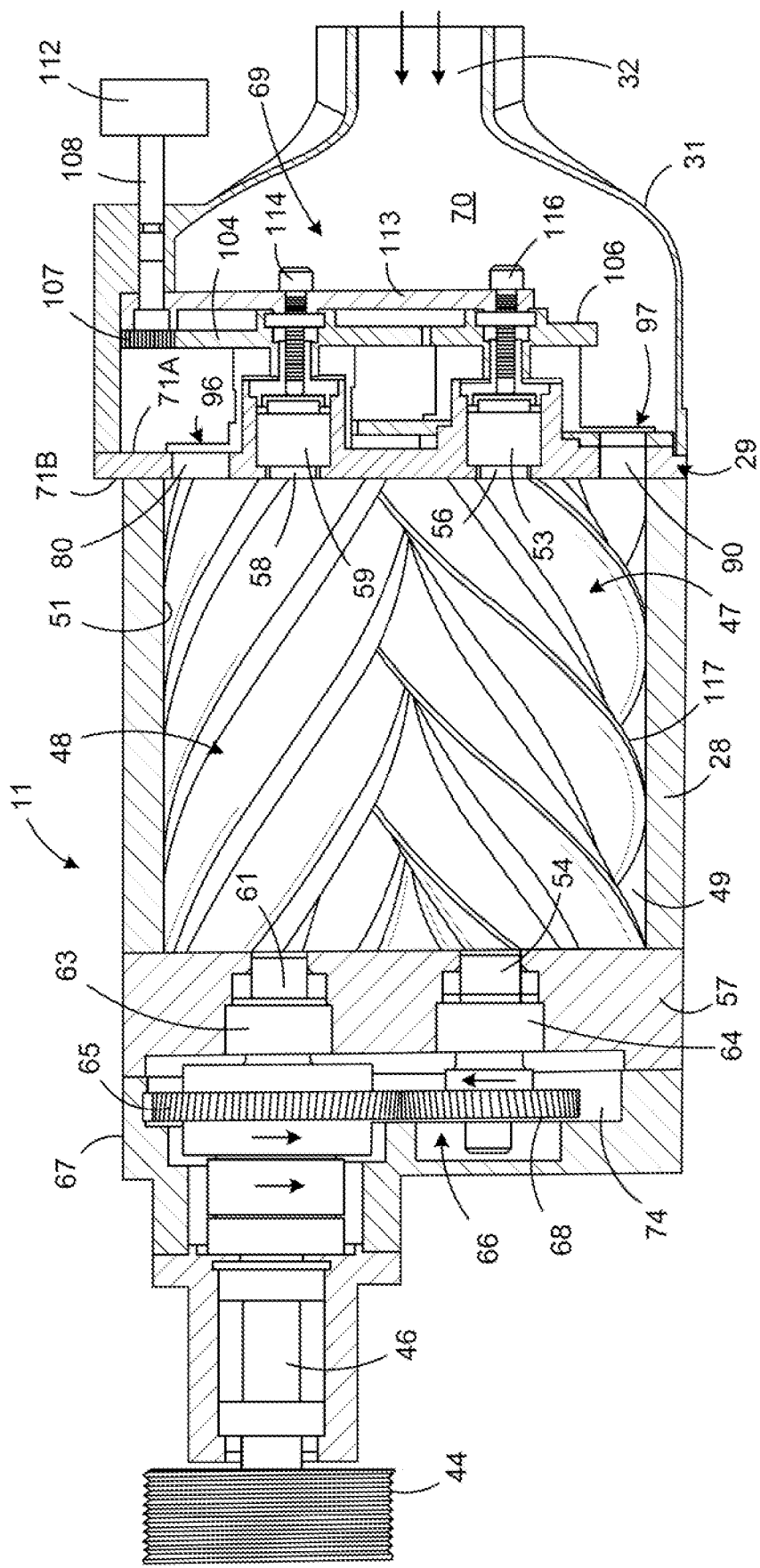
FIG. 6 is a sectional view taken along line 6-6 of FIG. 3.

Supercharger 11, shown in FIG. 6, has a main body or housing 28 having an internal chamber or bore 49 accommodating rotors 47 and 48. Rotors 47 and 48 each have an air inlet end and an air outlet end. An air inlet member or plate 29 is located in engagement with the air inlet end of housing 28. An inlet manifold or casing 31 is secured with fasteners or bolts 30 to air inlet member 29. As shown in FIG. 1, a tubular member or sleeve 33 attached to casing 31 has a passage 34 to allow an atmospheric air mass to flow into interior chamber 32 of casing 31. An air filter 36 is releasably attached to sleeve 33. A butterfly valve 37 located in passage 34 pivotally mounted on sleeve 33 is operably connected to an actuator 38. Actuator 38 can be an electric controller operable by processor 21 to move butterfly valve 37 between an open position and a substantially closed position to regulate the flow of an air mass in passage 34 during engine intake manifold pressures below atmospheric conditions. In use, butterfly valve 37 is in the open position allowing an air mass to flow through passage 34 into interior chamber 32 of casing 31. In the event that the operator desires less power than engine 10 produces when the shutters 96 and 97 are located at the minimum air mass flow positions, processor 21 signals actuator 38 to control butterfly valve 37 to restrict the flow of the air mass into supercharger 11 thereby limiting the amount of air mass directed to engine 10. The power of engine 10 is reduced in response to the limited air mass supplied to engine 10.

Butterfly valve 37 in its substantially closed position also functions to regulate the idle conditions of engine 10.

Engine 10 has a front drive shaft 39 that rotates during the operation of engine 10. Front drive shaft 39 is operatively connected to a power transmission mechanism 41 that drivably couples engine 10 to supercharger 11. Power transmission mechanism 41 includes a drive pulley 42 secured to front drive shaft 39 and an endless chain or belt 43 trained around pulley 42 to transmit power to a driven pulley 44 connected to supercharger drive shaft 46. Power transmission mechanism 41 turns or rotates supercharger drive shaft 46 in direct relationship with the operating speed of engine 10 and is typically a simple fixed-ratio drive. Other power transmitting mechanisms including a gear train drive or a magnetic coupling or clutch can be used to drivably couple engine front draft shaft 39 to supercharger drive shaft 46. A separate power unit, such as an electric motor or hydraulic fluid operated motor, can also be used to operate supercharger 11 in lieu of power transmission mechanism 41.

Figure 7:
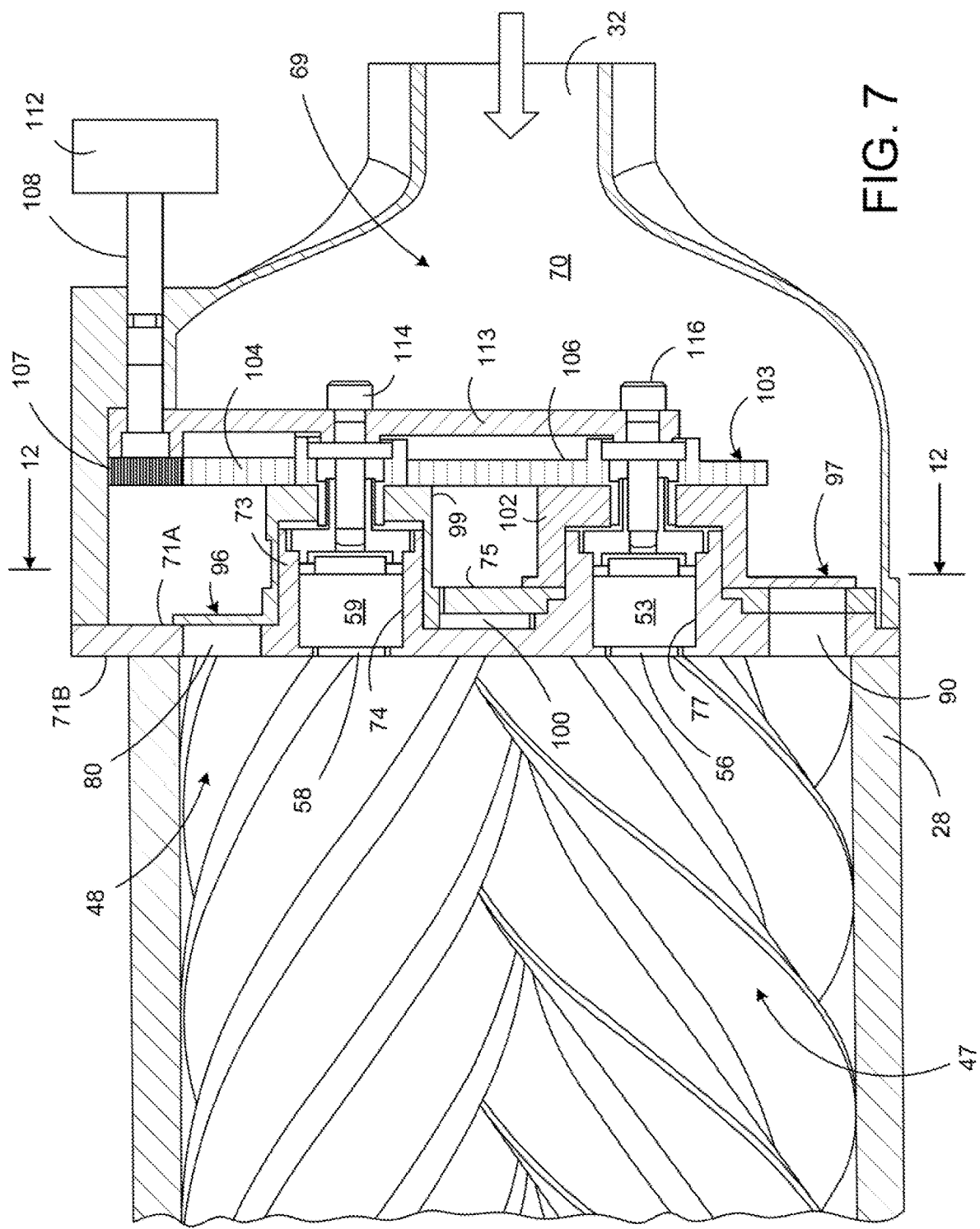
FIG. 7 is an enlarged sectional view of the air inlet end of FIG. 6.
Figure 10:
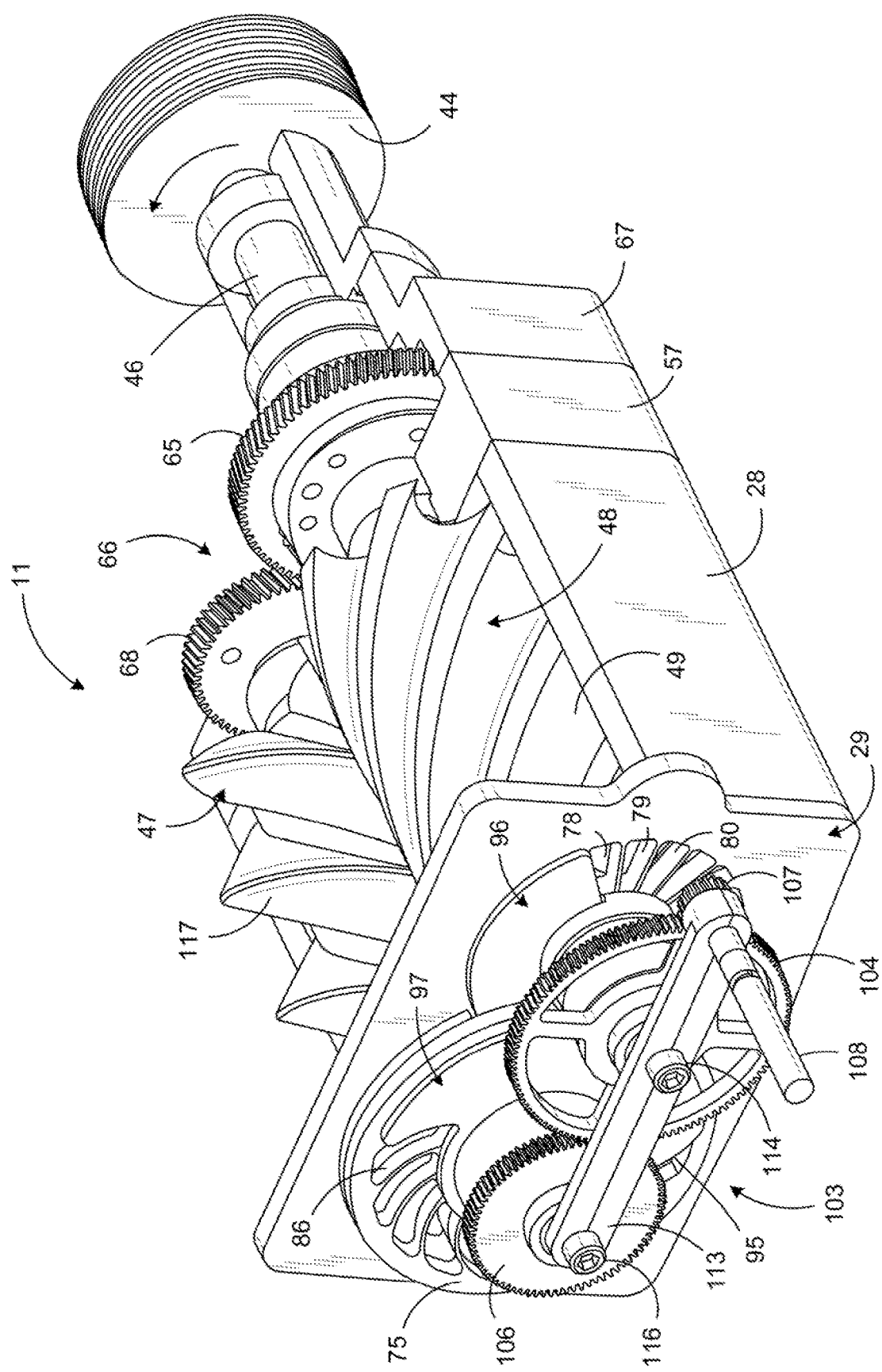
FIG. 10 is a perspective view, partly sectioned, of the air inlet end member and shutters positioned to control a maximum volume of air mass flow into the chamber of the housing containing the rotors.
Figure 11:
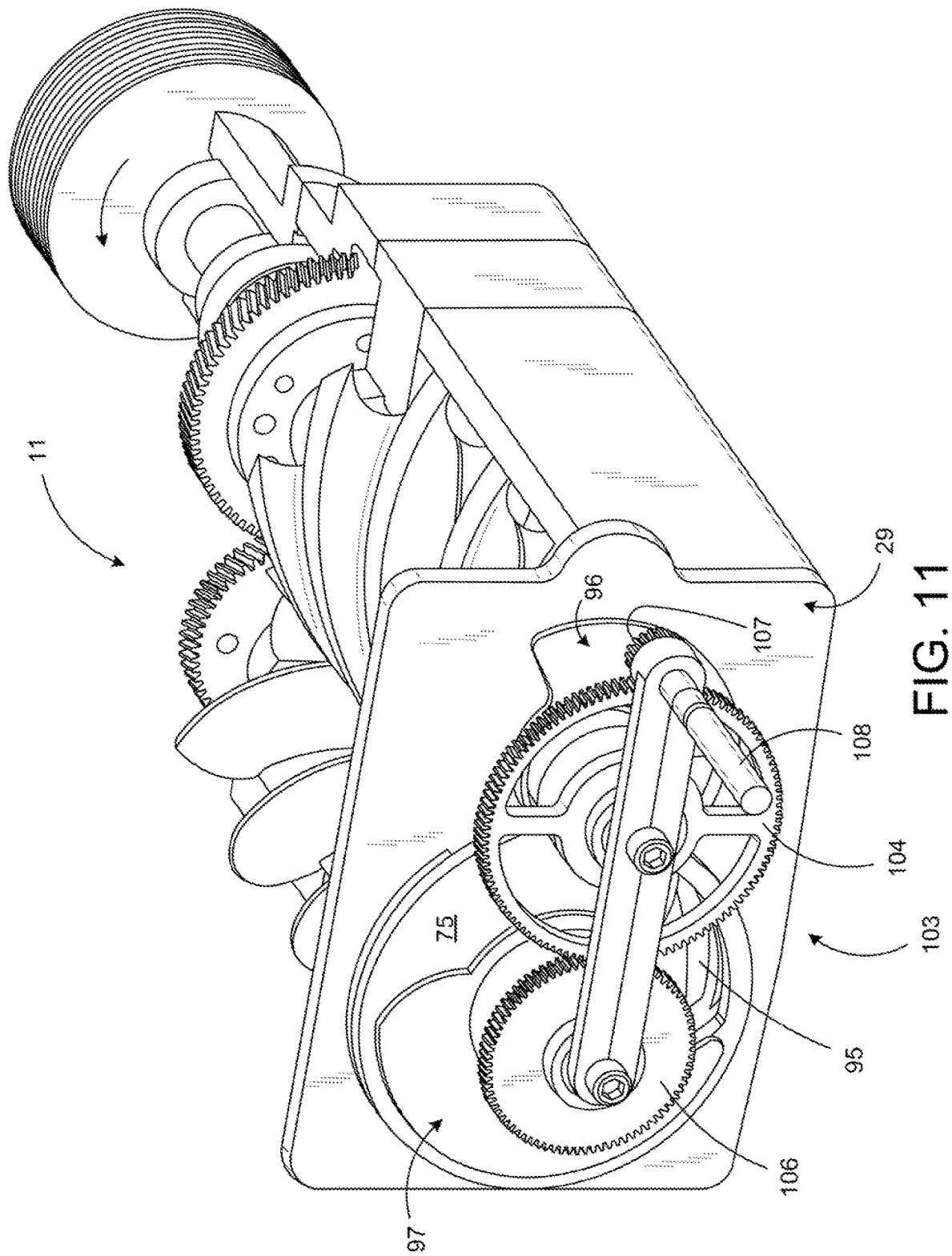
FIG. 11 is a perspective view, partly sectioned, of the air inlet member and shutters positioned to control a minimum volume of air mass flow into the chamber of the housing containing the rotors.
Figure 19:
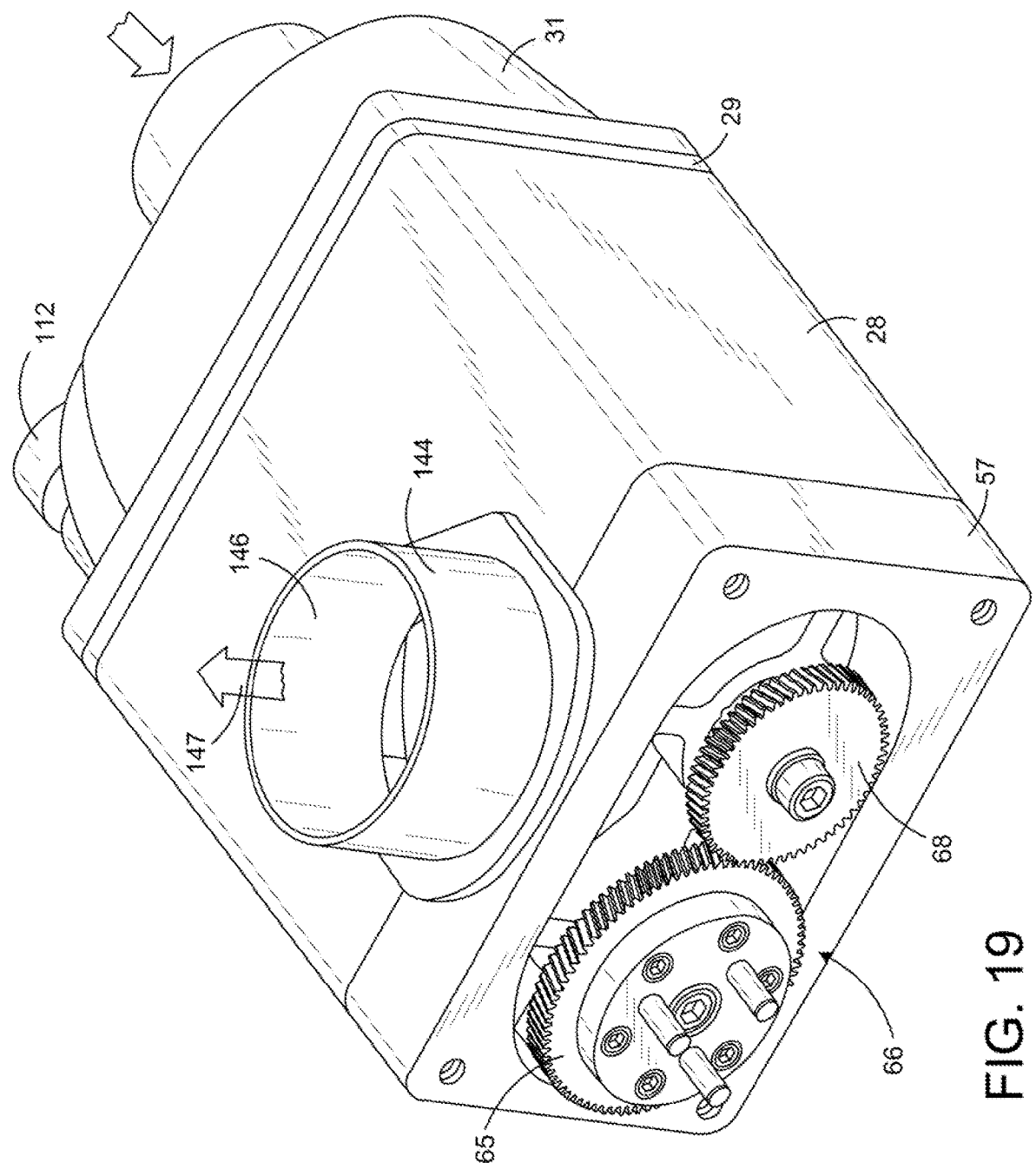
FIG. 19 is a perspective view of the supercharger showing the power transmission for rotating the male rotor and the female rotor.
Figure 20:
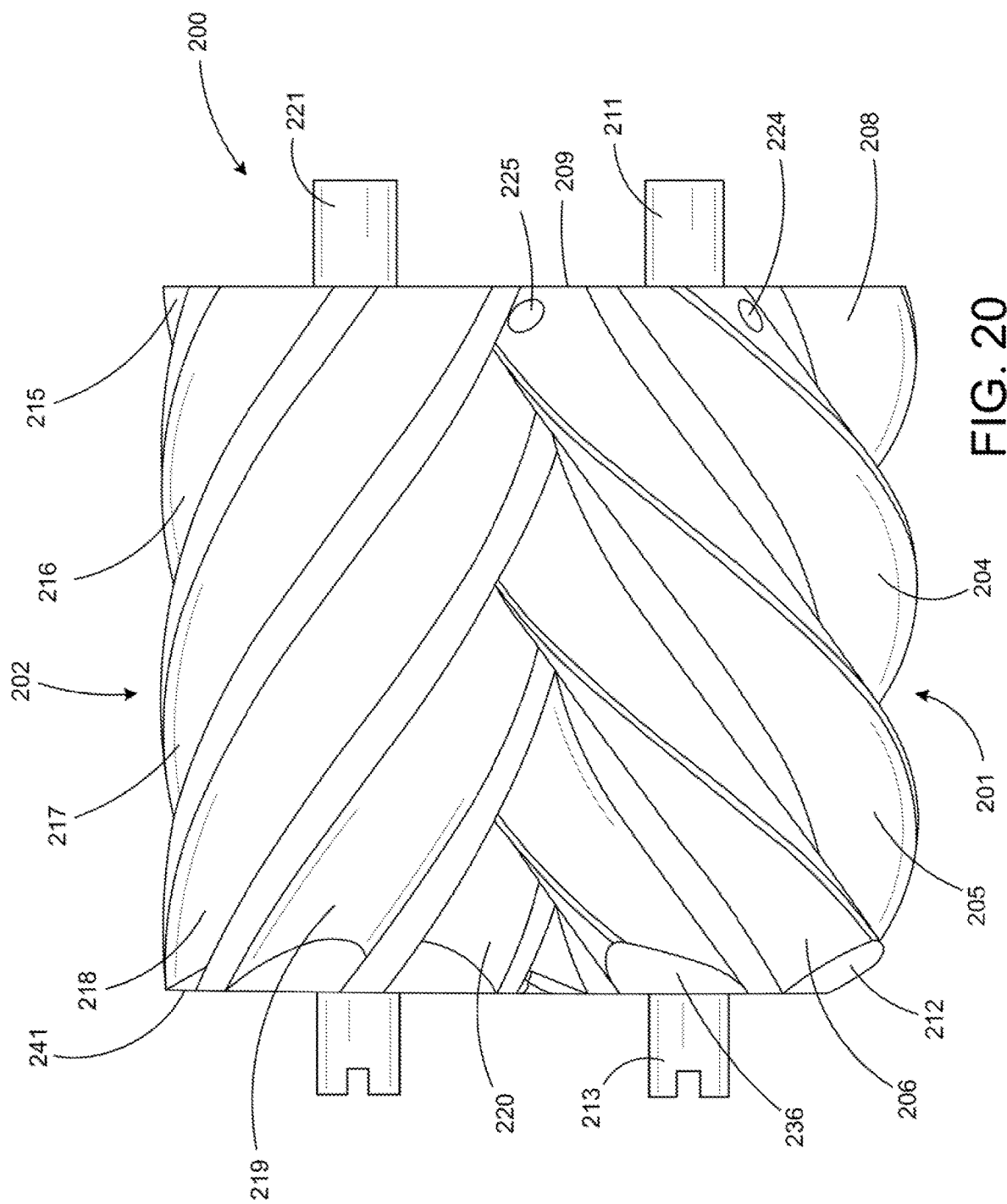
FIG. 20 is a top plan view of a second embodiment of the male rotor and the female rotor for the supercharger.
Figure 21:
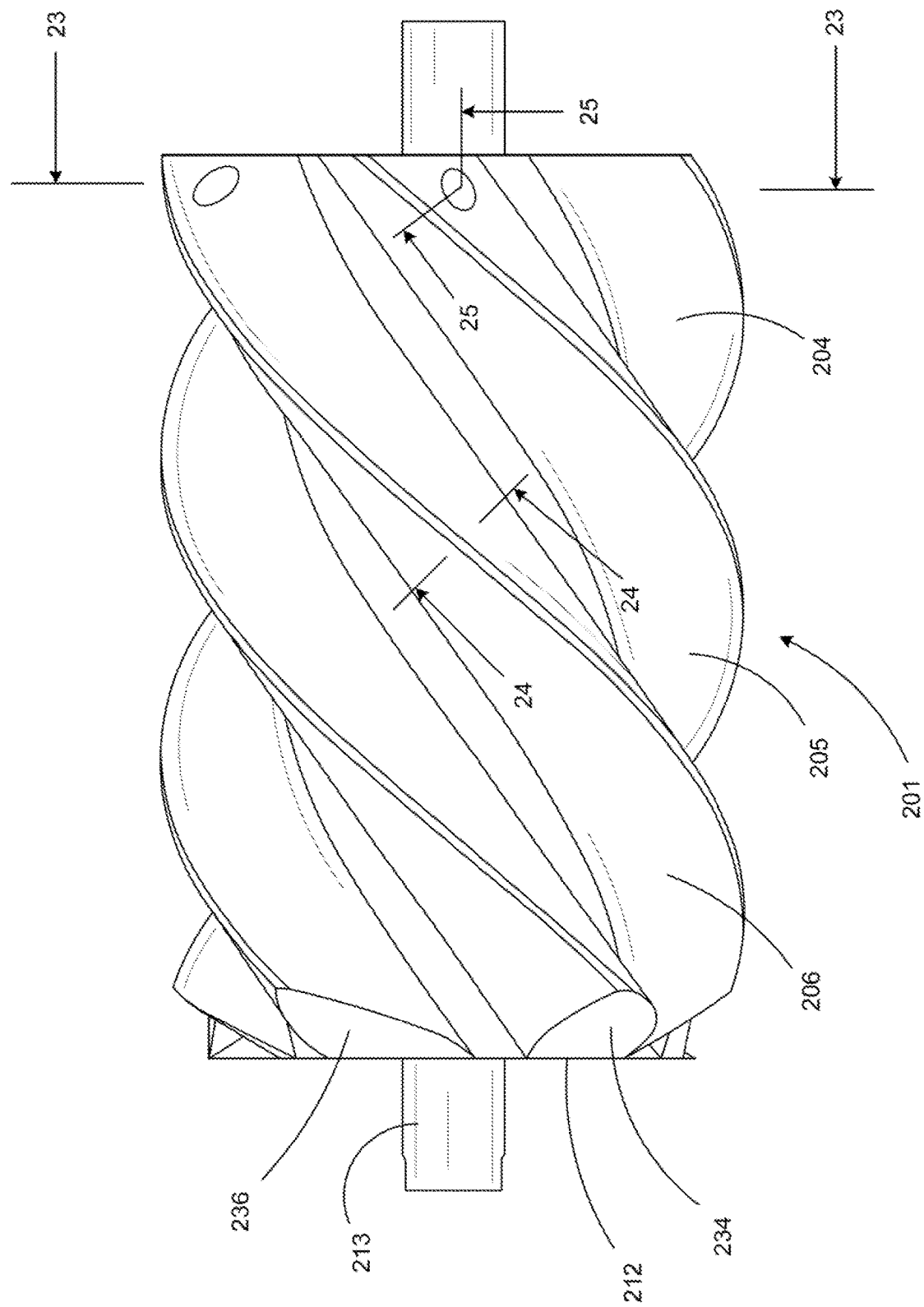
FIG. 21 is a side view of the male rotor of FIG. 20.
Figure 22:
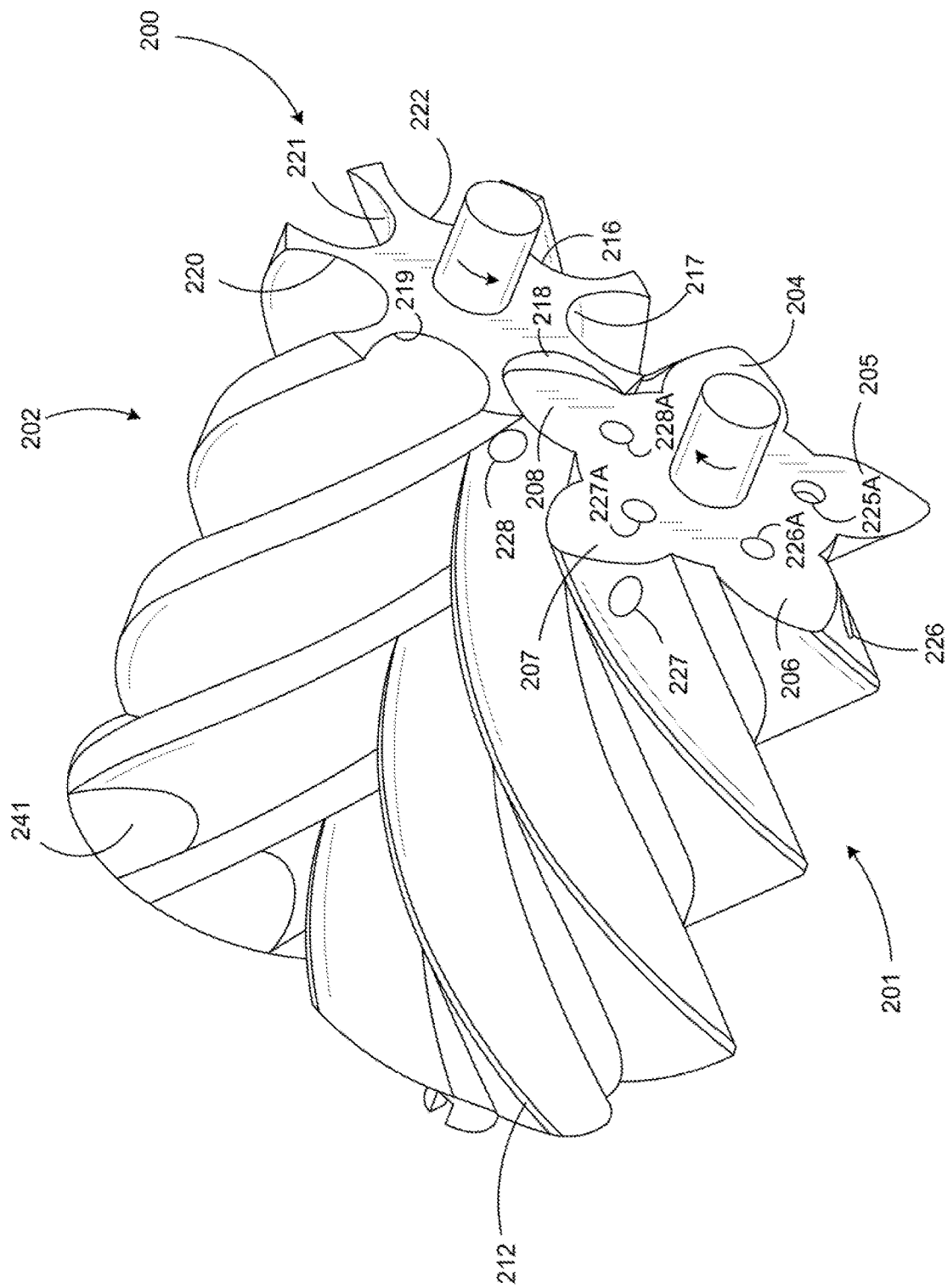
FIG. 22 is a perspective view of the air inlet ends of the male rotor and the female rotor of FIG. 20.
Figure 23:
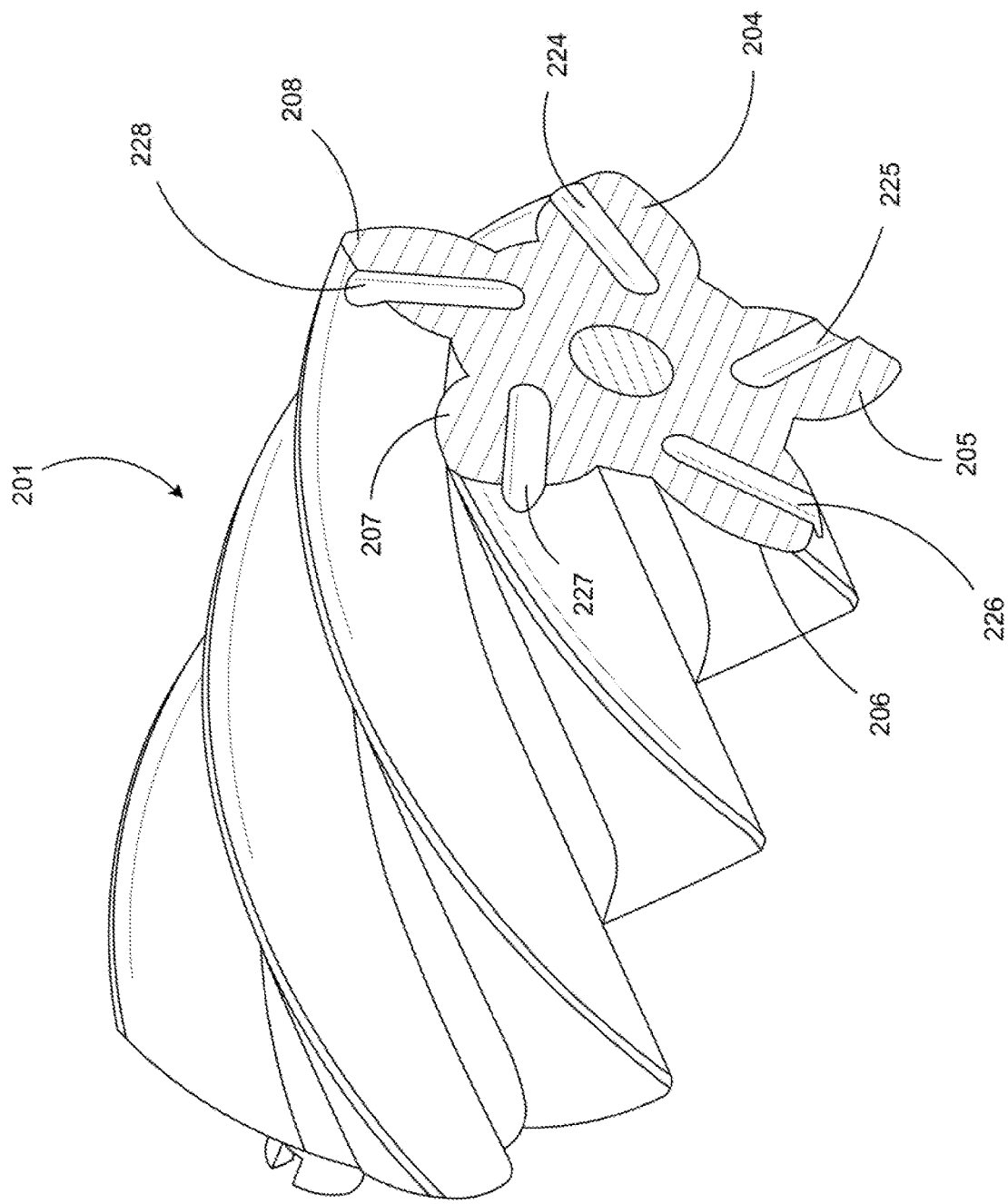
FIG. 23 is a perspective sectional view taken along line 23-23 of FIG. 21.

As shown in FIGS. 6 and 7, supercharger 11 has a helical male rotor 47 and a helical female rotor 48 rotatably located within a chamber 49 surrounded with an internal bore 51 of housing 28. Bore 51 has two intersecting cylindrical walls contiguous with the outer ridges of rotors 47 and 48. The air inlet end of male rotor 47 has a first shaft 56 retained by a bearing 53 on air inlet member 29. The air outlet end of male rotor 47 has a second shaft 54 axially aligned with first shaft 56. A bearing 64 supports second shaft 54 on air outlet member 57. The air inlet end of female rotor 48 has a first shaft 58 retained by a bearing 59 on air inlet member 29. The opposite end of female rotor 48 has a second shaft 61 surrounded by a bearing 63 mounted on air outlet member 57. Second shaft 61 is coupled to drive shaft 46 whereby female rotor 48 is rotated by engine 10. A power transmission 66 drivably connects drive shaft 46 and female rotor shaft 61 to shaft 54 of male rotor 47 whereby male rotor 47 concurrently rotates with female rotor 48 to move an air mass through chamber 49 of housing 28. Male rotor 47 and female rotor 48 rotate in opposite directions about parallel axial axes. Power transmission 66 comprises a first spur gear 65 secured to shaft 54 of male rotor 47 and a second spur gear 68 secured to shaft 61 of female rotor 48. As shown in FIGS. 10, 11 and 19, gear 68 has a diameter larger than the diameter of gear 65 whereby male rotor 47 rotates faster than female rotor 48. A cover 67 attached to air outlet member 57 and shaft seals confines power transmission 66 to an enclosed chamber 74 to protect power transmission 66 from exterior environmental elements.

Figure 8:
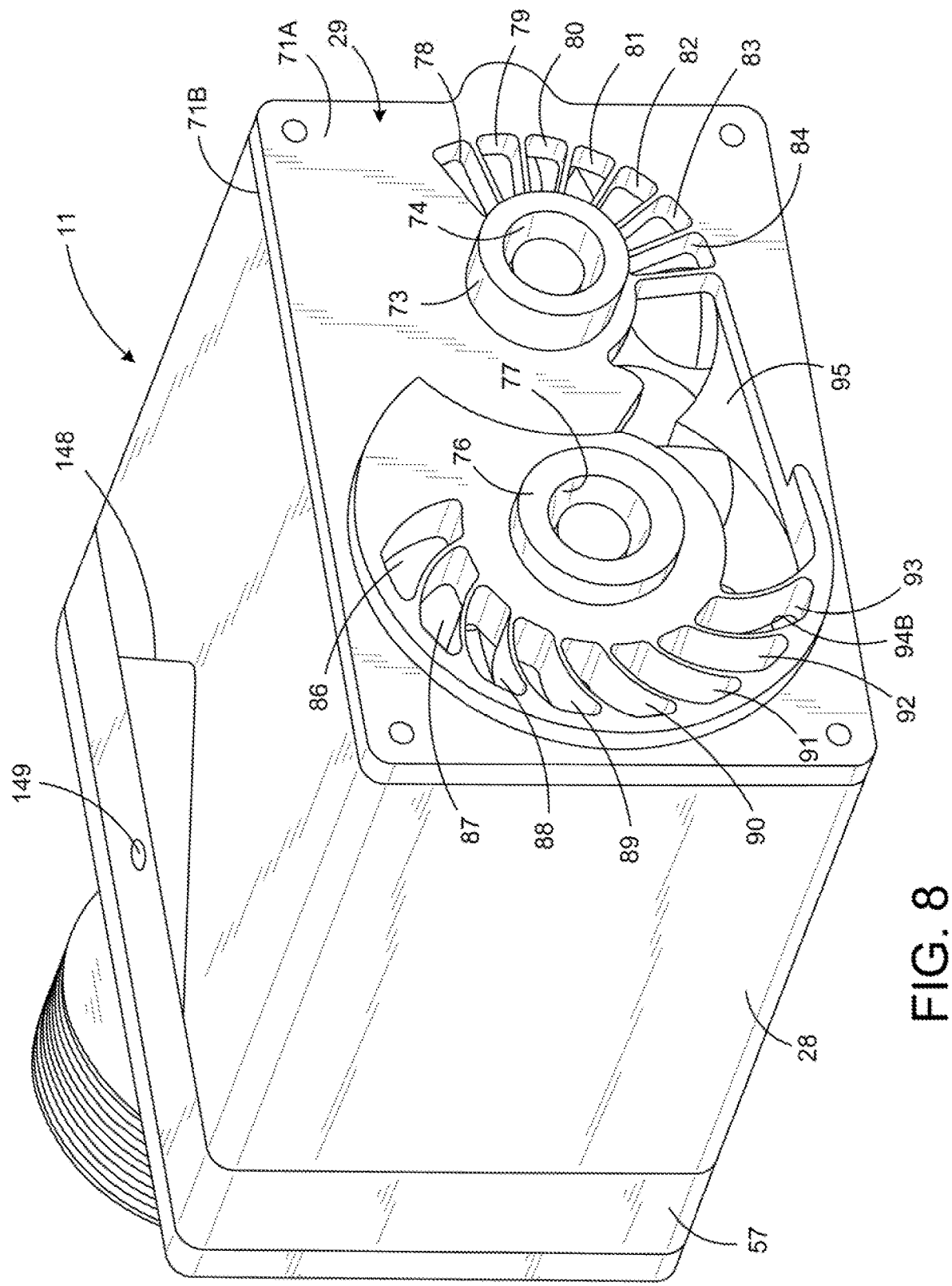
FIG. 8 is an enlarged perspective view of the proximal side of the air inlet member attached to the housing of the supercharger.

As shown in FIGS. 6, 7, 10 and 11, an air mass control apparatus 69 for supercharger 11 is located within the vestibule 70 of casing 31. Air mass control apparatus 69 determines the cutoff volume of an air mass that flows through air inlet member 29 into rotors 47 and 48 according to the varying demands of the power desired of engine 10 at varying engine loads. Air inlet member 29 has a flat front surface 71A and a flat rear surface 71B. As shown in FIGS. 7, 8, and 9, arcuate plate 75 is secured to air inlet member 29. Plate 75 has a front surface 75A laterally spaced from front surface 71A of member 29. Surfaces 71A and 75A are stepped offset surfaces that allow shutter 96 to rotate into space or pocket 100 beneath plate 75 during simultaneous full-travel rotations of shutters 96 and 97. A first cylindrical tubular boss 73 extended away from surface 71A has an opening 74 accommodating bearing 59 for female rotor shaft 58. A second cylindrical tubular boss 76 extended away from surface 71A has an opening 77 accommodating bearing 53 for male rotor shaft 56. Proceeding to FIGS. 8 and 9, air inlet member 29 has a first plurality of holes, ports or openings 78, 79, 80, 81, 82, 83 and 84 located in a semi-circle relative to boss 73 and female rotor shaft 58. Each opening 78 to 84 has the same generally rectangular inwardly tapered shape and a radial length corresponding to the radial grooves on female rotor 48. Openings 78 to 84 are circumferentially spaced apart with generally radial walls 94B and axially aligned with the open air inlet ends of the grooves of female rotor 48. The number, size, shape and circumferential arrangement of openings 78 to 84 can vary in use. Openings 78 to 84 selectively allow an air mass to flow from vestibule 70 into the grooves of female rotor 48. Air inlet member 29 and arcuate plate 75 have a second plurality of holes or openings 86, 87, 88, 89, 90, 91, 92 and 93 located in a semi-circle relative to opening 77 and male rotor shaft 56. A 180 degree semi-circle is an example of the arcuate arrangement of openings 86 to 93. Each opening 86 to 93 has a counterclockwise curved rectangular shape as shown in FIG. 8. Adjacent openings are separated with radial walls 94B that confine the air mass flow through openings 86 to 93. Adjacent openings 86 to 93 have the same size and shape and are circumferentially spaced apart. Openings 86 to 93 are axially aligned with the air inlet ends of the vanes of male rotor 47. The number, size, shape and circumferential arrangement of openings 86 to 93 can vary. A bottom opening 95 is located between openings 84 and 93.

Figure 12:
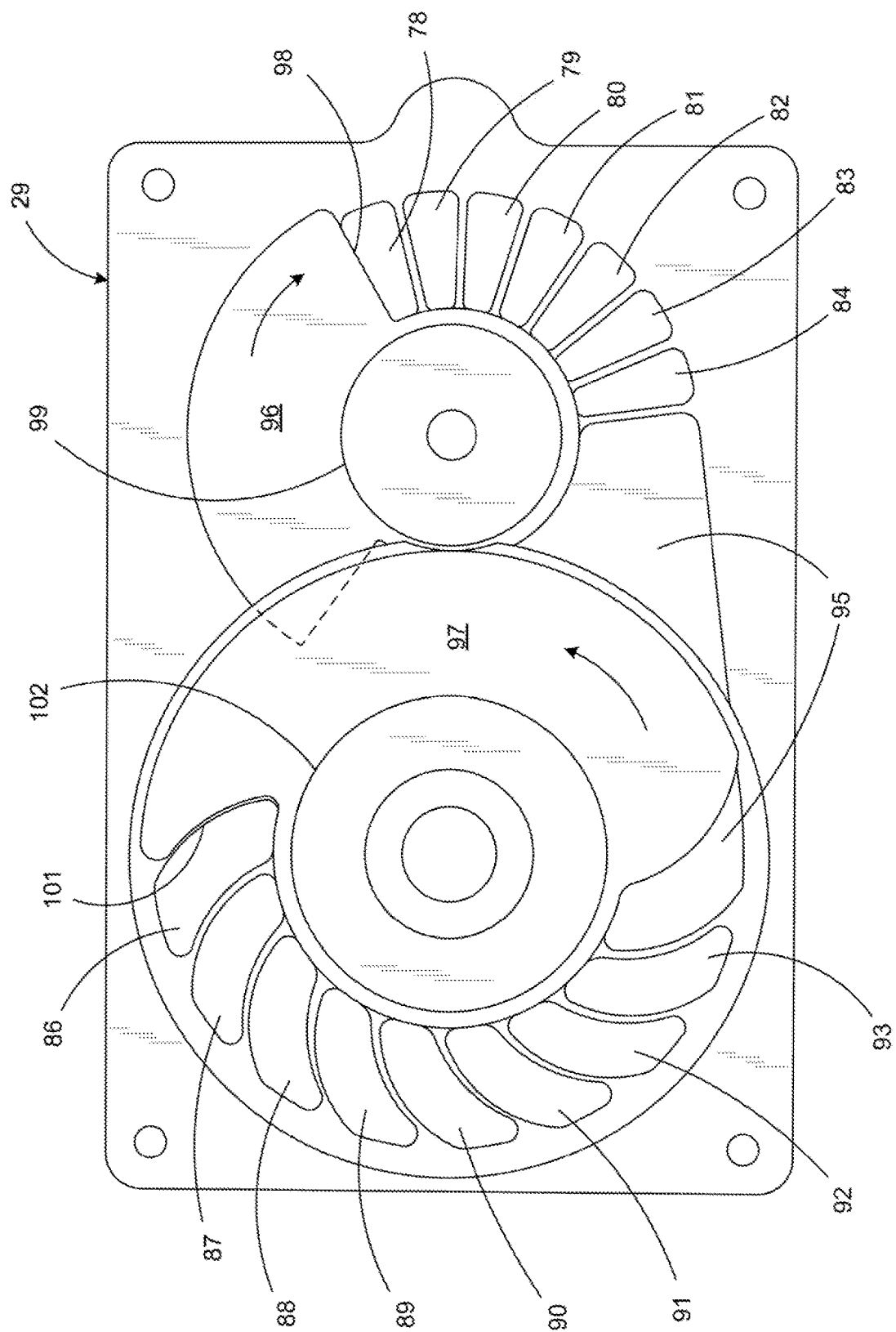
FIG. 12 is an enlarged sectional view taken along line 12-12 of FIG. 7 shown without the gear train or rotors to allow a clear view of the intake port openings.
Figure 13:
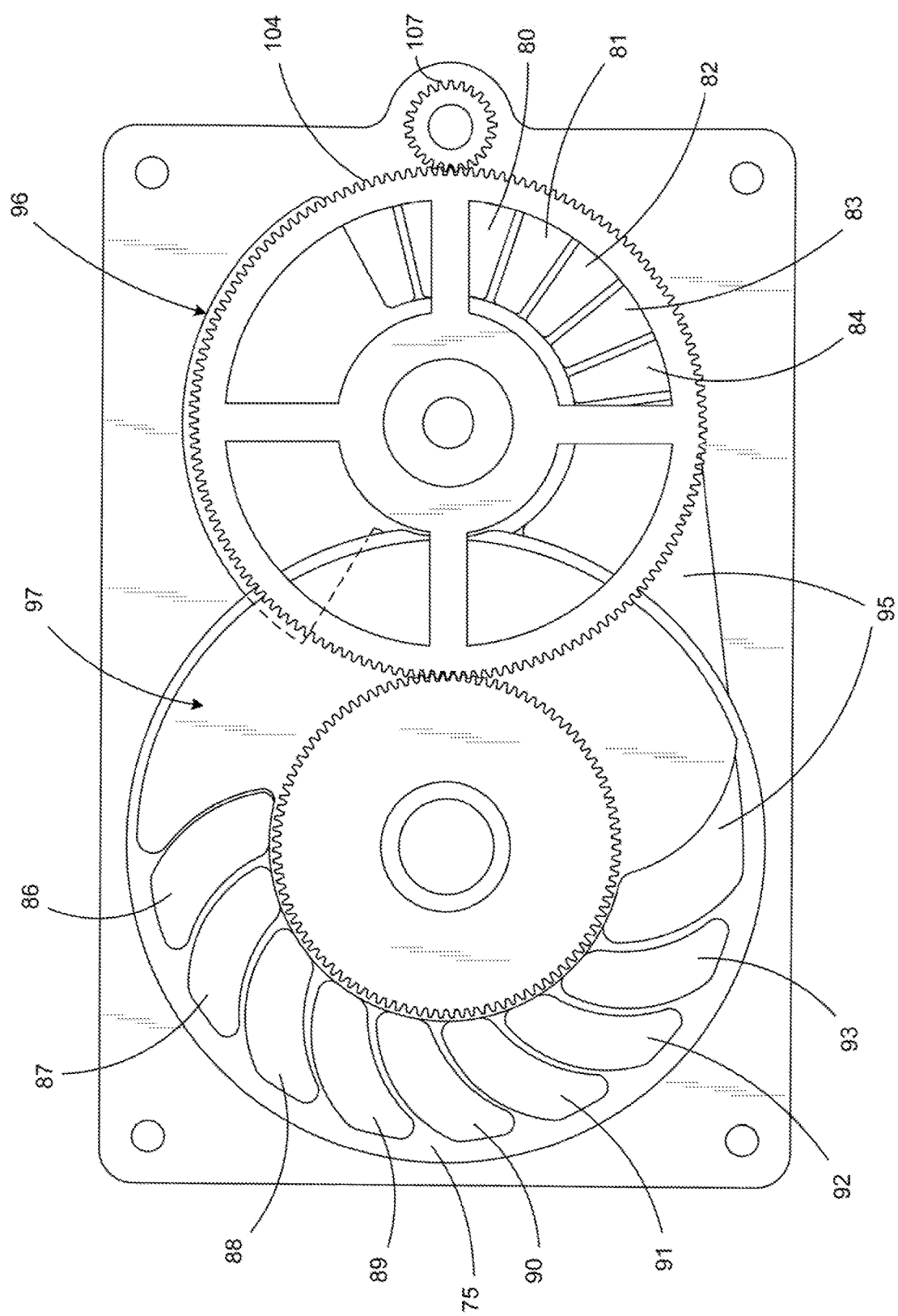
FIG. 13 is a sectional view of FIG. 12 shown with the gear train positioning the shutters in the open positions allowing the maximum air mass flow into the supercharger.
Figure 14:
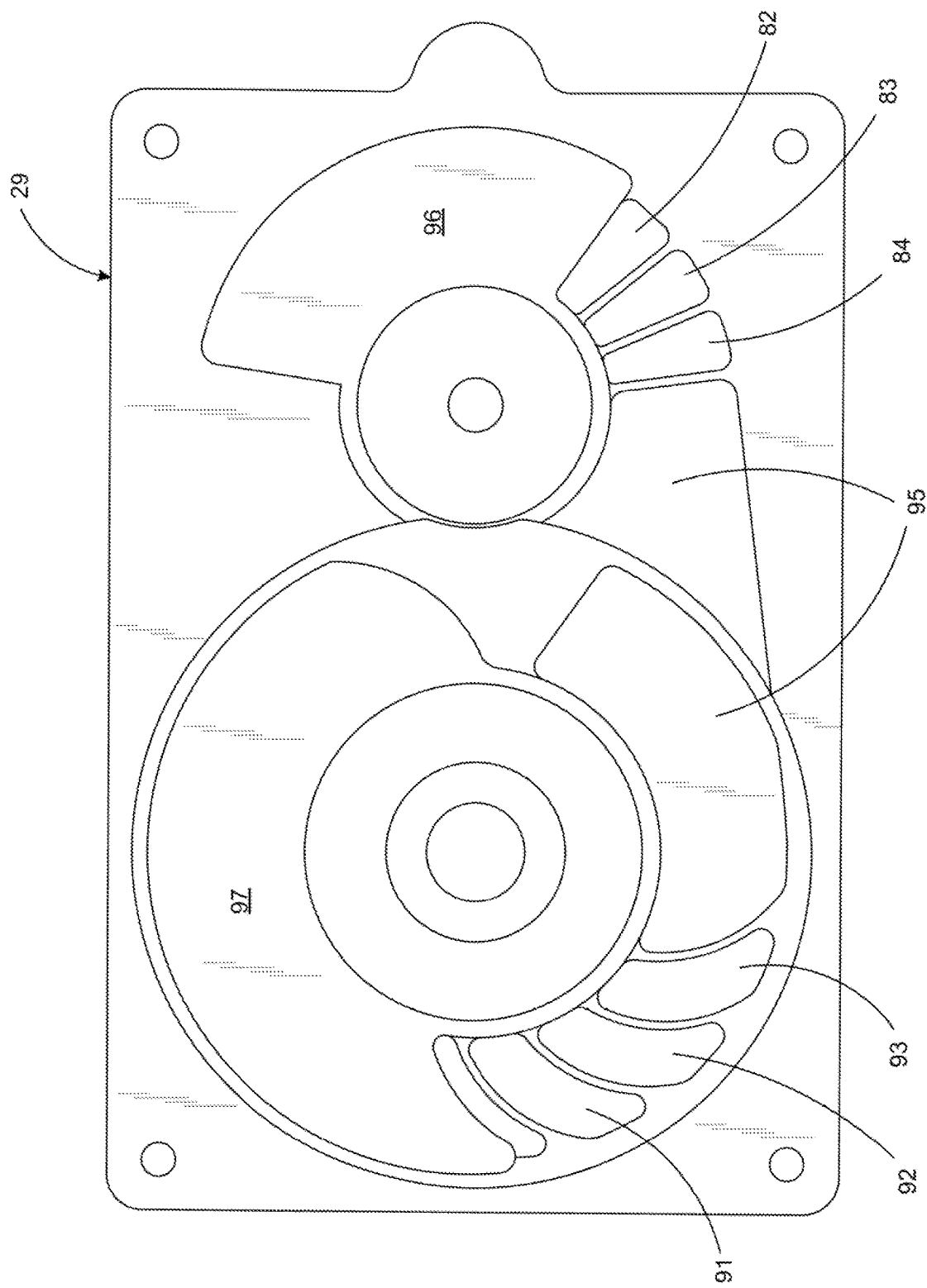
FIG. 14 is a sectional view of FIG. 12 showing the shutters in partially closed positions reducing air mass flow into the supercharger.
Figure 15:
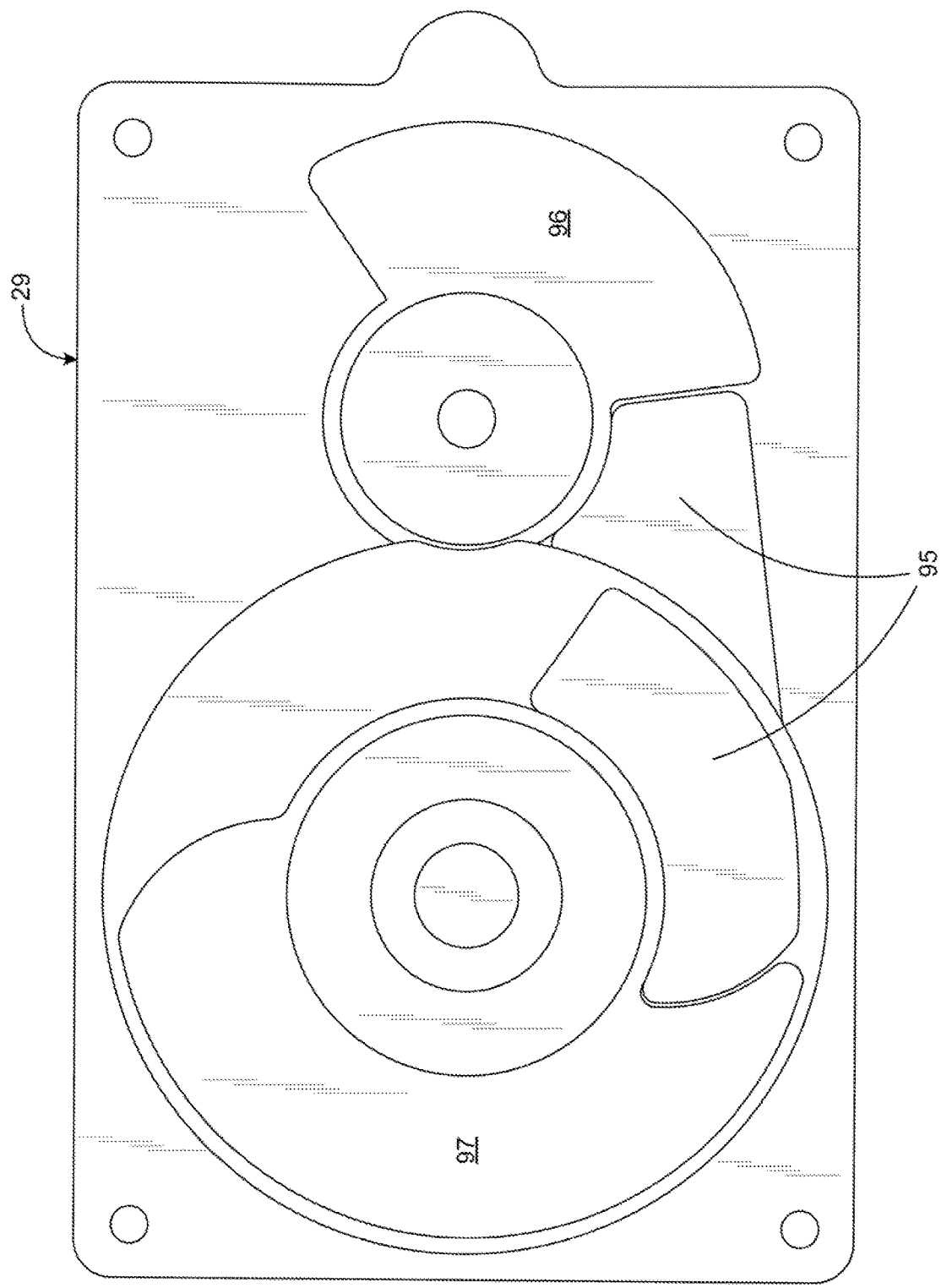
FIG. 15 is a sectional view of FIG. 12 showing the shutters in closed positions to minimize air mass flow into the supercharger.
Figure 16:
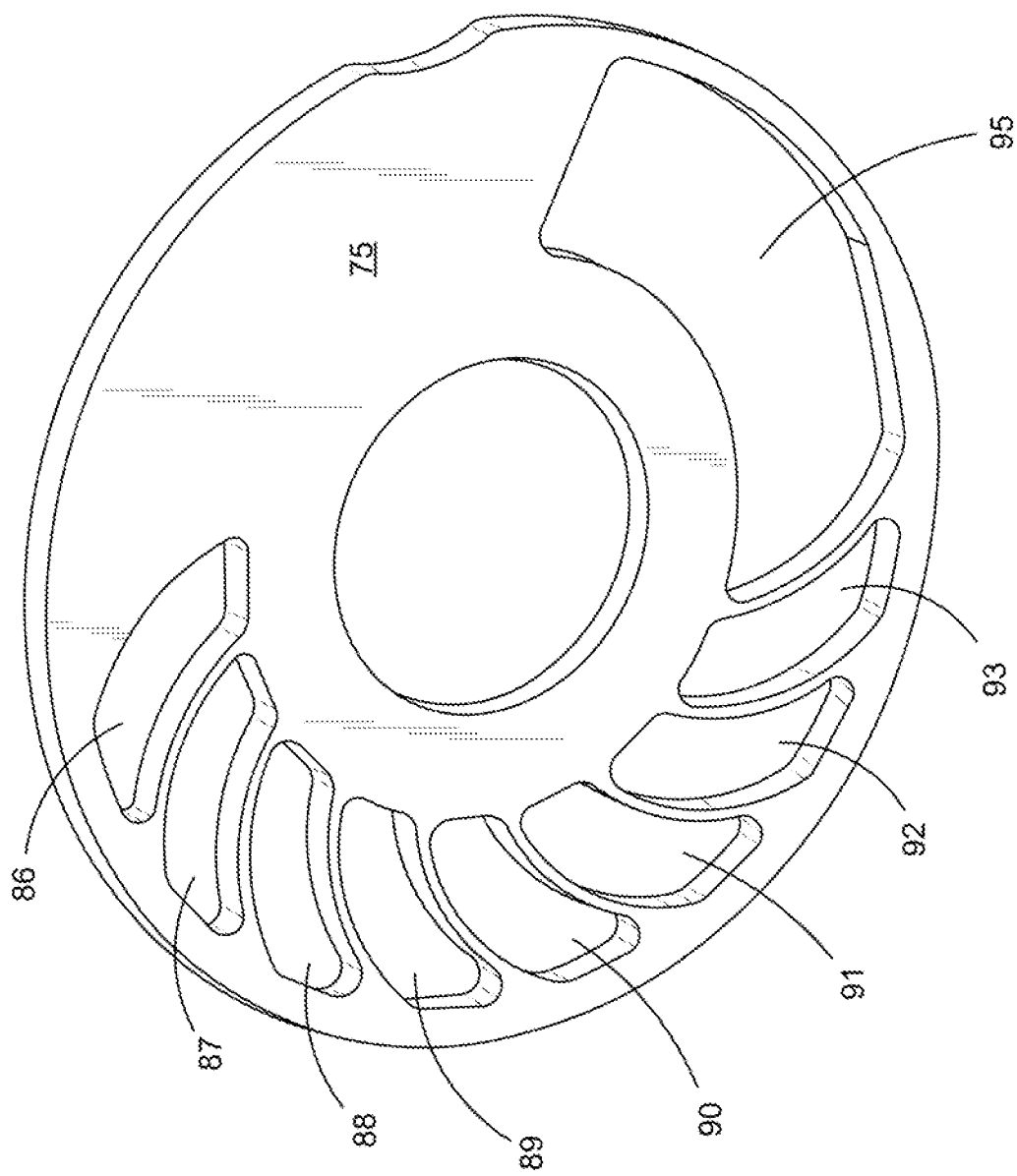
FIG. 16 is a perspective view of the proximal side of ported disk plate.

As shown in FIGS. 10, 11 and 12, air mass control apparatus 69 comprises a first shutter 96 and a second shutter 97. Shutter 96 has an arcuate flat blade 98 joined to a sleeve 99. Sleeve 99 is rotatably retained on tubular boss 73 of air inlet member 29 to allow blade 98 to selectively move in clockwise and counterclockwise rotation to selectively cover and uncover openings 78 to 84. The shutter position determines the internal volume of chamber 49 of housing 28 when the cutoff occurs and the air mass is trapped. Second shutter 97 has an arcuate flat blade 101 joined to a sleeve 102. Sleeve 102 is rotatably retained on boss 76 to allow blade 101 to selectively move in clockwise and counterclockwise directions to cover and uncover openings 86 to 93. Shutter 97 operates to control the volume of intake air mass flowing through one or more openings 86 to 93 to male rotor 47 in chamber 49 of housing 28. The shutter position determines the internal volume of chamber 49 of housing 28 when the cutoff occurs and the air mass is trapped. Shutters 96 and 97 are concurrently rotated in opposite directions with a gear train 103. As shown in FIG. 10, gear train 103 has a first spur gear 104 rotatably mounted on boss 73 adjacent shutter 96. Gear 104 is connected with one or more fasteners to shutter 96 whereby gear 104 and shutter 96 rotate together. Gear 104 and shutter 96 can be a one-piece structure. A second spur gear 106 drivably engaging spur gear 104 is rotatably mounted on boss 76. Spur gear 106 is connected with one or more fasteners to shutter 97 whereby gear 106 and shutter 97 rotate together to selectively open and close openings 86 to 93 in air inlet member 29. Gear 106 and shutter 97 can be a one-piece structure. Gear 106 has a diameter smaller than the diameter of gear 104. A drive spur gear 107 secured to a shaft 108 engages gear 104 to apply torque to gear 104 whereby gear 104 rotates on boss 73 and gear 106 rotates on boss 76 as shown by arrows 109 and 111. An actuator 112 mounted on casing 31 rotates shaft 108 and gear 107 selectively in opposite directions in response to operating data from processor 21 concerning the air mass requirements of engine 10. Actuator 112 is in an electric motor wired to processor 21 as shown in FIG. 1. Other types of actuators controlled by processor 21 can be used to operate gear train 103 to concurrently rotate shutters 96 and 97 to control the volume of air mass flowing into and subsequently trapped in chamber 49 of housing 28 accommodating rotors 47 and 48. As shown in FIGS. 6, 9 and 10, a bar 113 attached with fasteners 114 and 116 to bosses 73 and 76 rotatably supports shaft 108 and retains gear 107 in driving engagement with gear 104. FIGS. 10, 12 and 13 show shutters 96 and 97 in the maximum open position relative to openings 78 to 84 and openings 86 to 93 to allow a maximum volume of an air mass to flow into supercharger 11 before the air flow is cut off. FIGS. 11 and 15 show shutters 96 and 97 in closed positions relative to openings 78 to 84 and openings 86 to 93. FIG. 14 shows shutters 96 and 97 rotated in opposite directions to a partly closed position relative to openings 78 to 84 and openings 86 to 93 to vary the volume of an air mass that flows into supercharger 11. Arcuate movements of shutters 96 and 97 vary the volume of an air mass that flows into, cut-off, and trapped by supercharger 11, to be subsequently expanded, then compressed, and finally delivered to engine 10 according to the varying power requirements of engine 10.

Figure 17:
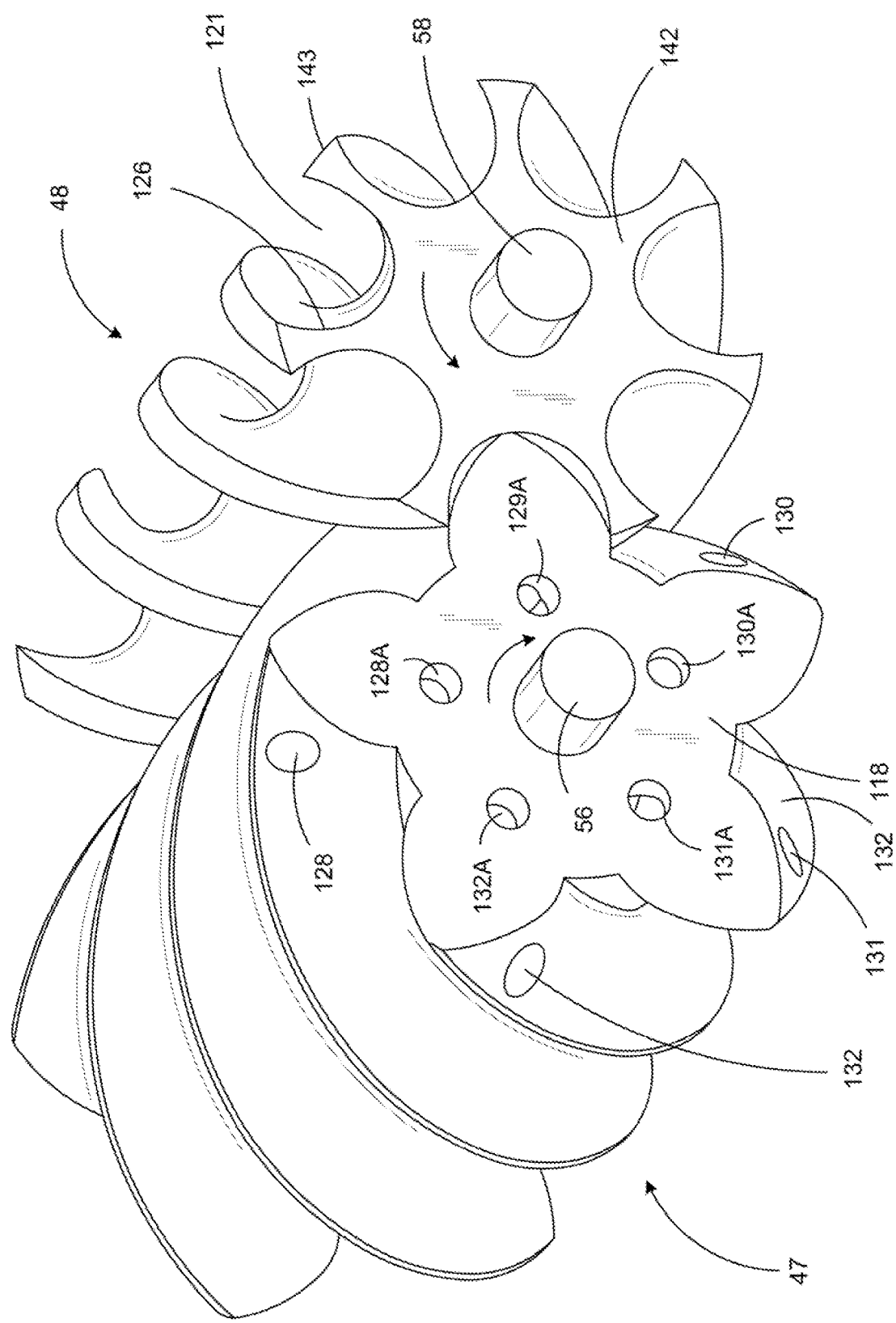
FIG. 17 is a perspective view of the air inlet ends of the male rotor and the female rotor of FIG. 10.

Proceeding to FIGS. 17 and 18, male rotor 47 has a plurality of helical lobes or vanes 117. The helical or twist angle of vanes 117 can vary from air inlet end 118 to air discharge end 119 of male rotor 47. An example of the twist angle of each vane 117 is 180 degrees For rotor air inlet end 118 to rotor air outlet end 119. Rotor 47 has five circumferentially spaced helical vanes 117. Shaft 56 projects axially away from front end 118 of rotor 47. Shaft 54 is axially aligned with shaft 56 and extends away from rear end 119 of rotor 47. Shafts 56 and 54 can be a single shaft extended axially through and secured to rotor 47. Female rotor 48 has seven circumferentially spaced helical grooves 121. The number of vanes 117 on male rotor 47 relative to the number of grooves 121 on female rotor 48 can vary. For example, male rotor 47 and female rotor 48 can have the same number of helical vanes and helical grooves. Each of the vanes 117 of male rotor 47 has convex shaped outside walls 122 and 123 curved outwardly to a helical apex ridge 124. Each groove of the female rotor 48 has a U-shaped concave wall 126 complementary in size and shape to the convex shaped walls 122 and 123 of male rotor 47. Vanes 117 and grooves 121 have symmetric profiles that are substantially air mass leak free during the volume increase phase and the volume decrease phase of rotating rotors 47 and 48. The rotor to rotor clearance of rotors 47 and 48 and housing 28 have a minimum blowhole leakage of the air mass moved by rotors 47 and 48 from the air inlet ends to the air discharge ends of rotors 47 and 48 during the air intake phase, air expansion phase, and air compression phase of the supercharger 11.

As shown in FIGS. 9-A, 9-B, and 9-C, air inlet end 118 of male rotor 47 has a flat transverse face located adjacent the flat inside wall 71B of air inlet member 29. The face extends radially from shaft 56 to the outer edge of apex ridges 124 of vanes 117. A plurality of radial passages or pockets 128A, 129A, 130A, 131A, and 132A are open to the face of front end 118 of male rotor 47. Each passage 128 to 132 has an outer open end on the trailing wall of each vane 117 to provide a free-flowing air supply through passage 128 to 132 into the volume between rotor 47, rotor 48, and surface 71B of air inlet member 29 from passage 133 to prevent the temporary creation of a vacuum and the noise and losses associated with such vacuum during the initial meshing phases at the ends of rotors 47 and 48.

As shown in FIGS. 18-A & 18-B, male rotor 47 has a distal or air discharge end surface 134 extended radially from shaft 54 to apex ridges 124 of vanes 117. A plurality of radial passages 136, 137, 138, 139 and 140 are located in air discharge end surface 134. The air discharge ends of each vane 117 has a passage with a curved outer end 141 open to the leading side of vane 117 to vent air mass from the space between rotor 47, rotor 48, and end member 57 into pocket 145, through passage 149 to exit air passage 146 of supercharger 11.

Proceeding to FIG. 19, a tubular member or conduit 144 is attached to the top wall of housing 28. Conduit 144 has a passage 146 open to the distal end of chamber 49 above rotors 47 and 48 to allow air mass, shown by arrow 147, to flow to heat exchanger 27 and from heat exchanger 27 into air intake manifold 16. Returning to FIG. 8, the top wall of housing 28 has a generally V-shaped opening 148 open to the distal end of chamber 49 of housing 28 above rotors 47 and 48. V-shaped opening 148 diverges rearwardly to an upright channel 149 in air outlet member 57. The air mass moved by rotors 47 and 48 is expelled through V-shaped opening 148 and channel 149 into the passage 146 of conduit 144.

Figure 24:
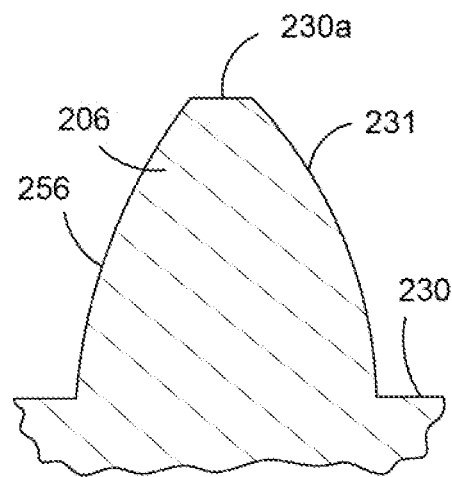
FIG. 24 is an enlarged sectional view taken along line 24-24 of FIG. 21.
Figure 25:
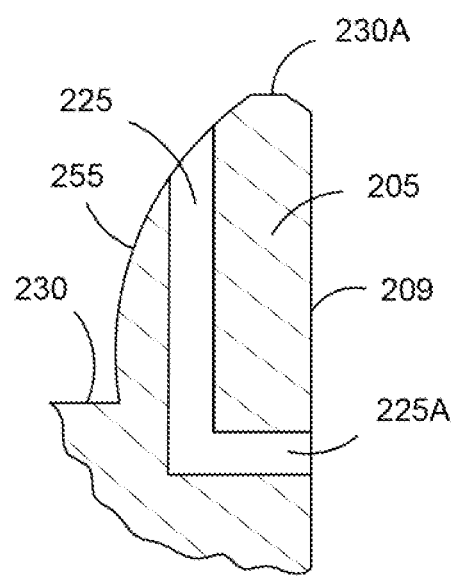
FIG. 25 is an enlarged sectional view taken along line 25-25 of FIG. 21.
Figure 26:
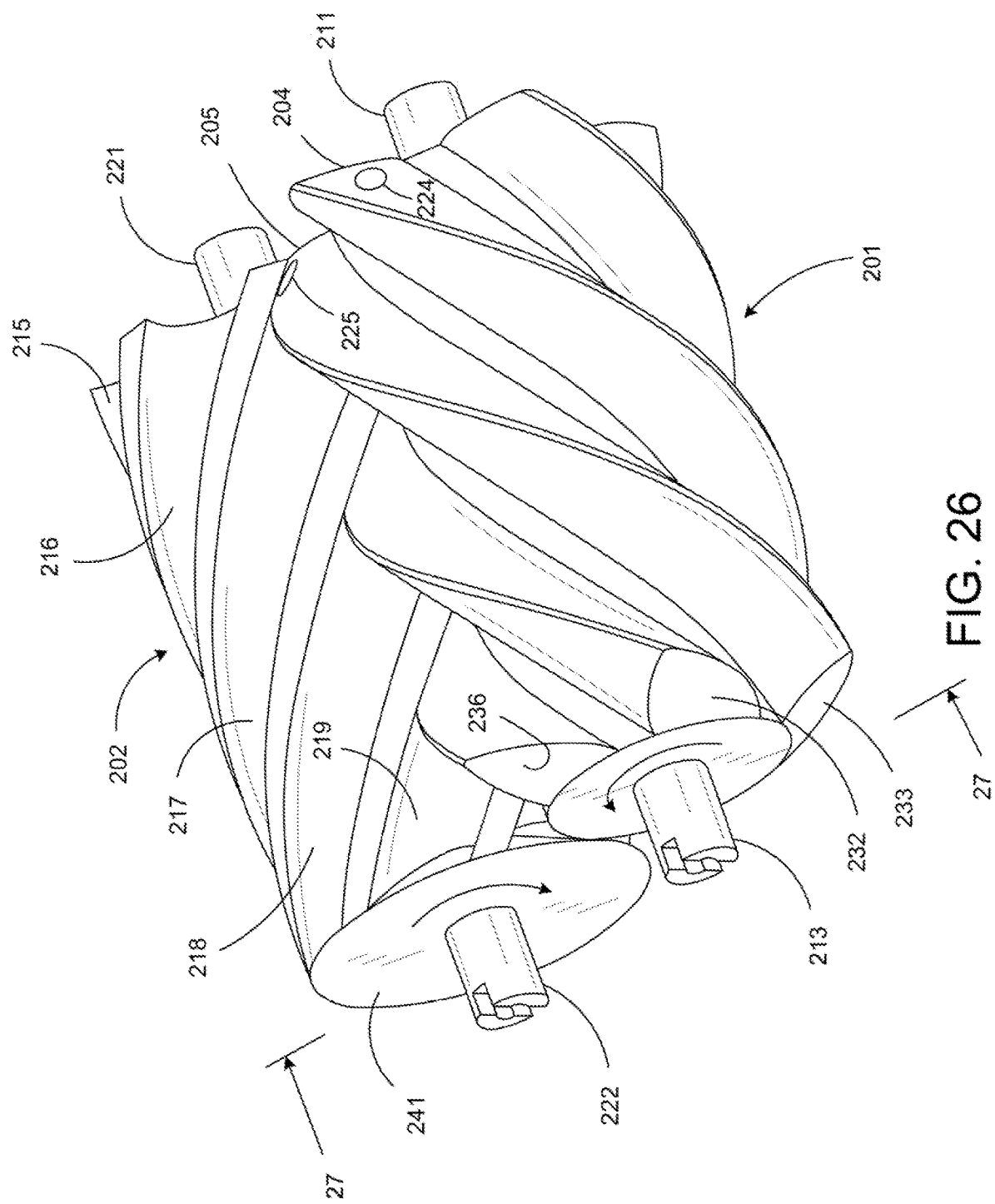
FIG. 26 is a perspective view of the air discharge ends of the male rotor and the female rotor of FIG. 20.

A second embodiment of a rotor assembly 200 for supercharger 11 is shown in FIGS. 20 to 32. Rotor assembly 200 provides supercharger 11 with efficient and instantaneous control of variable air mass delivery to internal combustion engine 10 according to the varying demands of the engine power output at varying engine speeds. Rotor assembly 200 comprises a helical male rotor 201 and a helical female rotor 202 that are inter-engaging and rotating in opposite directions about parallel axes to move the variable air mass axially through supercharger 11 to internal combustion engine 10. Male rotor 201 has five helical vanes or lobes 204, 205, 206, 207, and 208 located along the length of the body of rotor 201. As shown in FIG. 24, vane 204 has a symmetrical profile that cooperates with the female rotor 202 to prevent air mass leakage during the air intake phase, air expansion phase, and the air compression phase of the rotating rotors 201 and 202. Vane 204 has a convex curved leading side wall 256, a trailing side wall 231 and an apex 230A. Side walls 256 and 231 have substantially the same convex curvatures or external symmetrical profiles that extend from apex 230A to root 230 of vane 206. Male rotor 201 has a planar air inlet end 209 joined to a first shaft 211 and an air discharge end 212 joined to a second shaft 213. Shafts 211 and 213 rotatably support male rotor 201 on air inlet end member 29 and air outlet end member 257 of supercharger 11. Female rotor 202 has seven helical grooves 214, 215, 216, 217, 218, 219 and 220 located along the length of rotor 202. Each groove has a U-shaped concave profile that conforms to the convex profile of helical vanes 204 to limit air mass leakage during the air intake phase, air expansion phase, and the air compression phase of supercharger 11. As shown in FIG. 26, female rotor 202 has a first shaft 221 and a second shaft 222 located axially from the opposite ends of rotor 202. Shafts 221 and 222 are parallel to shafts 211 and 213 of male rotor 201 when male rotor 201 and female rotor 202 operatively engage each other.

As shown in FIGS. 20, 21, 22 and 23, air inlet end 209 of male rotor 201 includes conduits or passages 224 to 228 to allow free filling air flow into the increasing temporarily trapped volume between rotor 201, rotor 202, and air inlet end member 29 from air inlet passage 133. As shown in FIG. 25, passage 225 in vane 205 has a horizontal first opening 225A below root 230 of vane 205 and offset radial second opening 225. Opening 225 is open to trailing side wall 255 of vane 205. Passage 225 is made by drilling offset radial and axial holes in vane 205. Passages 224 to 227 each have the same hole structure as passage 225.

Figure 27:
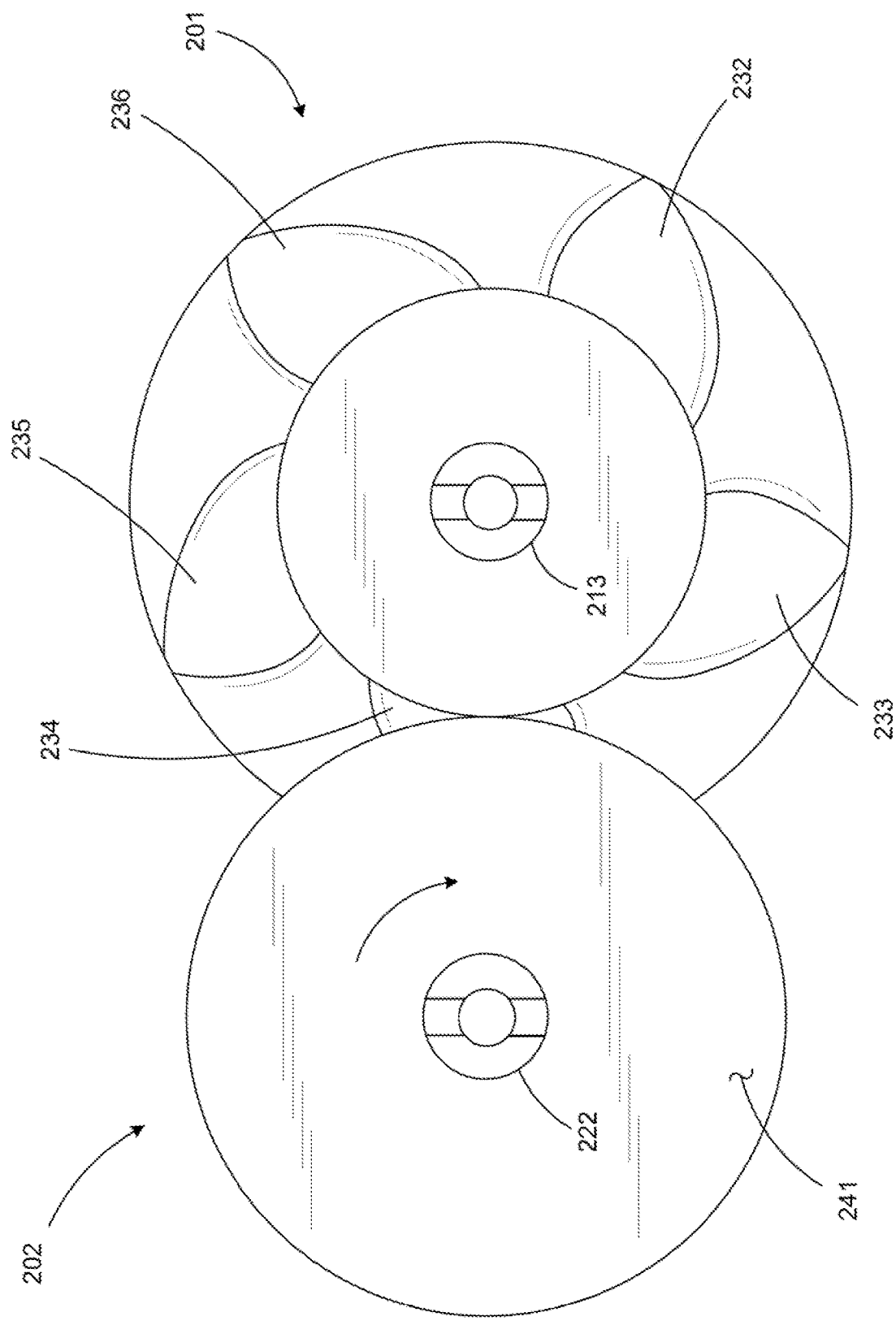
FIG. 27 is an auxiliary view taken along line 27-27 of FIG. 26.
Figure 28:
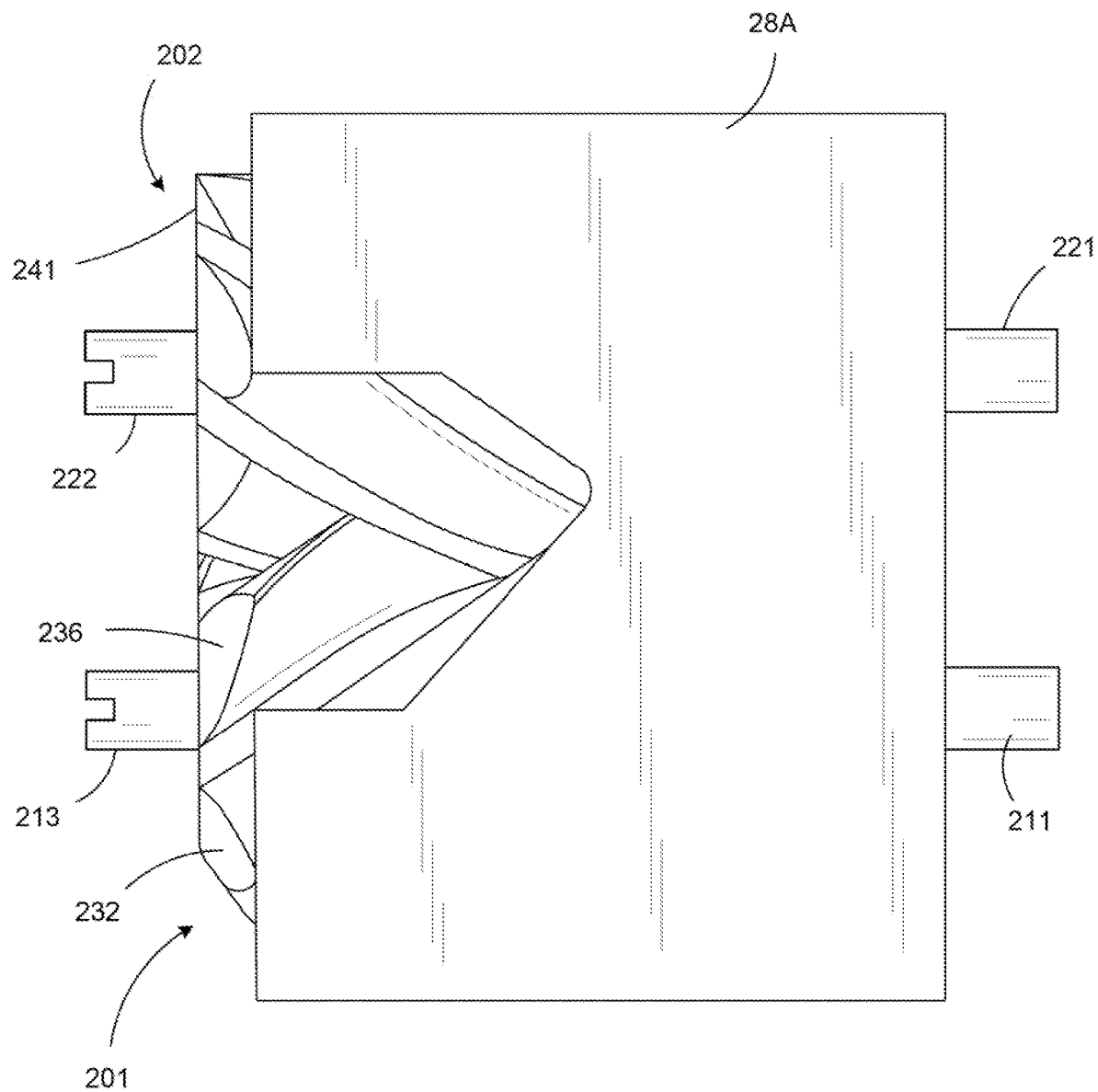
FIG. 28 is an enlarged top view of the housing of the supercharger and the male rotor and the female rotor within the housing with the cone member shown.
Figure 29:
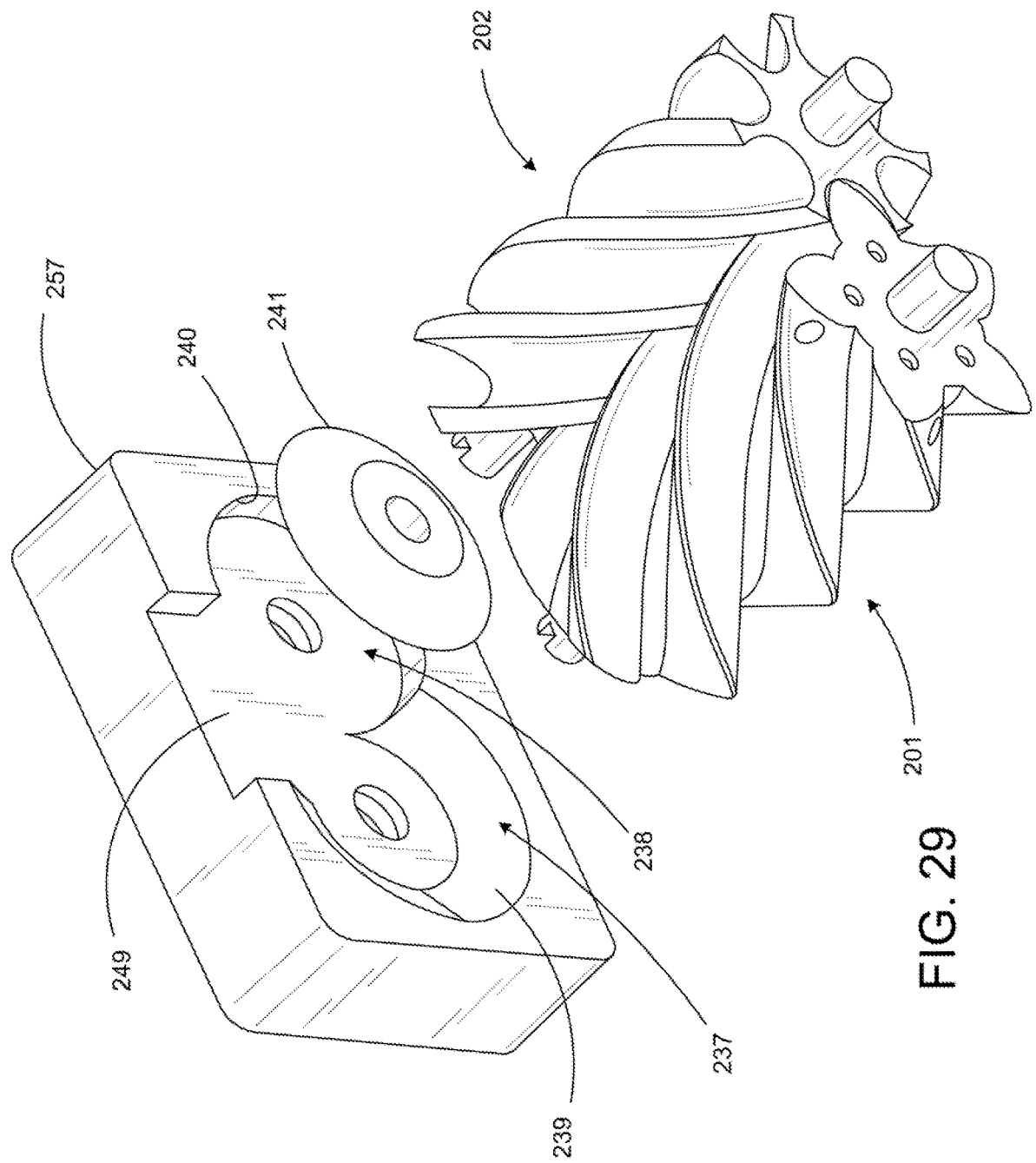
FIG. 29 is an exploded perspective view of the supercharger air discharge end member and the air discharge ends of the male rotor and the female rotor.
Figure 32:
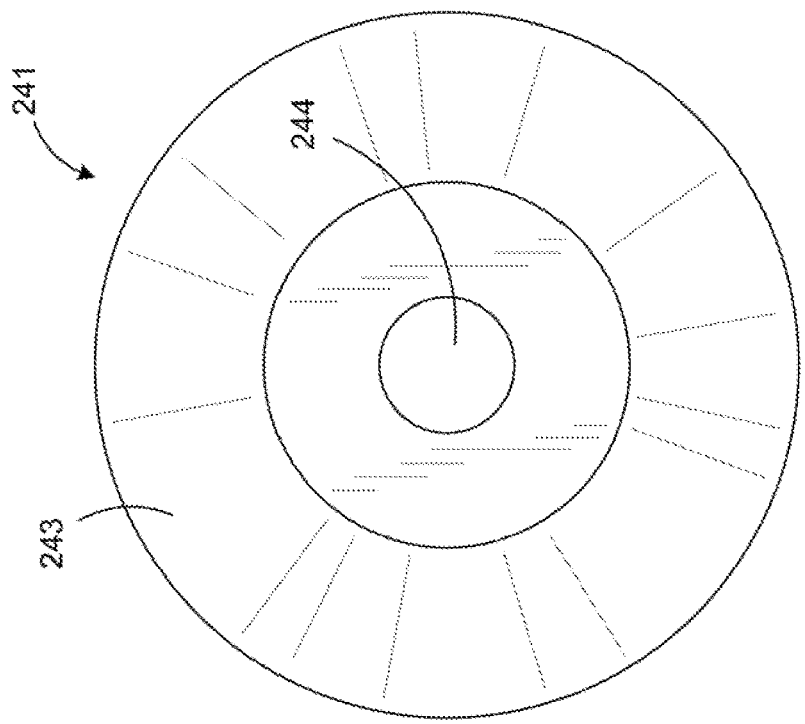
FIG. 32 is an elevational view of the proximal side of the frustum.
Figure 31:
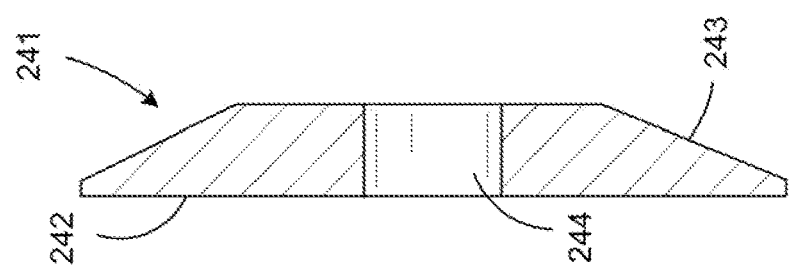
FIG. 31 is a sectional view taken along line 31-31 of FIG. 30.
Figure 30:
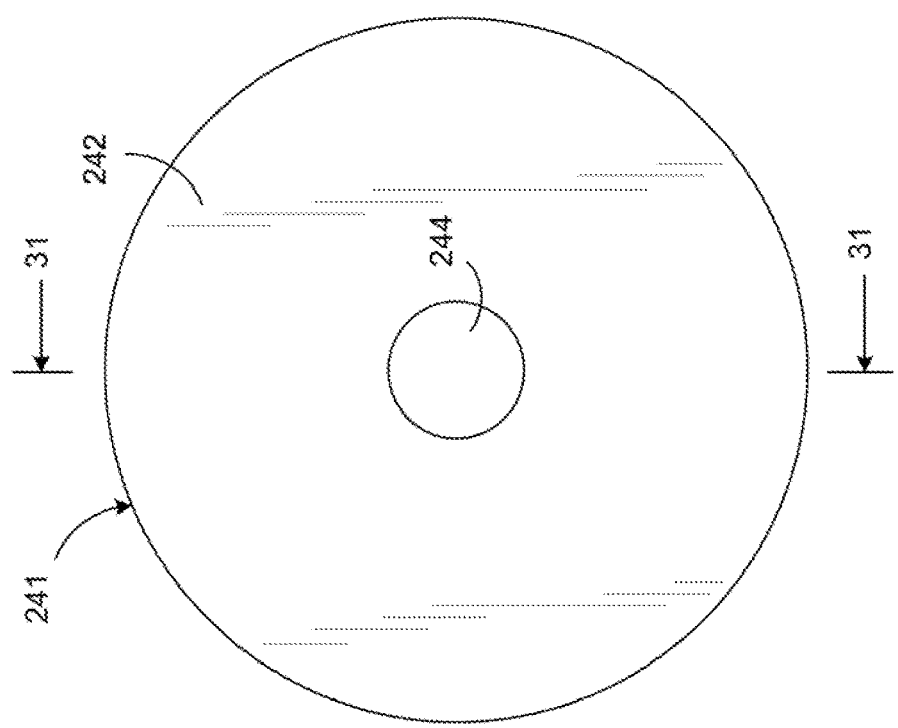
FIG. 30 is an elevational view of the distal side of the frustum between the female rotor and the air discharge end member.

Proceeding to FIGS. 26 and 27, the distal or air exit vane ends 232 to 236 of vanes 204 to 208 each taper outwardly and inwardly from rotor air discharge end 212 to the apex ends of vanes 204 to 208. Vane ends 232 to 236 have generally cone shaped surfaces that extend outwardly at an angle of sixty degrees relative to the axis of rotation of rotor 201. Vane ends 232 to 236 can project outwardly at other angles relative to the axis of rotation of rotor 201.

As shown in FIGS. 26 to 32, rotors 201 and 202 located within housing 28A have vane distal cone shaped ends 232 to 236 extended into recesses 237 and 238 in air outlet end member 257. Recesses 237 and 238 are open to upright channel 249 whereby the air mass moved by the rotating rotors 201 and 202 is directed to V-shaped opening 148 of housing 28A. End member 257 has a cone shaped wall 239 that tapers inwardly to accommodate the taper or cone-shaped vane ends 232 to 236 of male rotor 201. The tapers of vane ends 232 to 236 coincide with the taper of wall 239. A disk or frustum of a cone 241 is interposed between the distal end of female rotor 202 and recess 238. Disk 241 has a cylindrical flat side wall 242 and a cone-shaped side wall 243 surrounding a hole 244. Hole 244 accommodates rotor shaft 222. As shown in FIG. 26, frustum 241 fits into the distal end of female rotor 202 with cone-shaped side wall 243 facing and engaging the tapers of cone-shaped vane ends 232 to 236 of male rotor 201. The engaging cone-shaped wall 243 and cone-shaped vane ends 232 and 236 prevent the air mass from flowing down and allows the air mass to be discharged up into channel 249 and to internal combustion engine 10 and to minimize air carry-back to the opposite side of the rotor set.

Figure 33:
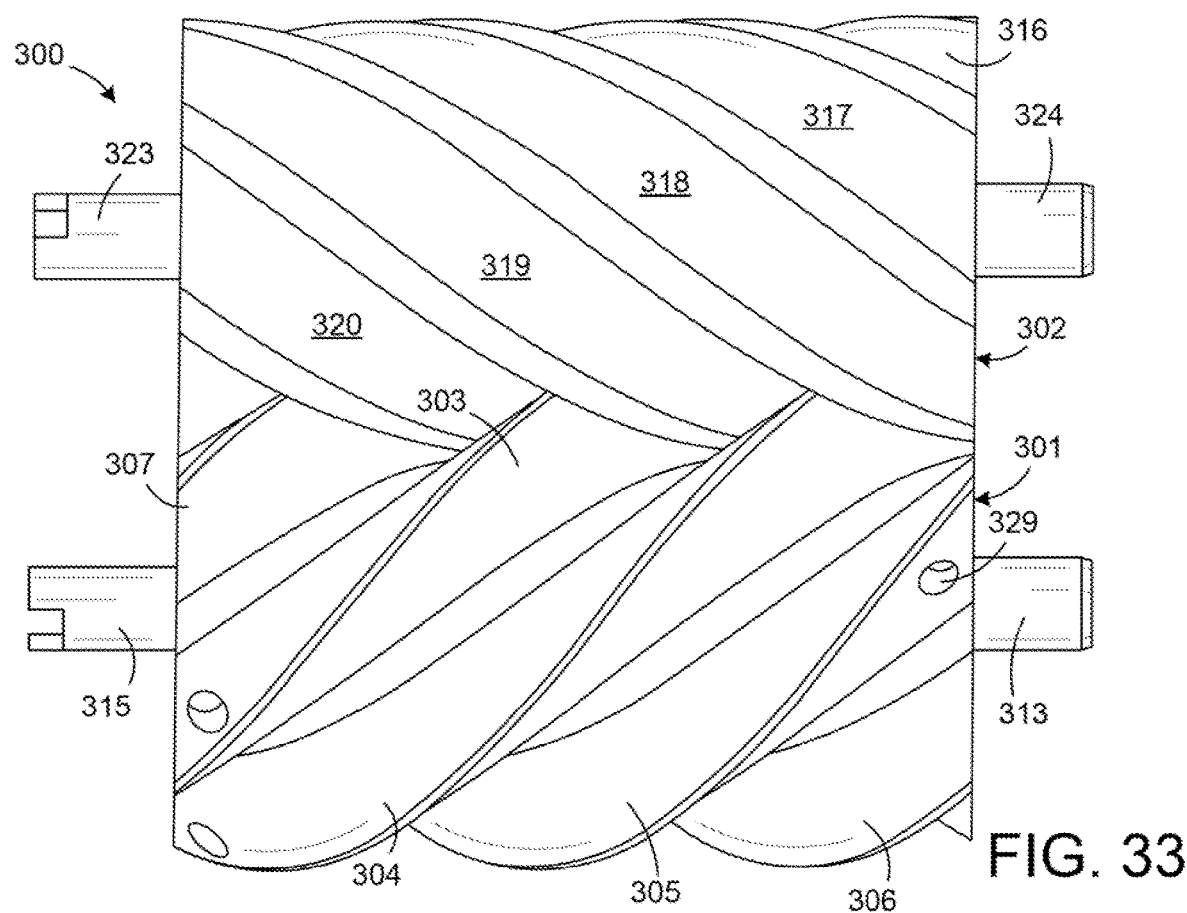
FIG. 33 is a top plan view of a third embodiment of the male rotor and the female rotor for the supercharger.
Figure 34:
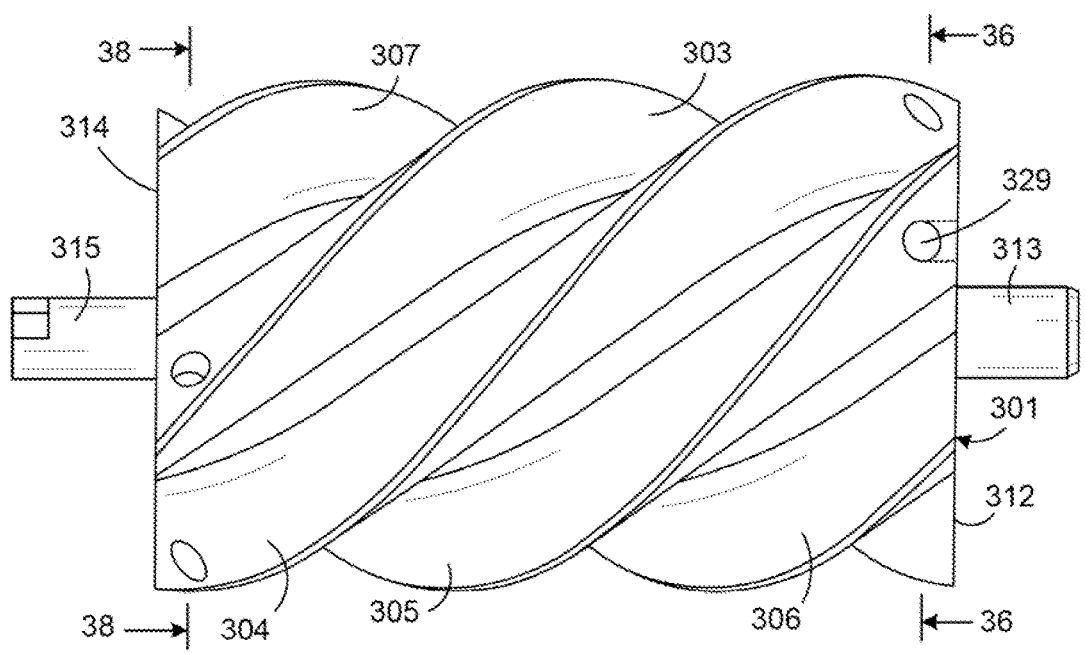
FIG. 34 is a top plan view of the male rotor of FIG. 33.
Figure 35:
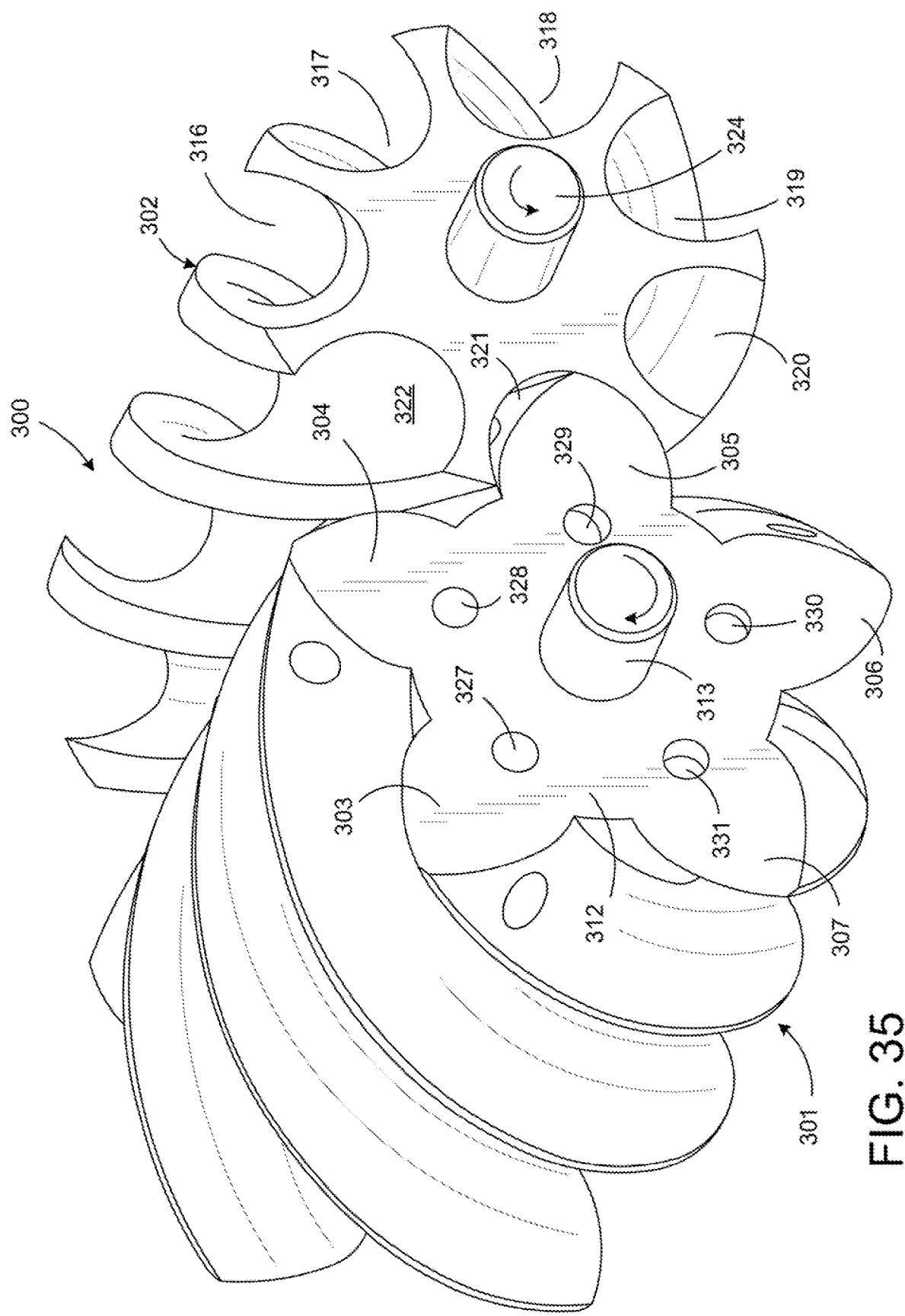
FIG. 35 is a perspective view of the air inlet end of the male rotor and the female rotor of FIG. 33.
Figure 36:
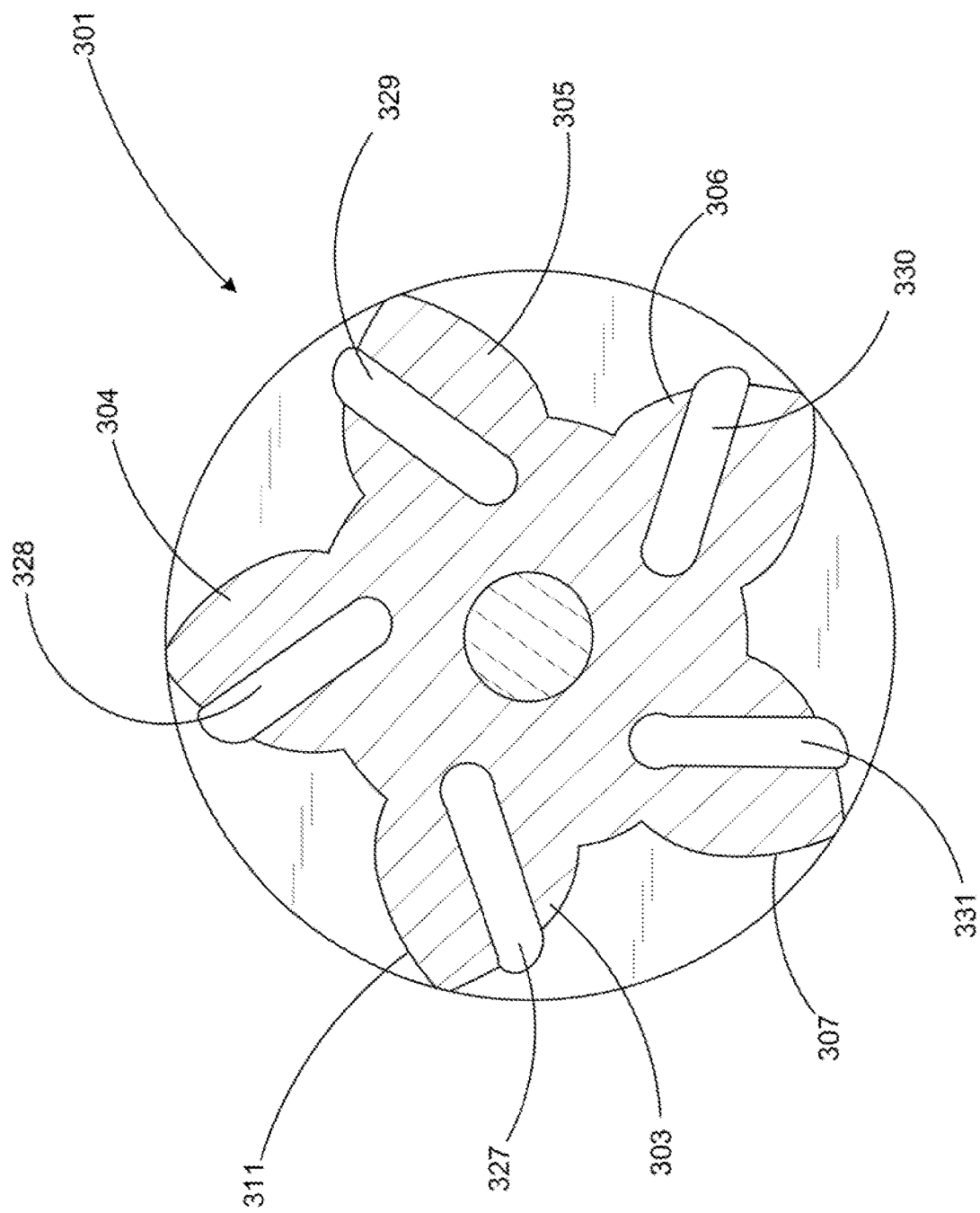
FIG. 36 is a sectional view taken along line 36-36 of FIG. 34.
Figure 38:
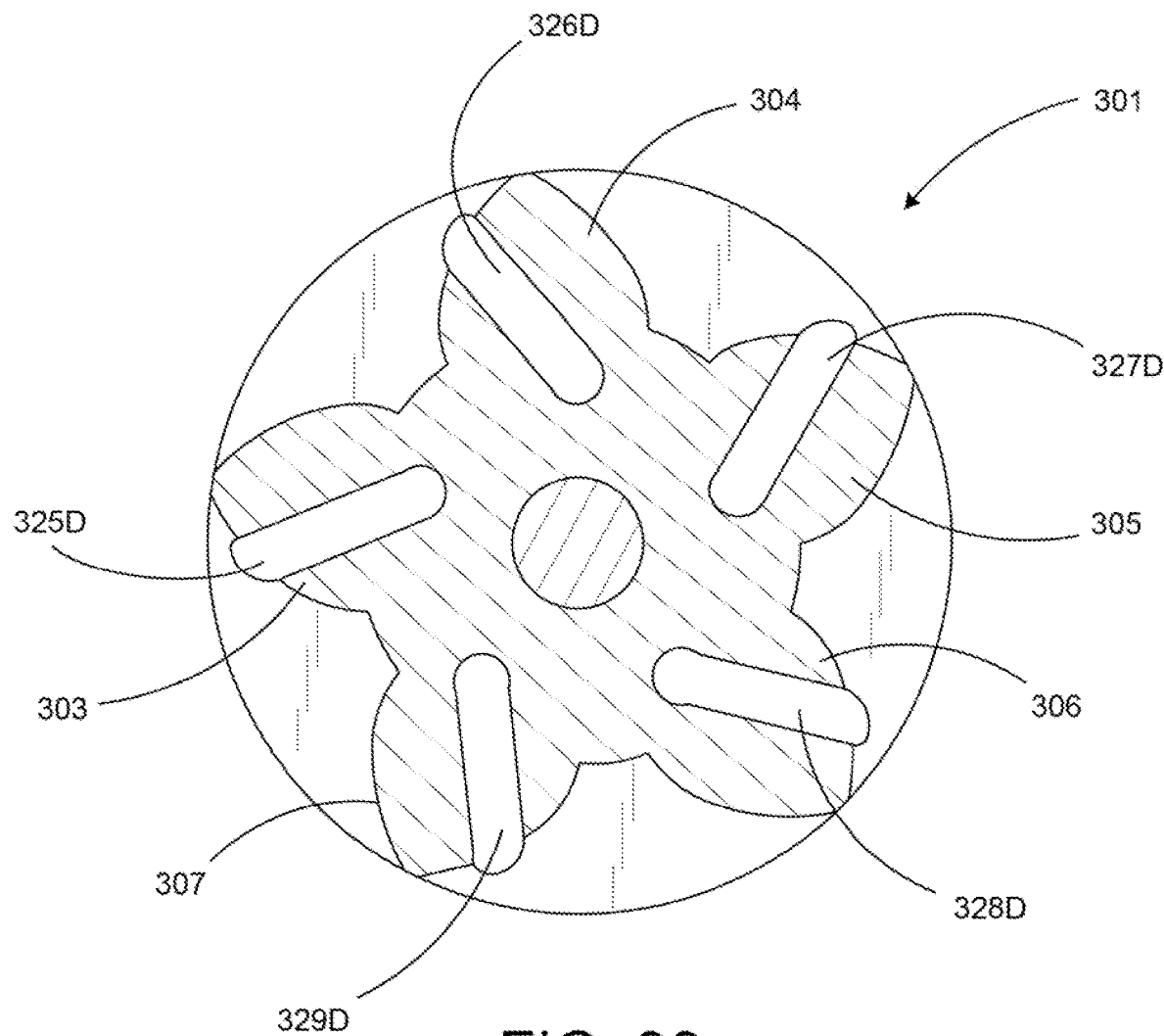
FIG. 38 is a sectional view taken along line 38-38 of FIG. 34.

A third embodiment of a rotor assembly 300 for supercharger 11 is shown in FIGS. 33 to 36. Rotor assembly 300 provides supercharger 11 with efficient and instantaneous control of variable air mass delivery to internal combustion engine 10 according to the varying demands of the engine power output at varying engine speeds and loads. Rotor assembly 300 comprises a helical male rotor 301 and a helical female rotor 302 that are inter-engaging and rotating in opposite directions about parallel axes to move a variable air mass axially through supercharger 11 to internal combustion engine 10. Male rotor 301 has five helical vanes or lobes 303, 304, 305, 306 and 307 located along the length of the body of rotor 301. Each of the vanes 303 to 307 has a symmetrical profile that cooperates with female rotor 302 to prevent air mass leakage during the air intake phase, air expansion phase, and the air compression phase of the rotating rotors 301 and 302. As shown in FIG. 36, vane 303 has a convex curving leading side wall 308, a trailing side wall 309, a root 310 and an apex 311. Side walls 308 and 309 have substantially the same convex curvatures or external symmetrical profiles that extend from apex 311 to root 310. Vanes 304 to 307 have the same symmetrical profile as vane 303. Male rotor 301 has a flat air inlet end 312 joined to a first shaft 313 and a flat air discharge end 314 joined to a second shaft 315. Shafts 313 and 315 rotatably support male rotor 301 on air inlet member 29 and air outlet member 357 of supercharger 11. Female rotor 302 has seven helical grooves 316, 317, 318, 319, 320, 321 and 322 located along the length of rotor 302. Each groove has a U-shaped concave profile that conforms to the convex profile of helical vanes 303 to 307 to limit air mass leakage during the air intake phase, air expansion phase, and the air compression phase of supercharger 11. As shown in FIG. 33, female rotor 302 has a first shaft 325 and a second shaft 326 located axially from the opposite ends of rotor 302. Shafts 325 and 326 are parallel to shafts 313 and 315 of male rotor 301 when male rotor 301 and female rotor 302 operatively engage each other.

As shown in FIGS. 35 and 36, the air inlet end of male rotor 301 includes holes, conduits or passages 327, 328, 329, 330 and 331 operable to allow free filling air flow into the increasing volume between rotor 301, rotor 302, and air inlet end member 29 from passage 95 and chamber 70 of supercharger 11. As an example, when lobe 305 of male rotor 301 is rotating out of mesh with groove 321 of rotor 302 the volume is increasing in that region. A free-flowing air supply through passage 329 into this volume from passage 133 prevents the temporary creation of a vacuum and the noise and losses associated with such vacuum. Passage 327 in vane 303 has a first opening inwardly from root 310 of vane 303 and a second opening open to trailing side wall 309 of vane 303. Passage 327 is made by drilling vertical and axial holes in vane 303. Passage 327 is inwardly from root 310 and open to air inlet end 312 of male rotor 301. Passages 328 and 331 each have the same hole structure as passage 327 and function to provide access to air mass to mitigate the creation of a small temporary trapped vacuum between the male rotor 301, the female rotor 302, and the air inlet end member 329 during the initiation of the intake phase while maintaining chamber isolation.

Proceeding to FIGS. 37-A, 37-B, and 38, air discharge end 314 of male rotor 301 has a plurality of passages 325D, 326D, 327D, 328D, and 329D for venting air mass that is trapped between male rotor 301, female rotor 302, and air outlet end member 357 of supercharger 11. Passages 325D, 326D, 327D, 328D, and 329D are shown as holes in the discharge ends of vanes 303 to 308. Each passage 325D, 326D, 327D, 328D, and 329D has a radial hole portion open to the leading walls of vanes 303 to 307 and an axial hole portion open to air discharge end 314 of male rotor 301. The axial hole portions are open to air discharge end 314 inwardly of roots 330 of vanes 303 to 307. The air mass trapped adjacent air discharge end 314 of male rotor 301 flows through passages 325D, 326D, 327D, 328D, and 329D into pocket 345, through passage 349 to exit air passage 146 of supercharger 11 along with the air mass compressed by the rotating male rotor 301 and female rotor 302 to internal combustion engine 10.

Figure 39:
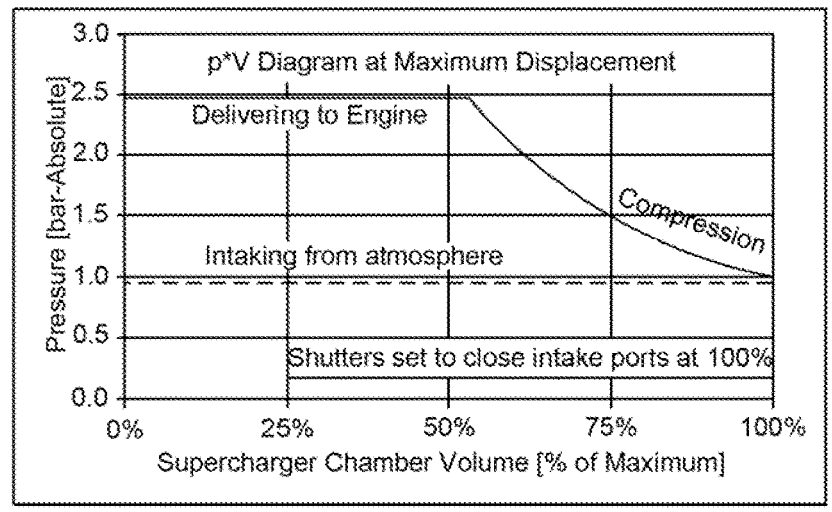
FIG. 39 is a PV diagram with shutters set to close the air inlet ports at 100% internal chamber volume.
Figure 40:
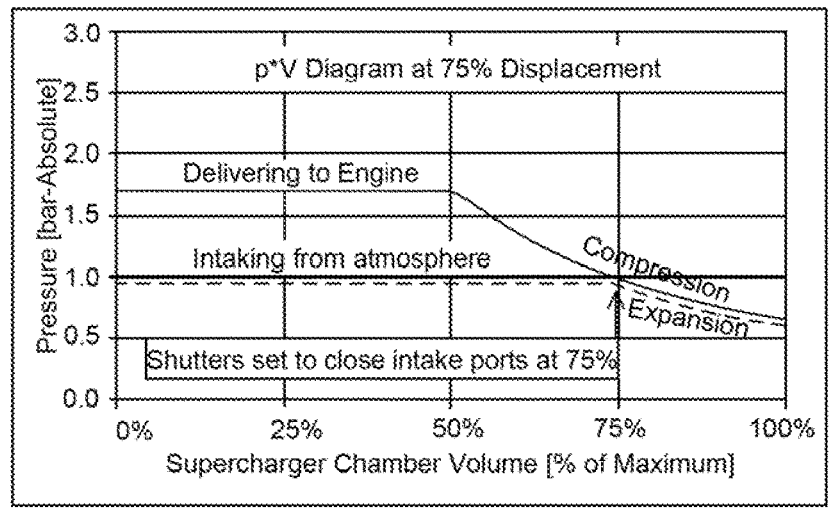
FIG. 40 is a PV diagram of 75% displacement with shutters set to close the air inlet ports at 75% internal chamber volume.
Figure 41:
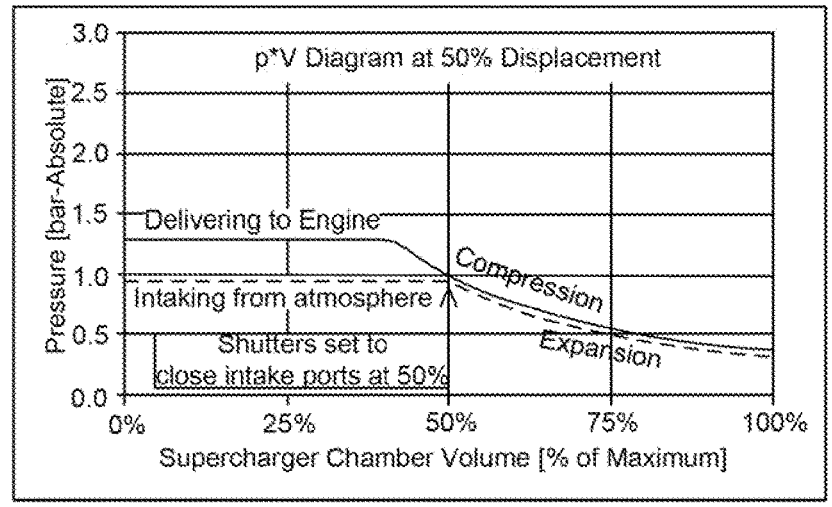
FIG. 41 is a PV diagram at minimum displacement with shutters set to close the air inlet ports at their minimum setting.

FIGS. 39 to 41 are pressure volume diagrams illustrating the operation of supercharger 11 with different shutter positions to boost air mass directed to internal combustion engine 10. The area enclosed within the loop of pressure vs. volume diagrams provides a visual representation of the belt drive 41 work per supercharger cycle required to operate supercharger 11 in the case of boosted operation. As shown in FIGS. 12 and 13, when shutters 96 and 97 are in open positions there is maximum boost. FIG. 39 illustrates the air intake phase, air expansion phase, and air compression phase and the delivery phase during which the compressed air mass is delivered to internal combustion engine 10. As shown in FIGS. 14 and 40, when shutters 96 and 97 are in seventy-five percent open positions there is less air mass boost, utilizing seventy-five percent of supercharger chamber volume. The minimum boost, illustrated in FIG. 41, is achieved when shutters 96 and 97 are in closed positions as shown in FIG. 15. Changes in the boost of the air mass vary with the varying closing positions of shutters 96 and 97 relative to air inlet openings 78 to 84 and 86 to 93. Supercharger 11 operates to supply air mass in variable amounts to internal combustion engine 10 according to the power requirements of internal combustion engine 10.

Figure 42:
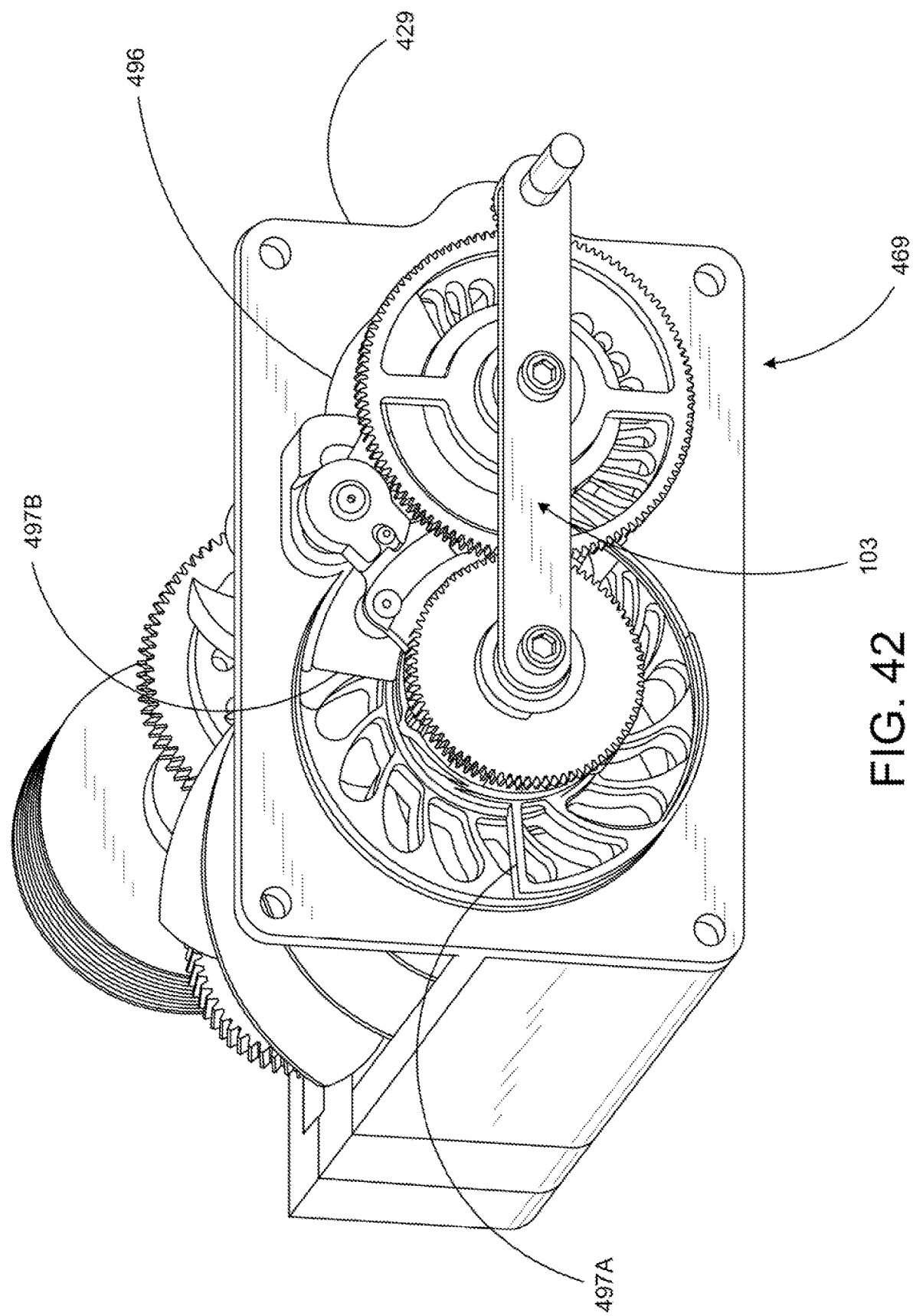
FIG. 42 is a perspective view of a second embodiment of the air mass control apparatus with shutters to control maximum volume of air mass flowing into the chamber and the housing of the supercharger.
Figure 43:
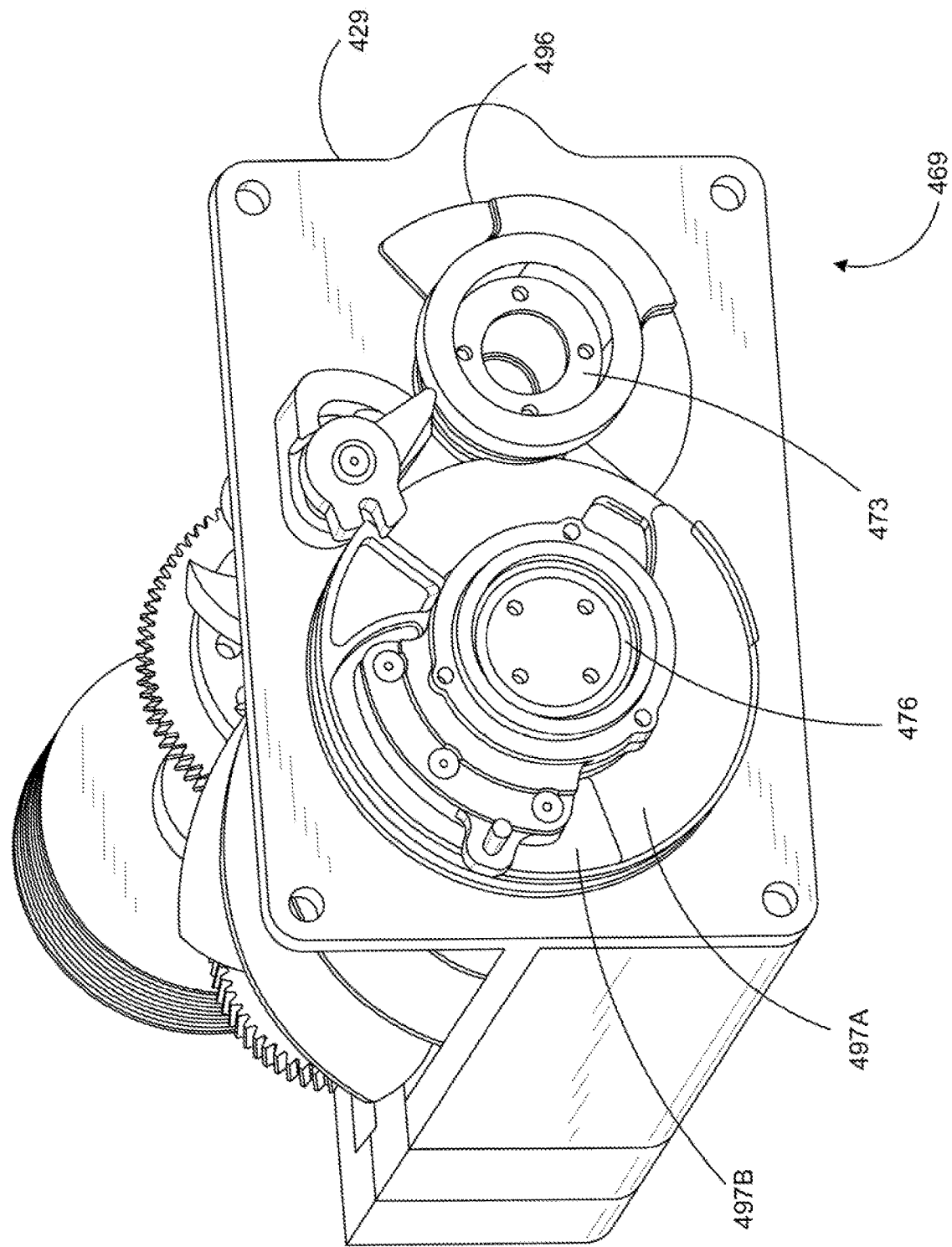
FIG. 43 is perspective view of the air inlet member with shutters to control a minimum of volume of air mass flowing into the chamber and the housing of the supercharger of the apparatus shown in FIG. 42.
Figure 44:
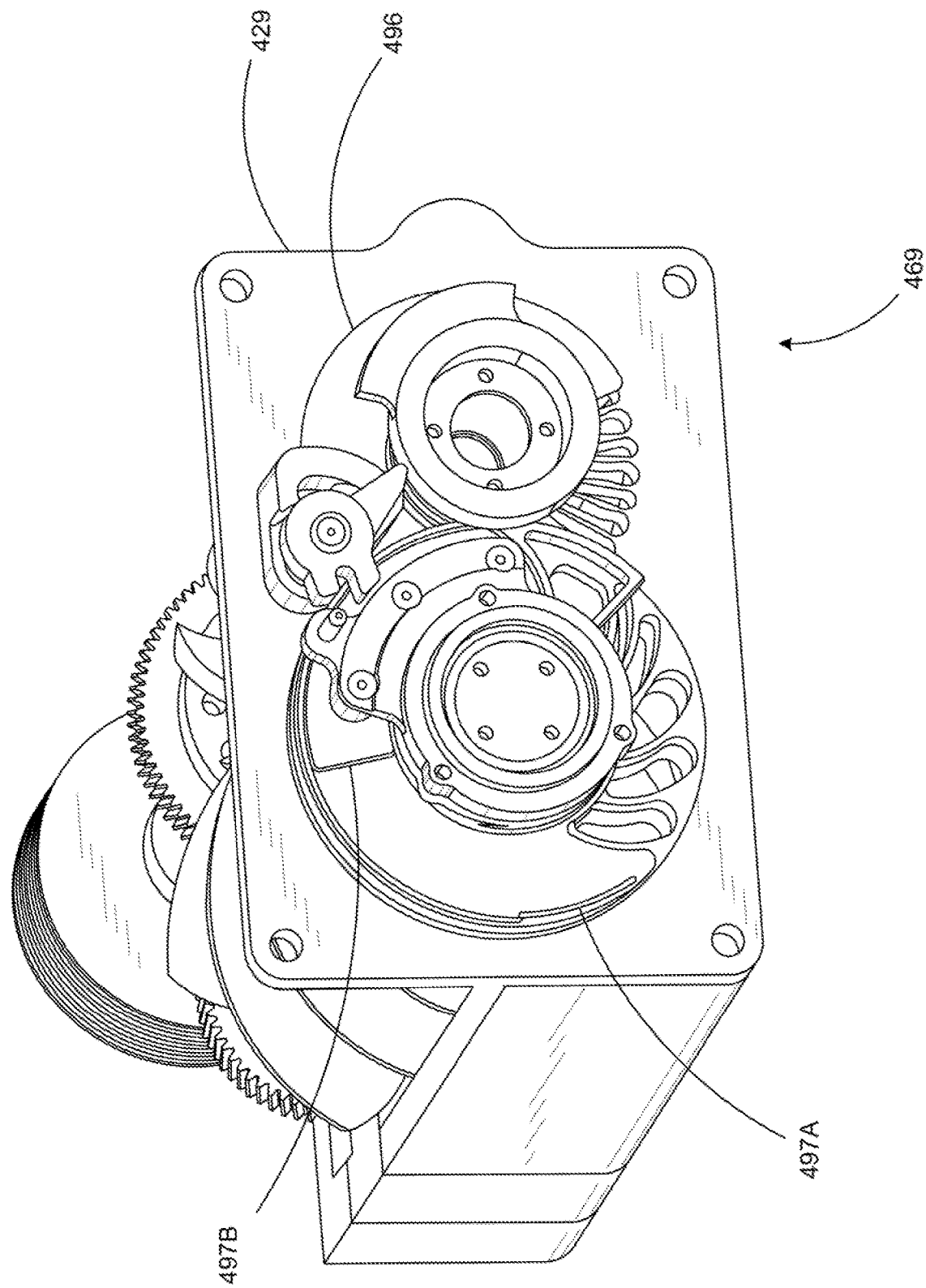
FIG. 44 is perspective view of the air inlet member with shutters set to control an intermediate volume of air mass flowing into the chamber and the housing of the supercharger of the apparatus shown in FIG. 42.
Figure 45:
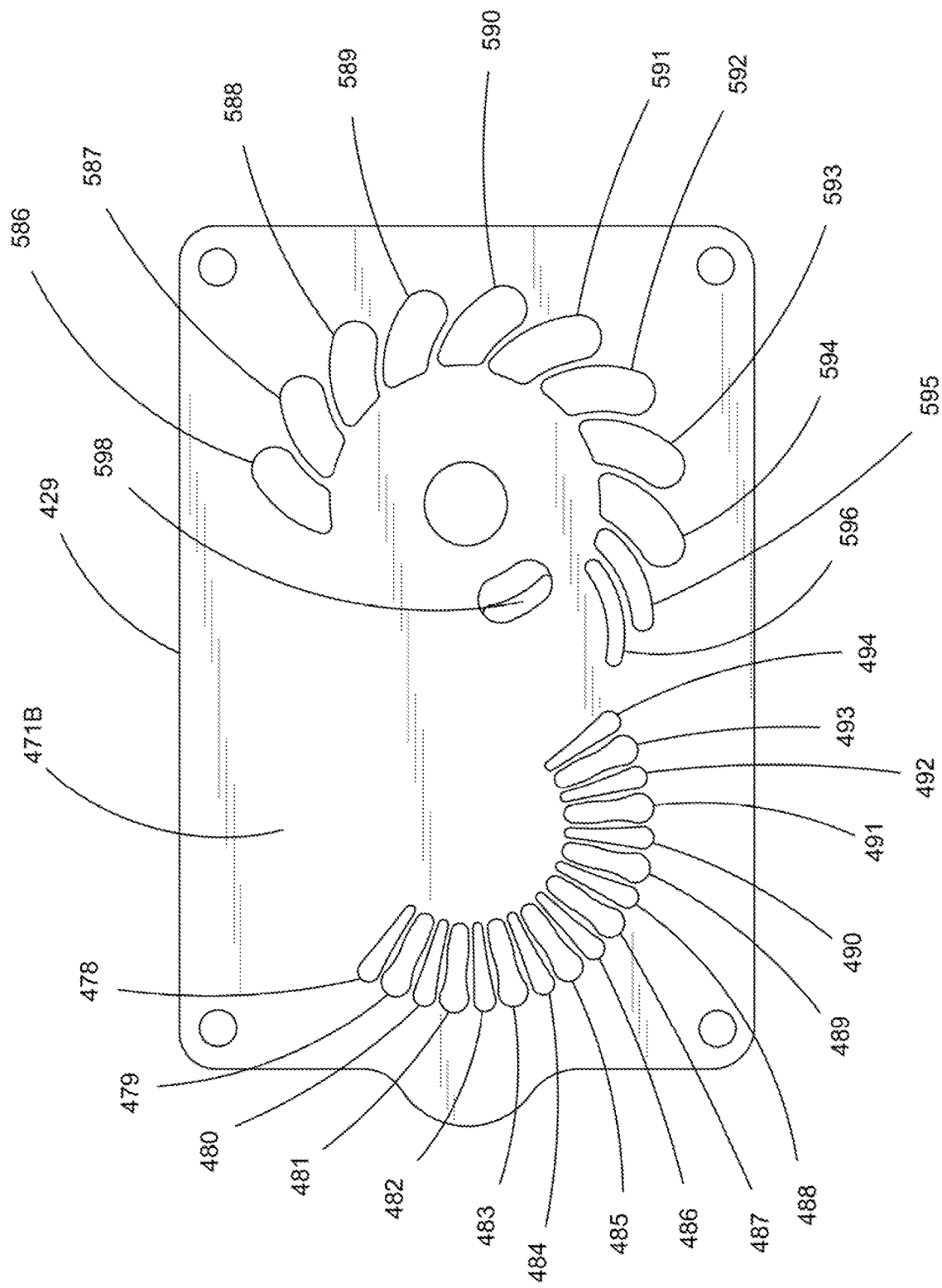
FIG. 45 is a front elevational view of the distal surface of the air inlet end member of the apparatus shown in FIG. 42.
Figure 46:
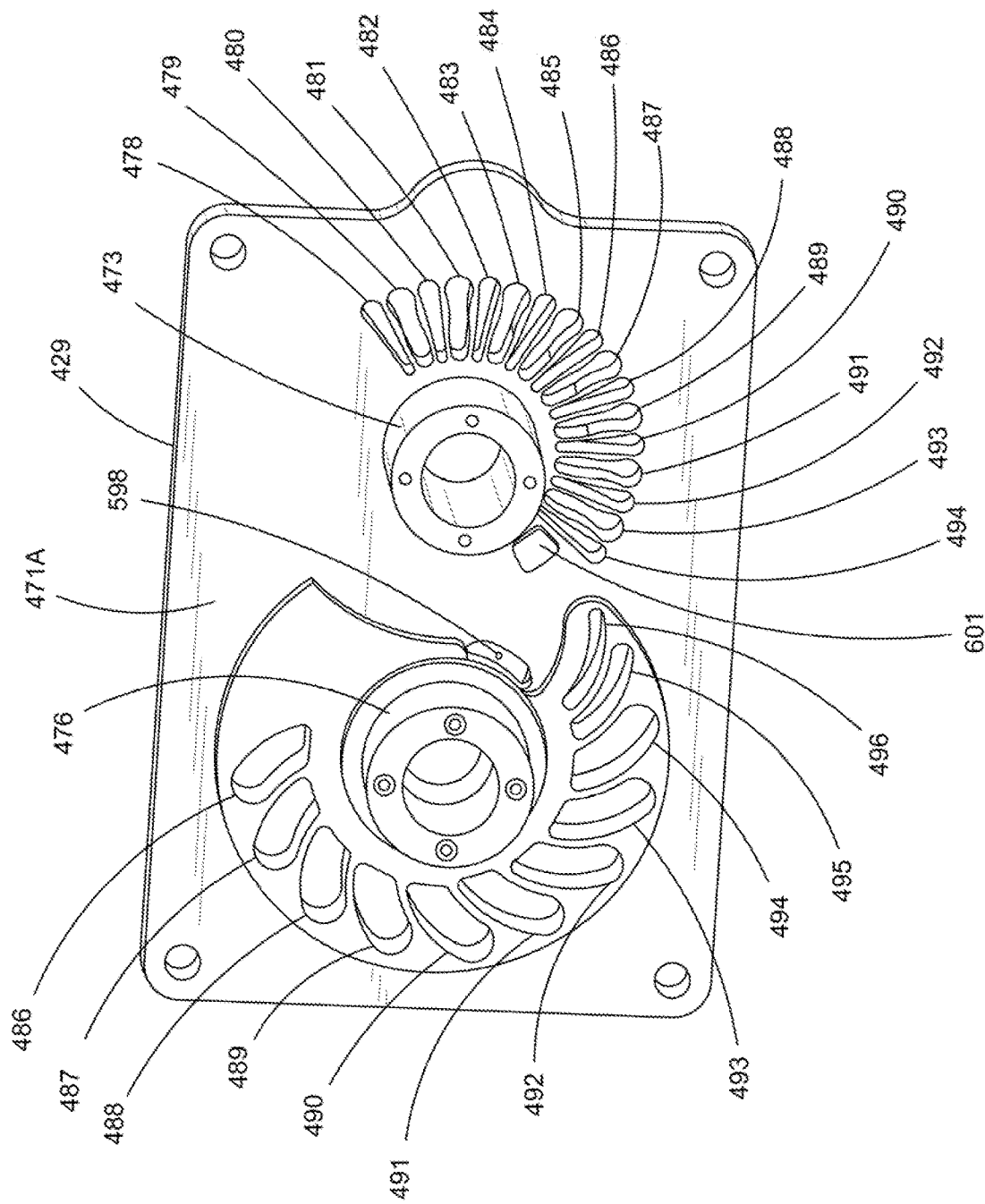
FIG. 46 is a perspective view of the proximal end of the air inlet end member of the apparatus shown in FIG. 42.
Figure 47:
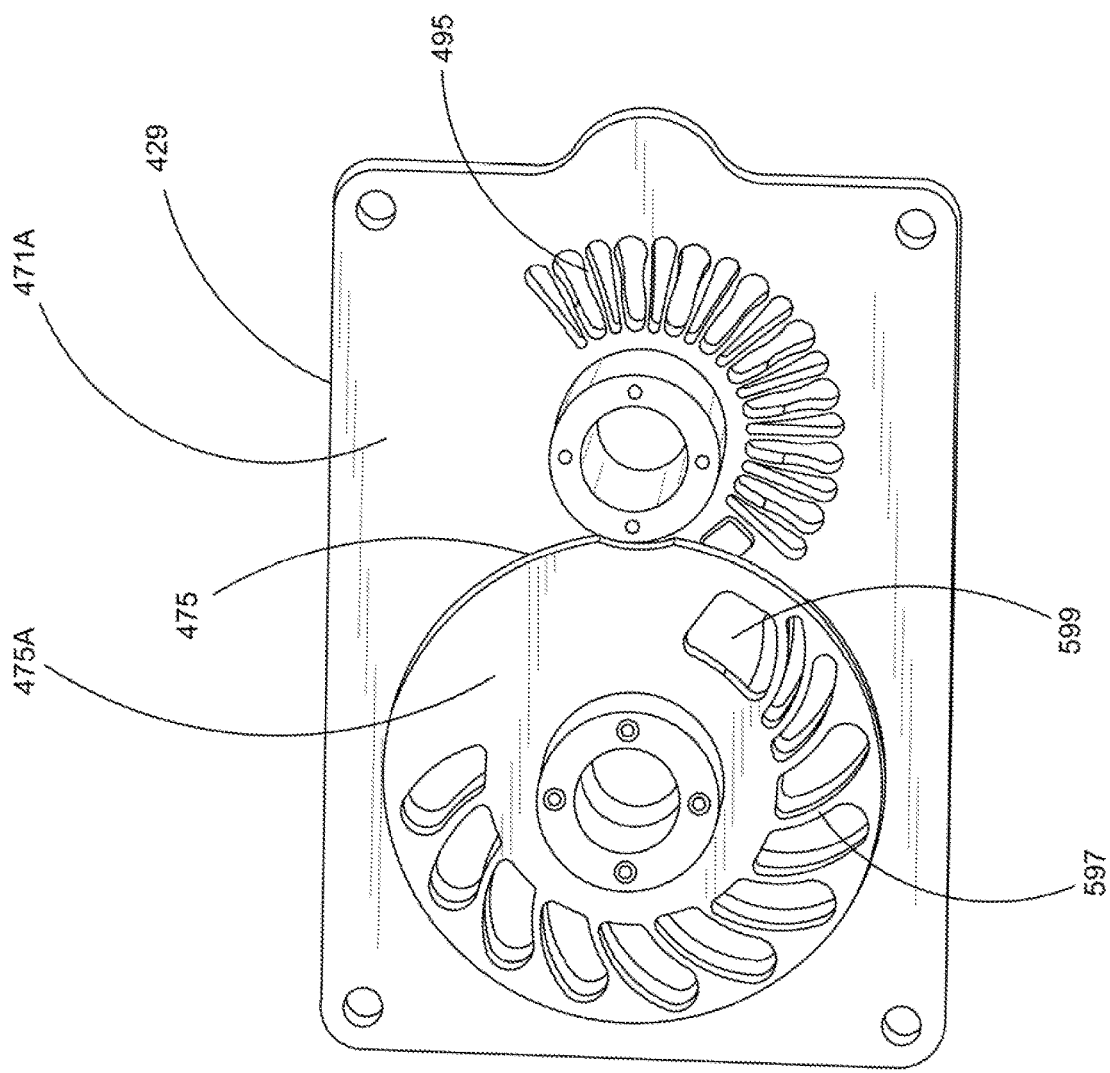
FIG. 47 is a perspective view of the proximal end of the air inlet end member with ported plate attached of the apparatus shown in FIG. 42.
Figure 48:
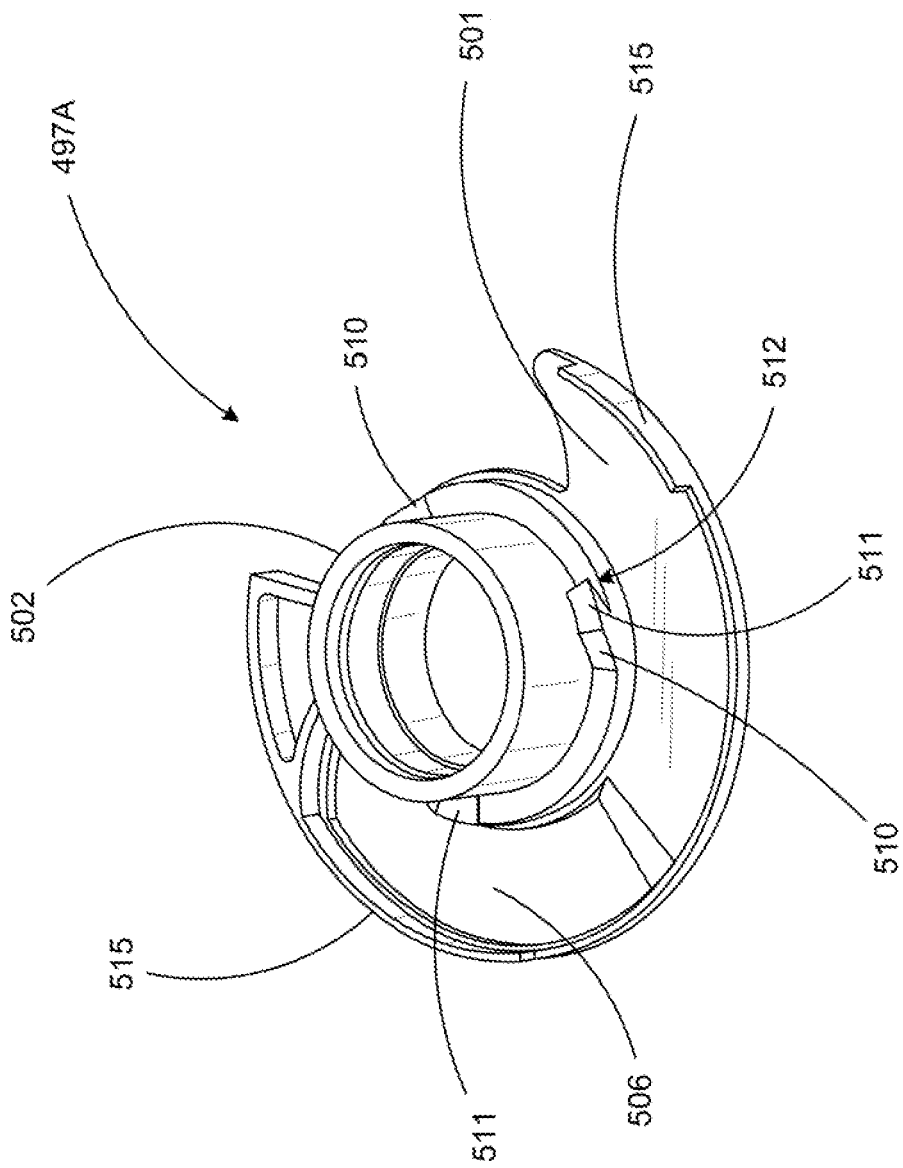
FIG. 48 is an enlarged perspective view of the proximal end of the base member of the two-piece shutter that controls air flowing to the male rotor of the apparatus shown in FIG. 42.
Figure 49:
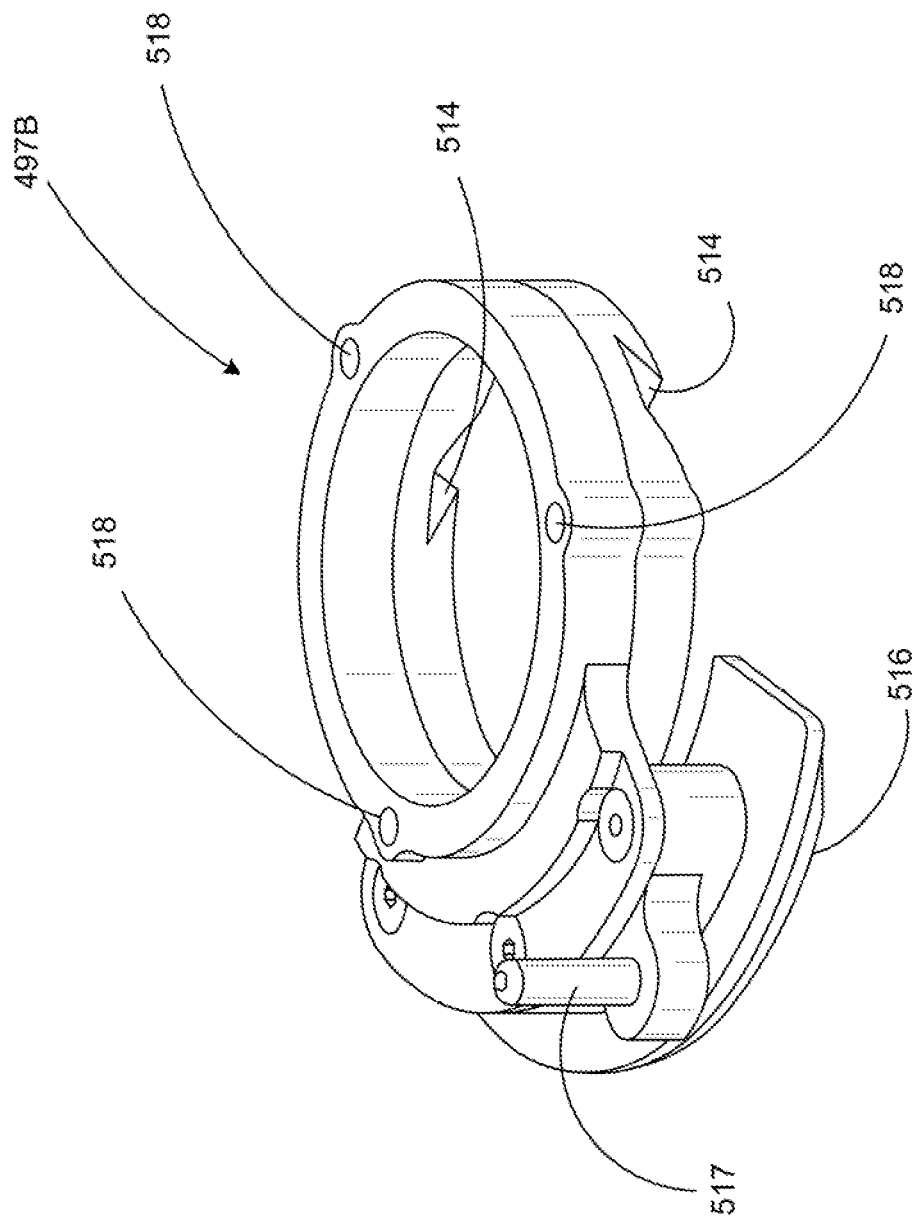
FIG. 49 is an enlarged perspective view of the proximal end of the lifting member of the two-piece shutter that controls air flowing to the male rotor of the apparatus shown in FIG. 42.
Figure 50:
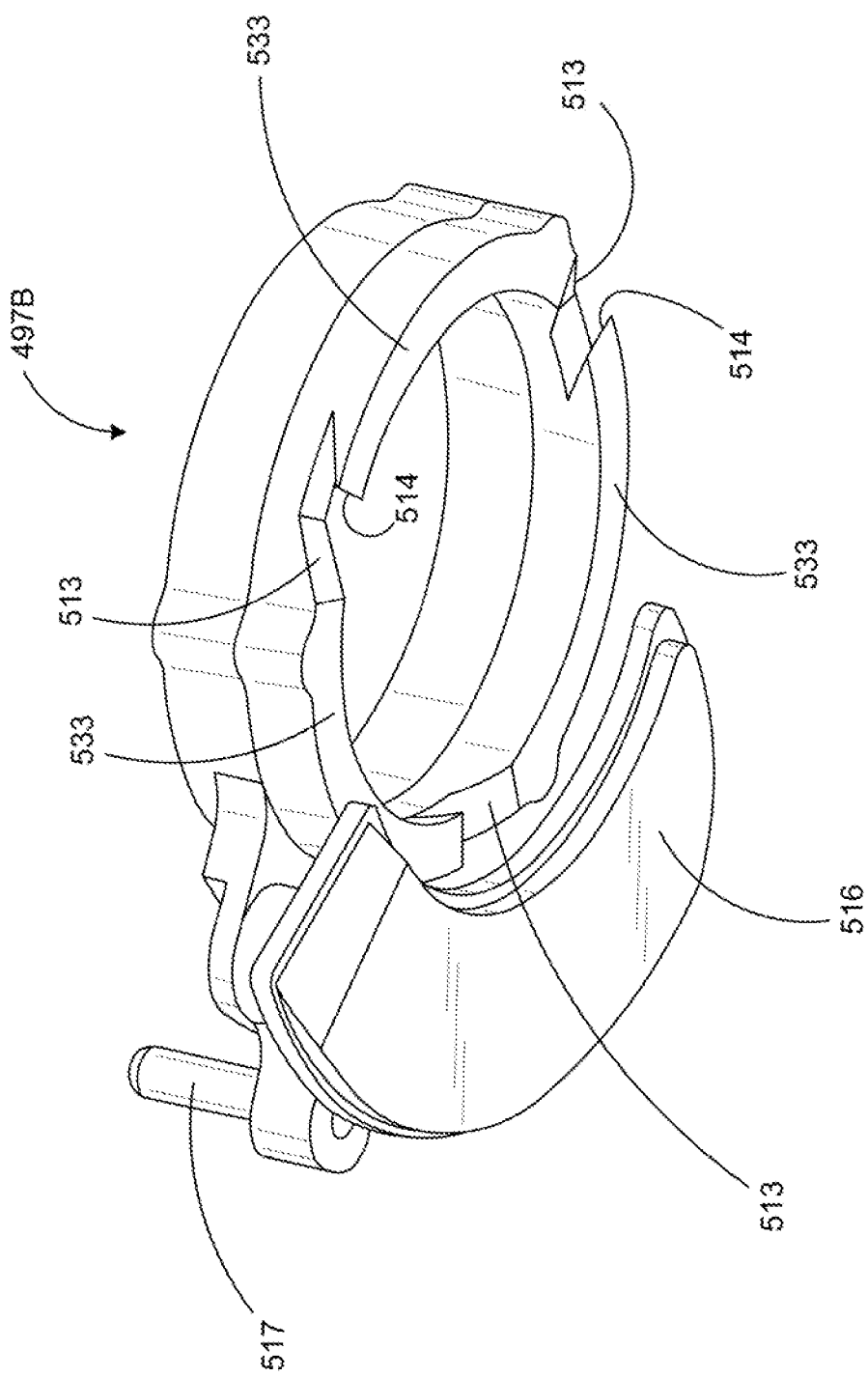
FIG. 50 is an enlarged perspective view of the distal end of the lifting member of the two-piece shutter that controls air flowing to the male rotor of the apparatus shown in FIG. 42.
Figure 51:
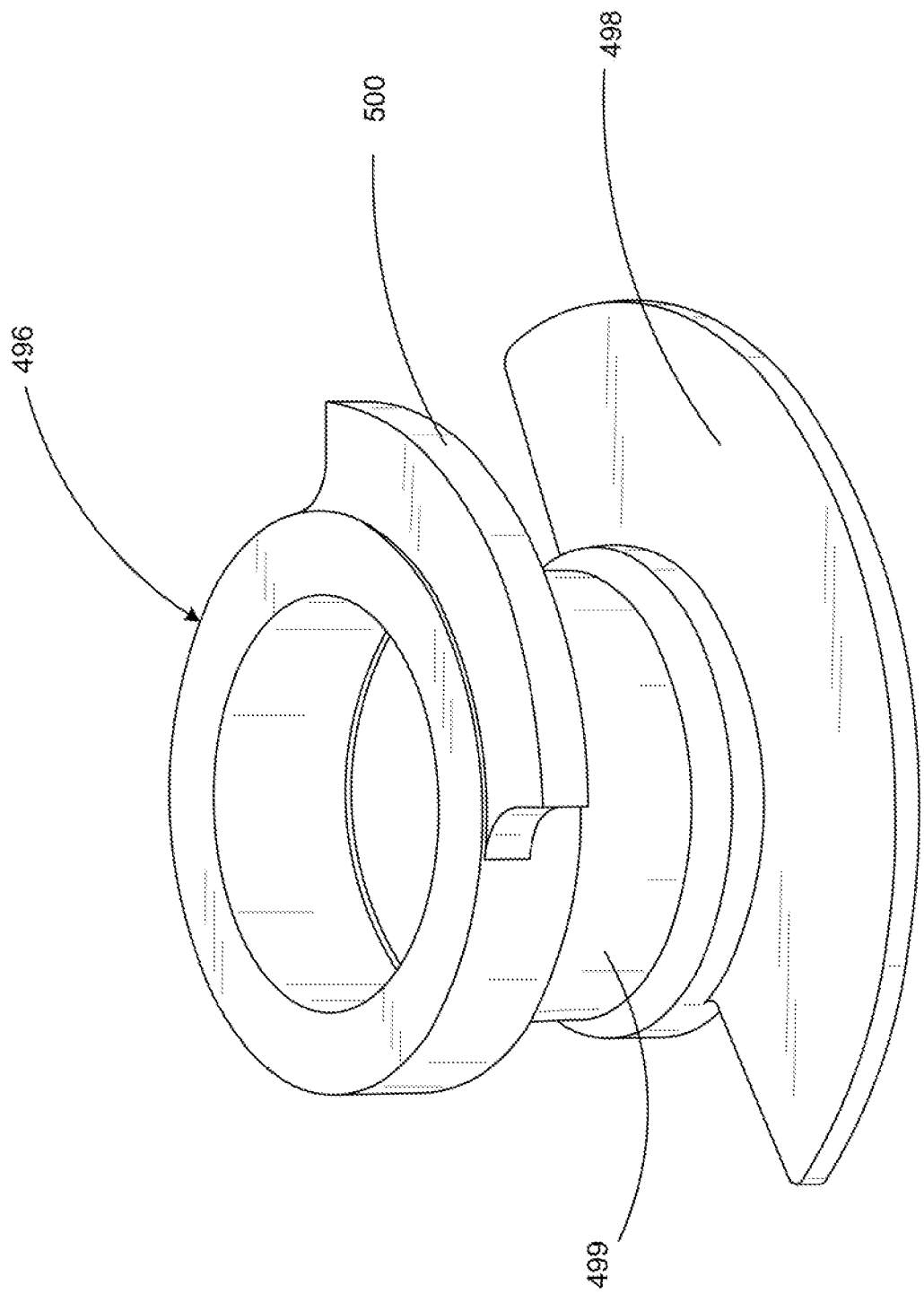
FIG. 51 is an enlarged perspective view of the proximal end of the shutter that controls air flowing to the female rotor of the apparatus shown in FIG. 42.
Figure 52:
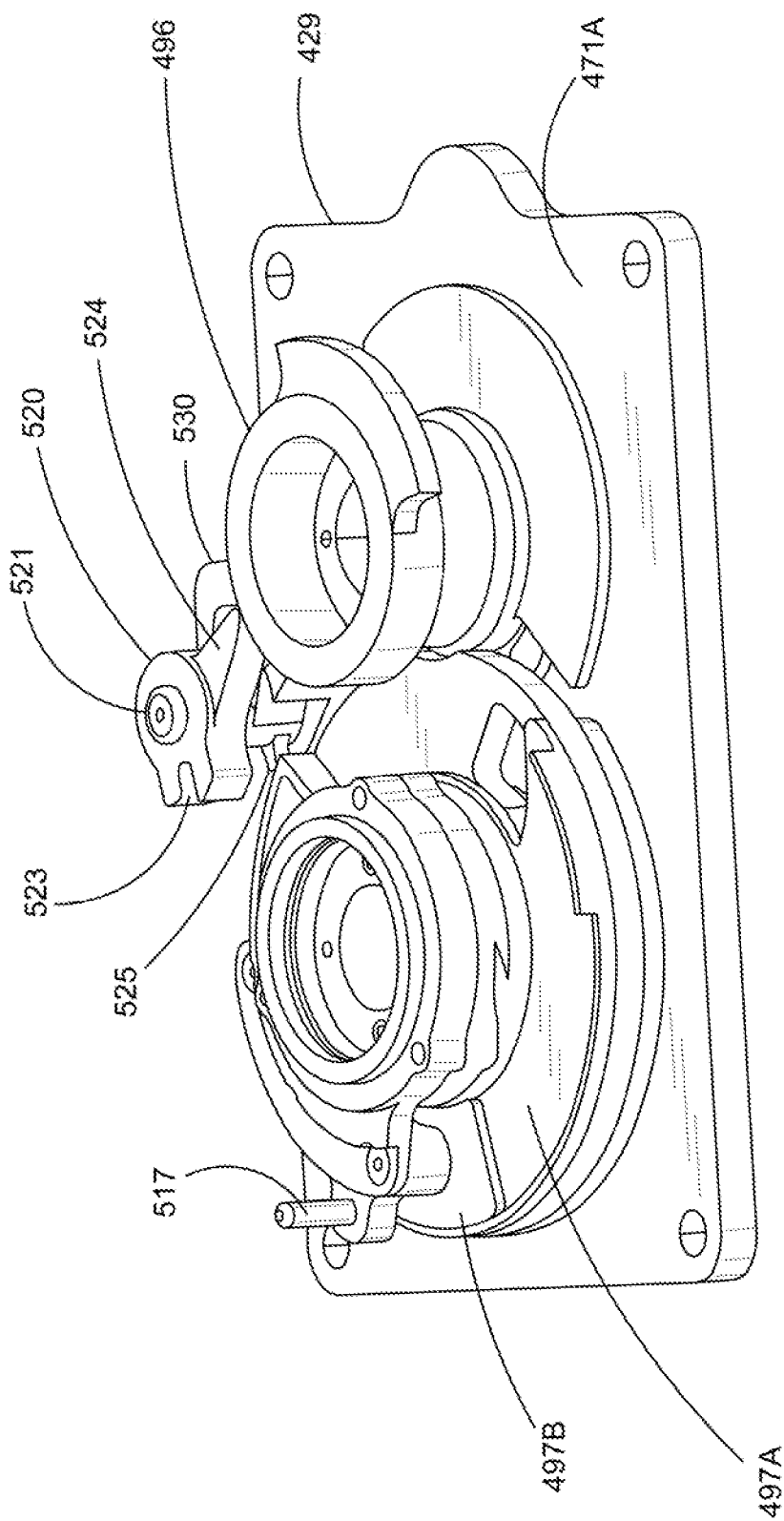
FIG. 52 is an enlarged perspective view of the air inlet control apparatus with latching elements to control the lifting piece of the two-piece shutter that controls air flowing to the male rotor of the apparatus shown in FIG. 42.
Figure 53:
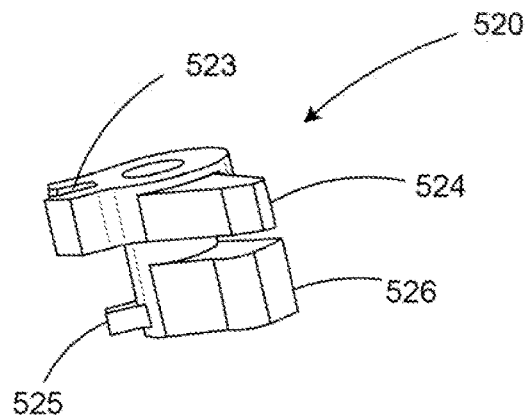
FIG. 53 is an enlarged perspective view of the rotatable latch shown in FIG. 52.
Figure 54:
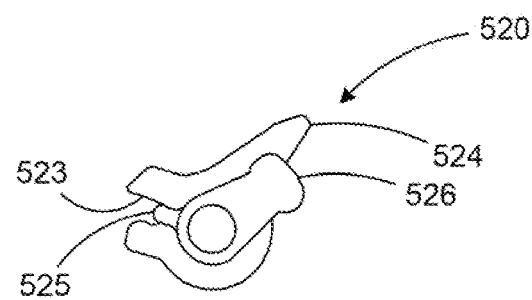
FIG. 54 is an enlarged distal view of the rotatable latch shown in FIG. 52.
Figure 55:
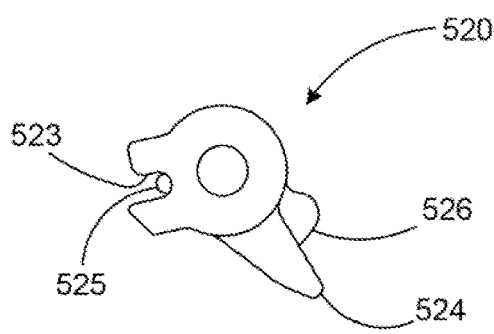
FIG. 55 is an enlarged proximal view of the rotatable latch shown in FIG. 52.
Figure 56:
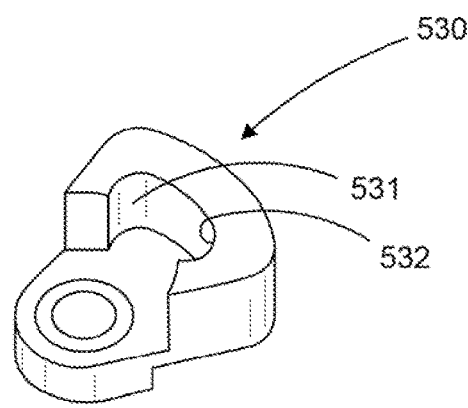
FIG. 56 is an enlarged perspective view of the mounting base for the rotatable latch shown in FIG. 52.
Figure 57:
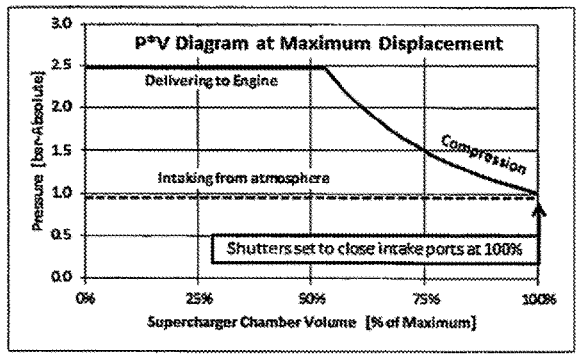
FIG. 57 is a PV diagram at maximum displacement with shutters set to close the air inlet ports at their maximum setting of the apparatus shown in FIG. 42.
Figure 58:
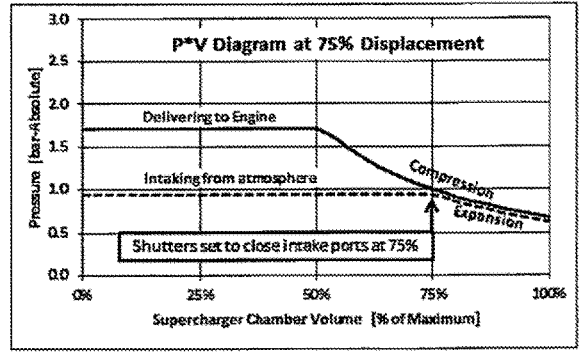
FIG. 58 is a PV diagram with shutters set to close the air inlet ports at an intermediate displacement of the apparatus shown in FIG. 42.
Figure 59:
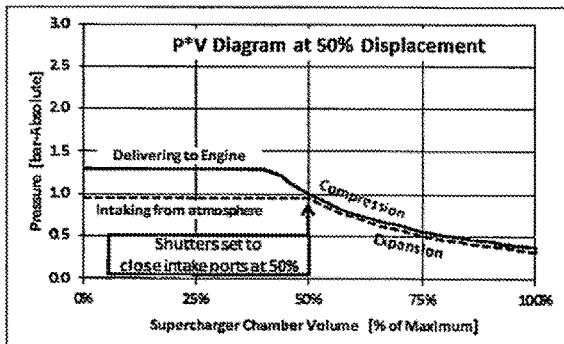
FIG. 59 is a PV diagram with shutters set to close the air inlet ports at a second intermediate displacement of the apparatus shown in FIG. 42.
Figure 60:
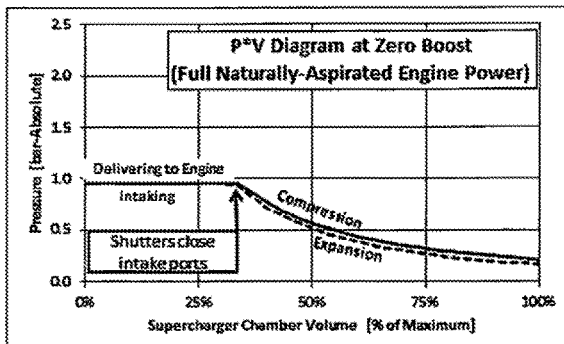
FIG. 60 is a PV diagram with shutters set to close the air inlet ports at an intermediate displacement corresponding to no engine boost of the apparatus shown in FIG. 42.
Figure 61:
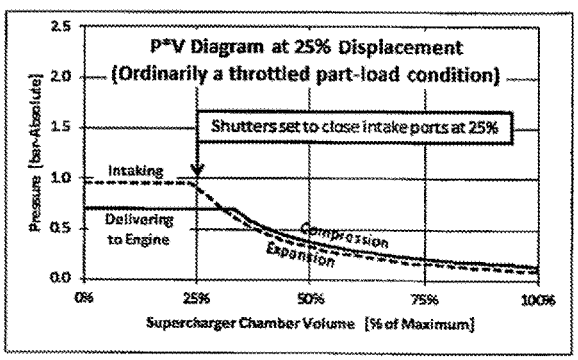
FIG. 61 is a PV diagram with shutters set to close the air inlet ports at an intermediate displacement providing positive work recovery of the apparatus shown in FIG. 42.
Figure 62:
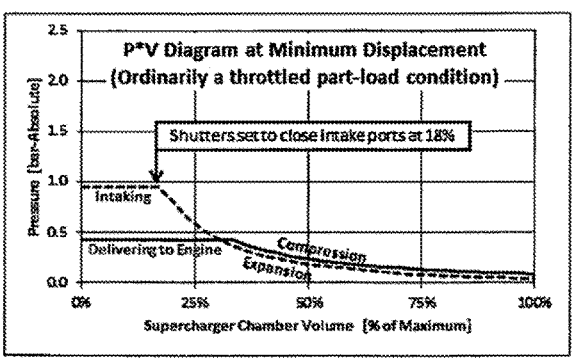
FIG. 62 is a PV diagram at minimum displacement providing positive work recovery with shutters set to close the air inlet ports at their minimum setting of the apparatus shown in FIG. 42.

A second embodiment of an air mass control apparatus 469 for supercharger 11 is shown in FIGS. 42 through 62. In the second embodiment of the air mass control apparatus 469 for the supercharger 11 the parasitic power required to drive supercharger 11 is minimized under all significant engine 10 load conditions, both boosted and unboosted, resulting in further improved engine fuel consumption. The supercharger 11 varies the air mass flow delivered to the engine 10 by varying the air mass drawn into the air inlet of the supercharger 11 with little or no throttling loss during varied engine 10 intake manifold pressures, from below atmospheric pressure to above atmospheric pressure. The power required to operate supercharger 11 is reduced in that only the air mass needed by engine 10 at any given time is drawn into supercharger 11, processed, and delivered to the engine 10. The air mass drawn into the supercharger 11 is controlled with shutters 496 and 497 positioned to selectively and progressively cut off and trap an air mass flow into supercharger 11 at the desired internal volume of the working chamber. Air mass control apparatus 469 for supercharger 11 the shutters 496 and 497 have more range for control than air mass control apparatus 69, thereby providing greater air mass variation and air mass control to smaller volumes of the internal working chamber of the supercharger 11. The small volumes and associated small air mass correspond to operating conditions of the engine 10 that would typically incur throttling parasitic losses during light part-load power requirements in which the pressure in the intake manifold 16 of the engine 10 is below the atmospheric pressure of the supercharger 11 inlet. In this mode of operation, the supercharger serves as an air motor that can provide positive shaft work back to the crankshaft 39 of the engine through the belt drive 41 or other mechanical drive connection between the engine 10 and the supercharger 11. As a positive displacement device that can vary its effective displacement over a wide range, supercharger 11 will additionally serve as an air metering device for purposes of the engine control system and highly precise air/fuel ratio control. The benefits of this accurate transient control of the air/fuel ratio of engine 10 is improved throttle responsiveness for the driver and reduced engine exhaust emissions. Air mass control apparatus 469 is located within vestibule 70 of casing 31 of supercharger 11. Air mass control apparatus 469 determines the cutoff volume of an air mass that flows through air inlet member 429 into rotors 47 and 48 according to the varying demands of the power desired of engine 10 at varying engine loads. Air inlet member 429 has a flat front surface 471A and flat rear surface 471B. As shown in FIGS. 42, 44 and 47, arcuate plate 475 is secured to air inlet member 429. Plate 475 has a front surface 475A laterally spaced from transverse surface 471A of member 429. The surfaces 471A and 475A are stepped offset surfaces that allow shutter 496 to rotate into space or pocket 400 beneath arcuate plate 475 during simultaneous rotation of shutters 496 and 497. A first cylindrical tubular boss 473 extended away from surface 471A has an opening 474 accommodating a bearing 59 for female rotor shaft 58. A second cylindrical tubular boss 476 extended away from surface 471A has an opening 477 accommodating a bearing 53 for male rotor shaft 56. Proceeding to FIGS. 45, 46, and 47, air inlet member 429 has a first plurality of holes, ports or openings 478 to 494 located in a semi-circle relative to boss 473 and female rotor shaft 58. Each opening 478 to 494 has the same generally rectangular inwardly tapered shape and a radial length corresponding to the radial grooves on the female rotor 48. Openings 478 to 494 are circumferentially spaced apart with generally radial walls 495 and axially aligned with the open air inlet ends of the grooves of female rotor 48, with each opening 478 to 494 preferably narrower than the width of the female rotor 48 vane end. The number, size, shape and circumferential arrangement of openings 478 to 494 can vary. Openings 478 to 494 selectively allow an air mass to flow from vestibule 70 into the grooves of female rotor 48. Air inlet member 429 and arcuate plate 475 have a second plurality of aligned holes or openings 586 to 596 located in a semi-circle relative to opening 477 and rotor shaft 56. A 260 degree semi-circle is an example of the arcuate arrangement of openings 586 to 596. Each opening 586 to 596 has a counterclockwise curved rectangular shape as shown in FIG. 46. Adjacent openings are separated with radial walls 597 that confine the air mass flow through openings 586 to 596. Adjacent openings 586 to 596 have the same size and shape and are circumferentially spaced apart. Openings 586 to 596 are axially aligned with the air inlet ends of the vanes of male rotor 47. The number, size, shape and circumferential arrangement of openings 586 to 596 can vary. A generally rectangular opening 599 through air inlet member 429 adjacent to opening 596 passes through arcuate plate 475 to the space between plate 475 and surface 471A of air inlet member 429. Passage 598 through air inlet member 429 also accesses the space between arcuate plate 475 and air inlet member 429 to provide engine 10 with an air supply during engine idling and low power operation. Passage 598 also functions to provide access to air mass to mitigate the creation of a small temporary trapped vacuum between the male rotor 47, the female rotor 48, and the air inlet end member 529 during the initiation of the intake phase while maintaining chamber isolation. Raised surface 601 shown in FIG. 46 serves to mechanically limit the travel range of shutter 496 at each extreme of rotational travel. As shown in FIGS. 42, 43, 44, and 51, air mass control apparatus 469 comprises a first shutter 496 and a second shutter 497. Shutter 496 has an arcuate flat blade 498 joined to a sleeve 499. Sleeve 499 is rotatably retained on tubular boss 473 of air inlet member 429 to allow blade 498 to selectively move in clockwise and counterclockwise rotation to selectively cover and uncover openings 478 to 494. The shutter position determines the internal volume of chamber 49 of housing 28 when the cutoff occurs and the air mass is trapped. Second shutter 497 is a two-piece assembly consisting of shutter base member 497A that rotates but does not lift axially, and shutter lifting blade or lifting member 497B that moves with shutter base blade or base member 497A during a portion of the rotation and then lifts out of engagement with base member 497A and becomes stationary. Shutter base member 497A has arcuate flat blade 501 with joined to a sleeve 502. The distal side of flat blade 501 has sealing surface 505 adjacent to surface 475A of arcuate plate 475. Shutter window 506 extending through blade 501 can be blocked by shutter lifting member 497B. As shutter base member 497A rotates without shutter lifting member 497B, shutter window 506 progressively opens and allows air to flow through to one or more openings 586 to 596 to male rotor 47. Sleeve 502 is rotatably retained on boss 476 to allow blade 501 to selectively move in clockwise and counterclockwise directions to cover and uncover openings 586 to 596. As shown in FIGS. 44, 48, 49, 50, and 53, latching member 520 is rotatably retained on pin 521. Pin slot 523 of latching member 520 engages pin 517 of shutter lifting member 497B to stop rotational movement of shutter lifting member 497B. While pin 517 is engaged in pin slot 523, contact of ear 514 of latching member 520 with surface 500 of shutter 496 maintains the rotational position of latching member 520, and surface 532 of latch base 530 contacts ear 526 of latching member 520 to limit latching member 520 travel in the opposite direction. While pin 517 is not engaged in pin slot 523, contact of ear 525 of latching member 520 with surface 515 of shutter base member 497A maintains the rotational position of latching member 520, and surface 531 of latch base 530 contacts ear 526 of latching member 520 to limit latching member 520 travel in the opposite direction. Multiple lifting ramp surfaces 510 of shutter base member 497A engage multiple lifting ramp surfaces 513 of shutter lifting member 497B. Sliding contact of multiple supporting surfaces 511 of shutter base member 497A and multiple support surfaces 533 of shutter lifting member 497B maintain the lifted axial height during further rotation of shutter base member 497A while shutter lifting member 497B remains stationary. Counter-rotation returns the shutter lifting member 497B to the drop-ramp position where multiple lowering ramp surfaces 512 of the shutter base member 497A and multiple lowering ramp surfaces 514 of shutter lifting member 497B engage to cause axial lowering of shutter lifting member 497B. Spring members (not shown) installed into multiple holes 518 in shutter lifting member 497B bear against the distal side of gear 106 to bias the initial engagement of lowering ramp surfaces 512 with lowering ramp surfaces 514. Window 506 of blade 501 of shutter base member 497A progressively closes as blade 516 of shutter lifting member 497B rotates and lowers into window 506. Two-piece shutter assembly 497 operates to control the volume of intake air mass flowing through one or more openings 586 to 596 to male rotor 47 in chamber 49 of housing 28. The shutter position determines the internal volume of chamber 49 of housing 28 when the cutoff occurs and the air mass is trapped. Shutters 496 and 497 are concurrently rotated in opposite directions with gear train 103. FIG. 42 shows shutters 496 and 497 in the maximum open position relative to openings 478 to 494 and openings 586 to 596 to allow a maximum volume of an air mass to flow into supercharger 11. FIG. 43 shows shutters 496 and 497 in closed positions relative to openings 478 to 494 and openings 586 to 596. FIG. 44 shows shutters 496 and 497 rotated in opposite directions to a partly closed position relative to openings 478 to 494 and openings 586 to 596 to vary the volume of an air mass that flows into supercharger 11. Arcuate movements of shutters 496 and 497 vary the internal volume of the working chamber of supercharger 11 at which the air mass is trapped by supercharger 11, to be subsequently expanded and then compressed and delivered to engine 10 according to the varying power requirements of engine 10. FIGS. 57 to 62 are pressure volume diagrams illustrating the operation of supercharger 11 and air mass control apparatus 469 with different shutter positions to boost air mass directed to internal combustion engine 10. The area enclosed within the loop of pressure vs. volume diagrams provides a visual representation of the belt drive 41 work per supercharger cycle required to operate supercharger 11 in the case of boosted operation, or the shaft work per supercharger cycle produced by the air-motor mode of operation of supercharger 11 when the engine 10 is operating with a vacuum in engine intake manifold 16. As shown in FIGS. 42 and 57, when shutters 496 and 497 are in open positions there is maximum boost. FIG. 57 illustrates the air intake phase, air expansion phase, and air compression phase and the delivery phase during which the compressed air mass is delivered to internal combustion engine 10. As shown in FIG. 58, when shutters 496 and 497 are in seventy-five percent open positions there is less air mass boost, utilizing seventy-five percent of supercharger chamber volume. The minimum air mass delivery, illustrated in FIGS. 43 and 62, is achieved when shutters 496 and 497 are in closed positions. Engine intake manifold 16 of engine 10 in this load condition would be at an absolute pressure below atmospheric pressure. Atmospheric air is drawn into the air inlet vestibule 70 of the supercharger 11 by the rotating rotors 47 and 48 at a higher absolute pressure than the final delivery pressure to engine intake manifold 16, and will serve as an air motor to produce positive work that is returned to the crankshaft of engine 10 through the drive belt 43 or other mechanical drive connection between the engine 10 and the supercharger 11. Changes in the amount of the air mass vary with the varying closing positions of shutters 496 and 497 relative to air inlet openings 478 to 494 and openings 586 to 596. Supercharger 11 operates to supply air mass in variable amounts to internal combustion engine 10 according to the power requirements of internal combustion engine 10.

The supercharger and method of supplying an internal combustion engine with variable amounts of an air mass according to the power requirements of the internal combustion engine and rotor assemblies have been shown and described with reference to preferred embodiments thereof. It will be understood by those skilled in the art that various changes in form and details may be made therein without departing from the scope of the invention.

The invention claimed is:

1. A supercharged internal combustion engine comprising:
    an internal combustion engine having at least one combustion chamber for accommodating an air mass and fuel,
    a supercharger operable to supply varying amounts of an air mass to the internal combustion engine in response to varying power requirements of the internal combustion engine,
    a power transmission drivably connecting the supercharger to the internal combustion engine for operating the supercharger in response to varying speed of the internal combustion engine,
    said supercharger including
    a housing having an internal chamber,
    a male rotor rotatably located in the internal chamber of the housing,
    a female rotor rotatably located in the internal chamber of the housing,
    said male rotor having helical vanes, said helical vanes having proximal ends and distal ends, and
    passages in the proximal ends of the vanes of the male rotor for venting an air mass from adjacent the male rotor.

2. The supercharged internal combustion engine of claim 1 wherein:
    the passages in the proximal ends of the vanes of the male rotor are holes in the vanes to allow an air mass to vent from adjacent the male rotor.

3. The supercharged internal combustion engine of claim 2 wherein:
    each of the holes in the vanes in the proximal ends of the vanes has a radial hole and an axial hole open to the radial hole.

4. The supercharged internal combustion engine of claim 3 wherein:
    each of the vanes has a leading side wall and a trailing side wall,
    the radial hole has an end open to the trailing side wall of the vane.

5. The supercharged internal combustion engine of claim 1 wherein:
the distal ends of the vanes have conically tapered ends extended outwardly and incline toward the proximal ends of the vanes.

6. The supercharged internal combustion engine of claim 1 wherein:
the distal ends of the helical vanes have outwardly and inwardly conically tapered surfaces,
the female rotor has a distal end,
an inwardly directed conic recess in the distal end of the female rotor,
a disk having a cone shaped side wall located in the recess in the distal end of the female rotor, said cone shaped side wall of the disk engaging the conically tapered surfaces of the helical vanes of the male rotor to vent air mass away from the male rotor and the female rotor.

7. A supercharger rotor comprising:
a rotor body having a first end wall and a second end wall opposite the first end wall,
helical vanes joined to the rotor body and located from the first end wall to the second end wall of the rotor body,
each of the helical vanes has an air mass inlet end and an air mass outlet end, and
passages in the air mass inlet end of each helical vanes for venting air mass from adjacent the first end wall of the rotor body.

8. The supercharger rotor of claim 7 wherein:
each of the helical vanes has a symmetrical profile.

9. The supercharger rotor of claim 7 wherein:
each of the helical vanes has a leading side wall and a trailing side wall,
said leading side wall has substantially the same contour as the trailing side wall.

10. The supercharger rotor of claim 9 wherein:
the passages in each of the inlet ends of the vanes are open to the trailing side wall of each of the vanes.

11. The supercharger rotor of claim 7 wherein:
the passages in the air mass inlet ends of the helical vanes are holes in the vanes to allow an air mass to vent from adjacent the first end wall of the rotor body.

12. The supercharger rotor of claim 7 wherein:
the helical vanes have leading side walls and trailing side walls,
said holes in the helical vanes are open to the trailing side walls of the vanes.

13. The supercharger rotor of claim 7 wherein:
the air mass outlet ends of the helical vanes have conically tapered ends extended outwardly and inclined toward the air mass inlet ends of the helical vanes.

* * * * *